US012805527B2

(12) United States Patent
Hu et al.

(10) Patent No.: US 12,805,527 B2
(45) Date of Patent: Nov. 24, 2026

(54) DOPED CARBON DOTS AND USES THEREOF

(71) Applicant: Nanyang Technological University, Singapore (SG)

(72) Inventors: Xiao Hu, Singapore (SG); Yansong Miao, Singapore (SG); Xiaoyong Pan, Singapore (SG); Susanti, Singapore (SG); Kee Woei Ng, Singapore (SG); Minh Tuan Tran, Singapore (SG); Hui Chen, Singapore (SG)

(73) Assignee: Nanyang Technological University, Singapore (SG)

(*) Notice: Subject to any disclaimer, the term of this patent is extended or adjusted under 35 U.S.C. 154(b) by 630 days.

(21) Appl. No.: 18/032,879

(22) PCT Filed: Oct. 21, 2021

(86) PCT No.: PCT/SG2021/050634
§ 371 (c)(1),
(2) Date: Apr. 20, 2023

(87) PCT Pub. No.: WO2022/086447
PCT Pub. Date: Apr. 28, 2022

(65) Prior Publication Data

US 2024/0016157 A1 Jan. 18, 2024

(30) Foreign Application Priority Data

Oct. 21, 2020 (SG) ........................... 10202010424X

(51) Int. Cl.
*A01N 59/20* (2006.01)
*A01N 25/08* (2006.01)
*A01N 59/16* (2006.01)
*A01P 1/00* (2006.01)
*A01P 21/00* (2006.01)

(52) U.S. Cl.
CPC ............. *A01N 59/20* (2013.01); *A01N 25/08* (2013.01); *A01N 59/16* (2013.01); *A01P 1/00* (2021.08); *A01P 21/00* (2021.08)

(58) Field of Classification Search
None
See application file for complete search history.

(56) References Cited

FOREIGN PATENT DOCUMENTS

| | | | |
|---|---|---|---|
| BR | 102020002172 | A2 | 8/2021 |
| CN | 106675557 | A | 5/2017 |
| CN | 108160013 | A | 6/2018 |
| CN | 109722242 | A | 5/2019 |
| CN | 110327980 | A | 6/2019 |
| CN | 113201330 | A | 8/2021 |
| CN | 113213997 | * | 8/2021 |
| EP | 4098611 | A2 | 12/2022 |

OTHER PUBLICATIONS

The Oxford English Reference Dictionary, 2nd edition, Oxford University Press, Oxford, p. 1660 (1996).*
The Encyclopedia of Chemistry, 3rd edition, Van Nostrand Reinhold Co., New York, pp. 228-229 (1973).*
Machine translation of CN 113213997 by Espacenet, Aug. 6, 2021.*
Machine translation of CN 113201330 by Espacenet, Aug. 3, 2021.*
Wu, Y. et al., "Carbon quantum dots derived from different carbon sources for antibacterial applications," Antibiotics, vol. 10, pp. 1-22 (May 24, 2021).*
Das, S. et al., "Carbon dots: an emerging smart material for analytical applications," Micromachines, vol. 12, pp. 1-36 (Jan. 15, 2021).*
De Boever, R. et al., Carbon dots for carbon dummies: the quantum and the molecular questions among some others, Chemistry—A European Journal, pp. 1-19 (2022).*
Anand, S. R. et al., "Antibacterial Nitrogen-doped Carbon Dots as a Reversible "Fluorescent Nanoswitch" and Fluorescent Ink." ACS Omega, Jan. 17, 2019, vol. 4, No. 1, pp. 1581-1591.
Ma, Y. et al., N-doped carbon dots derived from leaves with low toxicity via damaging cytomembrane for broad-spectrum antibacterial activity. Materials Today Communications, May 16, 2020, vol. 24, pp. 101222 [Retrieved on Jan. 18, 2022] <DOI: 10.1016/J.MTCOMM.2020.101222>.
Li Hao et al: "Enhanced RuBisCO activity and promoted dicotyledons growth with degradable carbon dots", NANO Research, Tsinghua University Press, CN, vol. 12, No. 7, Apr. 15, 2019 (Apr. 15, 2019), pp. 1585-1593, XP036821197, ISSN: 1998-0124.
Yang Daoyong et al: "Compound repair effect of carbon dots and Fe2+ on iron deficiency in *Cucumis melon* L", Plant Physiology and Biochemistry, Elsevier, Amsterdam, NL, vol. 142, Jun. 28, 2019 (Jun. 28, 2019), pp. 137-142, XP085802660, ISSN: 0981-9428.
Lin Haitao et al: "Detection of nitrite based on fluorescent carbon dots by the hydrothermal method with folic acid", Royal Society Open Science, [Online] vol. 5, No. 5, May 1, 2018 (May 1, 2018), p. 172149, XP093196873, ISSN: 2054-5703, DOI: 10.1098/rsos.172149 Retrieved from the Internet: URL:https://royalsocietypublishing.org/doi /full-XML/10.1098/rsos.172149>.

(Continued)

*Primary Examiner* — John Pak
(74) *Attorney, Agent, or Firm* — Tyler Sisk; Casimir Jones SC

(57) ABSTRACT

The present invention relates to a method for promoting plant growth, comprising subjecting at least one part of a plant to a carbon dot, wherein the carbon dot is doped with one or more doping material selected from the group consisting of silica, plant macronutrients, plant micronutrients, and drug molecules; and wherein the doping material is conjugated within and on the surface of the carbon dot. The present invention also relates to the use of a carbon dot for plant growth, wherein the carbon dot is doped with one or more doping material selected from the group consisting of silica, plant macronutrients, and plant micronutrients, and drug molecules; and wherein the doping material is conjugated within and on the surface of the carbon dot.

18 Claims, 48 Drawing Sheets

(56) References Cited

OTHER PUBLICATIONS

Changfang Lu et al: "Ratiometric fluorescence assay for L-Cysteine based on Fe-doped carbon dot nanozymes", Nanotechnology, Institute of Physics Publishing, Bristol, GB, vol. 31, No. 44, Aug. 7, 2020 (Aug. 7, 2020), p. 445703, XP020358038, ISSN: 0957-4484.

European Patent Office, Supplementary Search Report for EP Application No. 21883432.3, dated Sep. 23, 2024.

* cited by examiner

DOPED CARBON DOTS AND USES THEREOF

CROSS REFERENCE TO RELATED APPLICATIONS

The present application is a national stage application of PCT/SG2021/050634 filed on 21 Oct. 2021, which claims priority to Singapore Application No. 10202010424X filed on 21 Oct. 2020, the contents of which are hereby incorporated by reference in their entirety of all purposes.

TECHNICAL FIELD

The present disclosure generally refers to the use of doped carbon dots in plant growth. The present disclosure also generally refers to methods of promoting plant growth using carbon dots.

BACKGROUND ART

As predicted, the world's population will increase to 9 billion by the year 2050 and global food crises will affect half the human population. Industrialization, environmental pollution and urbanization will continue to worsen the situation further by depleting fertile land. In order to address this global challenge of food shortages, solutions need to be found to increase plant growth.

Plant growth compositions such as fertilizers, soil amendments, conditioners and additives have been employed for many years to improve growing conditions for plants. Many plant growth compositions have been specifically formulated to address problems of nutrient deficiencies in the soil, for example, iron deficiencies in plants. Other plant growth compositions focus on inhibiting bacteria that are detrimental to the growth of plants.

Although iron (Fe) is the fourth most abundant element in the earth's crust, it is not readily available to plants. In soils that are aerobic or high in pH, Fe is readily oxidized to insoluble ferric oxide. Iron deficiency is thus a critical agriculture problem, especially in calcareous soils, which cover more than 30% of the earth's surface. On the other hand, due to the vital role of iron in plant metabolism of mitochondria and chloroplast, plants suffering from iron deficiency typically develop chlorosis symptoms which in the end results in great loss of yield and nutrient value. The ability of plants to respond to Fe availability ultimately affects human nutrition, both in terms of yield and the bioavailable Fe in edible tissue.

Iron deficiency in humans caused by inadequate dietary intake is a global nutritional problem. According to a report by World Health Organization (WHO) in 2002, iron deficiency affects more than 3 billion people worldwide, especially women and children in developing countries. Iron deficiency causes impairments in mental and psychomotor development in children and diminished productivity in adults and is also the most common cause of anaemia. Three different approaches for iron biofortification are the agronomic approach, breeding and genetic engineering. Lack of genetic diversity makes breeding programs ineffective, while consumer resistance hampers the widespread application of genetic engineering approach. An agronomic approach, especially Fe fertilization is thus a promising solution for improving iron concentration and bioavailability to address on-going human Fe-deficiency. However, the high cost/easy oxidation of the soluble plant available Fe(II) fertilizer and readily conversion of Fe(III) fertilizer into insoluble Ferric oxide make iron biofortification a global challenge.

Thus, there is a need to provide solutions that can overcome, or at least ameliorate, one or more of the disadvantages described above.

SUMMARY

In an aspect of the present disclosure, there is provided a method for promoting plant growth, comprising subjecting at least one part of a plant to a carbon dot, wherein the carbon dot is doped with one or more doping material selected from the group consisting of silica, plant macronutrients, plant micronutrients, and drug molecules; and wherein the doping material is conjugated within and on the surface of the carbon dot.

In another aspect of the present disclosure, there is provided a use of a carbon dot for plant growth, wherein the carbon dot is doped with one or more doping material selected from the group consisting of silica, plant macronutrients, plant micronutrients, and drug molecules; and wherein the doping material is conjugated within and on the surface of the carbon dot.

Advantageously, the carbon dots of the present disclosure may be purified easily with high yield, making it advantageously scalable in production.

Further advantageously, the carbon dots of the present disclosure may possess high loading capacity of doping material, making it advantageously useful in material delivery to support plant growth.

Also advantageously, the carbon dots of the present disclosure may be capable of prolonged delivery of doping material over a long period of time. This advantageously results in a lower concentration of carbon dots required to promote plant growth. This also advantageously reduces run-off from unabsorbed doping material.

Further advantageously, the carbon dots of the present disclosure may be effective at killing bacteria which are harmful to plants, thereby promoting plant growth.

Definitions

Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

Unless the context requires otherwise or specifically stated to the contrary, integers, steps, or elements of the invention recited herein as singular integers, steps or elements clearly encompass both singular and plural forms of the recited integers, steps or elements.

As used herein, the term "conjugated" refers to association of groups through bonds such as covalent, hydrophobic, ionic, hydrogen, Van der Waals forces, electrostatic interactions, and the like.

The word "substantially" does not exclude "completely" e.g. a composition which is "substantially free" from Y may be completely free from Y. Where necessary, the word "substantially" may be omitted from the definition of the invention.

As used herein in the specification and in the claims, the phrase "at least," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

BRIEF DESCRIPTION OF DRAWINGS

The accompanying drawings illustrate disclosed embodiments and serve to explain the principles of the disclosed embodiments. It is to be understood, however, that the drawings are designed for purposes of illustration only, and not as a definition of the limits of the invention.

DETAILED DISCLOSURE OF EMBODIMENTS

Figure 1A:
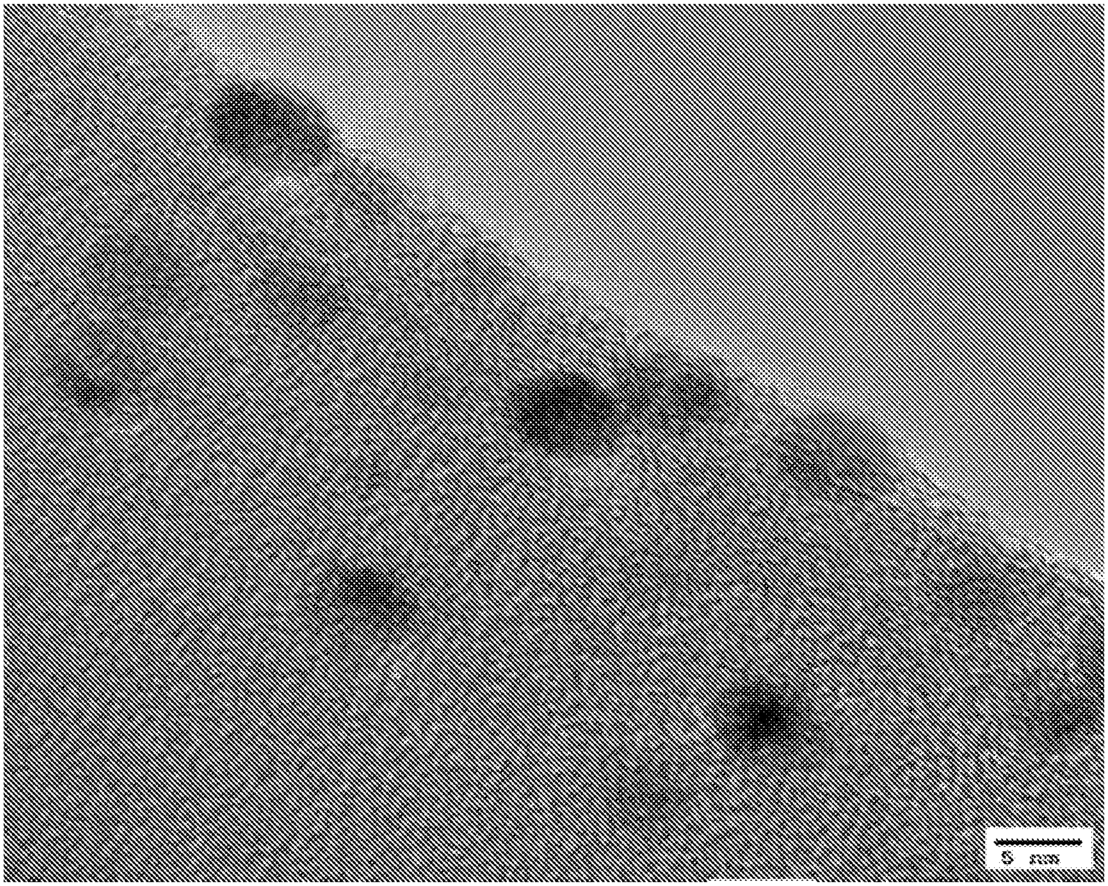
FIG. 1*a* shows the Transmission Electron Microscopy (TEM) image of synthesised carbon dots (CD).
Figure 1B:
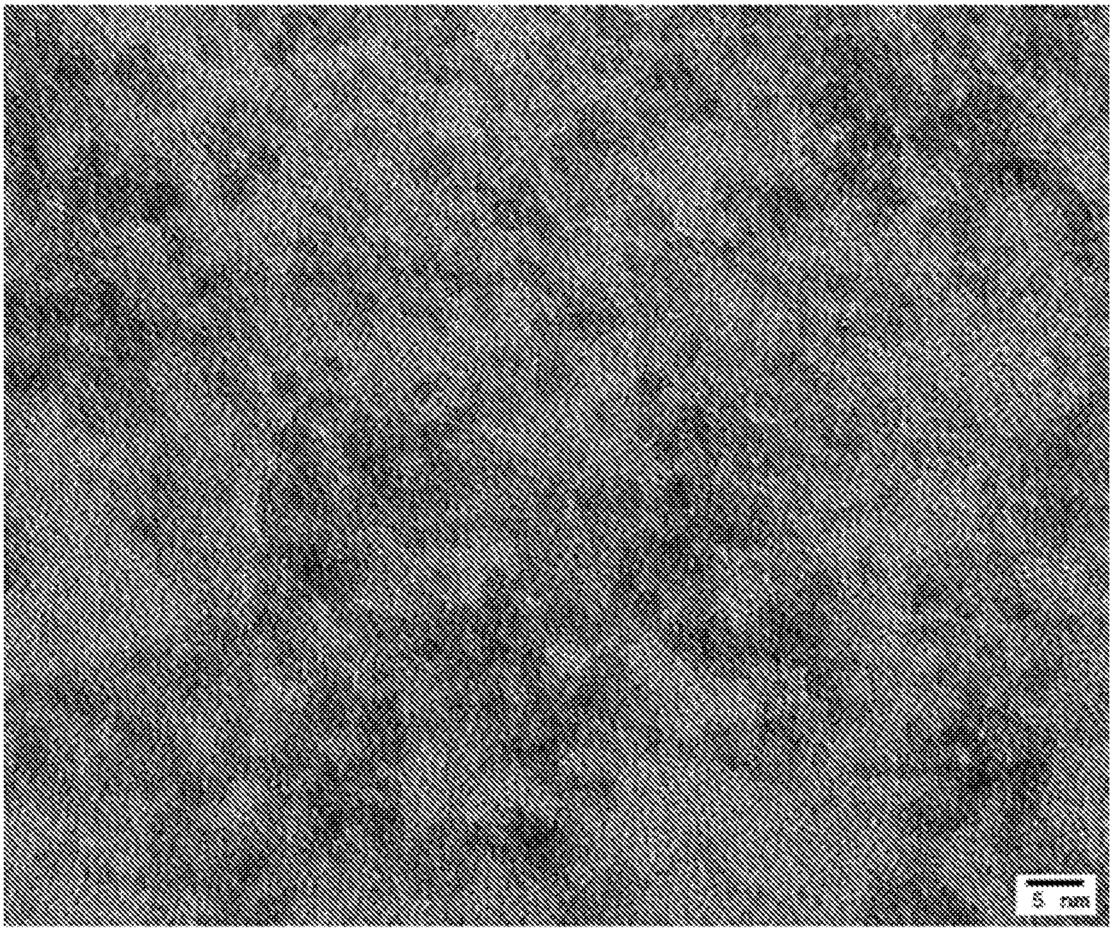
FIG. 1*b* shows the TEM image of synthesised iron-doped carbon dots (FeCD).
Figure 1C:
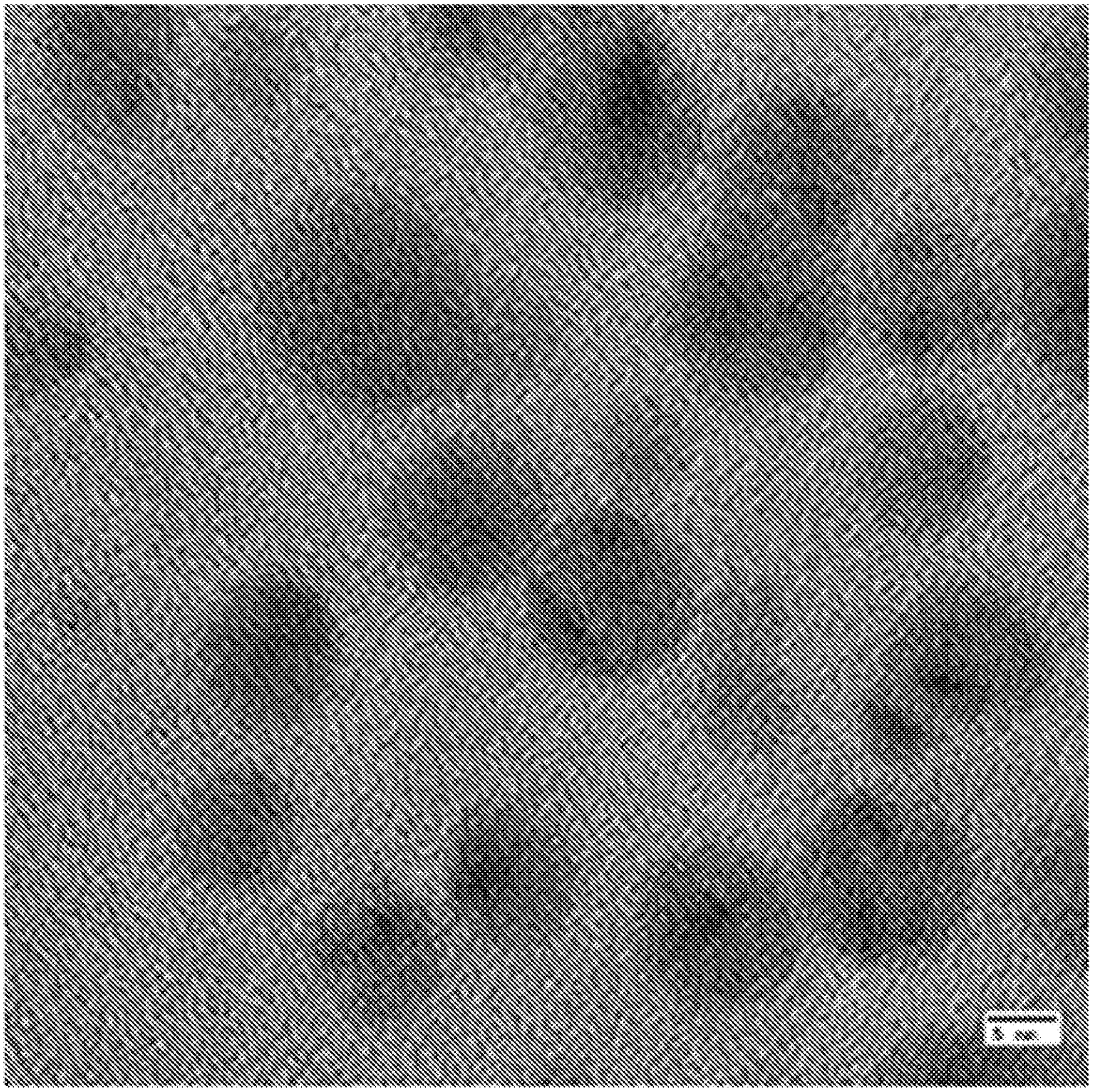
FIG. 1*c* shows the TEM image of synthesised copper-doped carbon dots (CuCD).
Figure 1D:
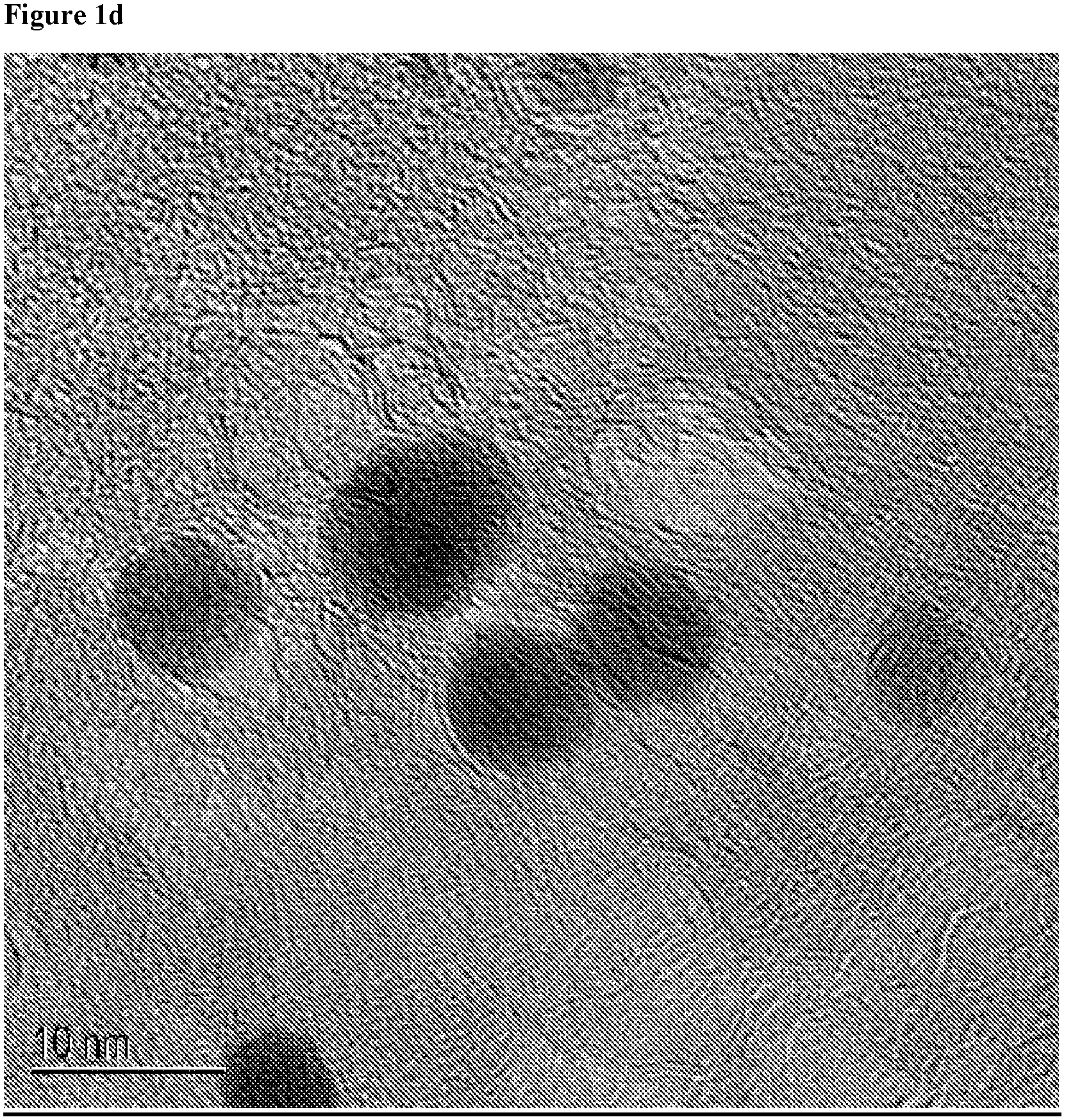
FIG. 1*d* shows the TEM image of synthesised iron-zinc-doped carbon dots (FeZnCD).

The present disclosure refers to a method for promoting plant growth, comprising subjecting at least one part of a plant to a carbon dot, wherein the carbon dot is doped with one or more doping material selected from the group consisting of silica, plant macronutrients, plant micronutrients, and drug molecules; and wherein the doping material is conjugated within and on the surface of the carbon dots.

The present disclosure also refers to a use of a carbon dot for plant growth, wherein the carbon dot is doped with one or more doping material selected from the group consisting of silica, plant macronutrients, plant micronutrients, and drug molecules; and wherein the doping material is conjugated within and on the surface of the carbon dots.

The plants that the carbon dots may be applied to can be any plant, for example agricultural crops, fruit trees, decorative plants, or evergreen trees.

The use of the carbon dots of the present disclosure may advantageously result in an increase in biomass compared to conventional fertilizers, such as Fe(II) or Fe(III) fertilizers. The use of the carbon dots of the present disclosure may also advantageously result in an increase wet and dry biomass of different parts of the plant, for example, the roots, leaves, stem, and any other combinations thereof. The use of the carbon dots of the present disclosure may also advantageously increase chlorophyll and tissue iron content of the plants.

The carbon source may be biomass, plastic waste, food waste, plant waste, chemicals, ethylenediaminetetraacetic acid (EDTA), metal-EDTA, Fe-EDTA, Fe—Na-EDTA, Zn-EDTA, Cu-EDTA, Mg-EDTA), and combinations thereof.

The carbon source may be biomass, food waste, plant waste, chemicals, or a combination thereof. This advantageously confers a high versatility to production of the carbon dots. Further advantageously, the carbon dots may be formed from material which would have otherwise been discarded.

The chemical may be various sugars, amino acids, organic acids, citric acid, saturated or unsaturated fatty acids, vegetable or animal oils, amines and its complexes, such as EDTA, metal-EDTA, Fe(II)-EDTA, Na-EDTA, Zn-EDTA, Cu-EDTA, Fe(III)-EDTA, or Mg-EDTA.

The doping material may be macronutrients, micronutrients, drug molecules, pesticides, or bioactives suitable, beneficial or essential for plant growth. Advantageously the carbon dots of the present invention may allow all sorts of material essential for plant growth to be incorporated within.

The macronutrients may be nitrogen, phosphorus, potassium, calcium, magnesium, sulfur, and combinations thereof.

The micronutrients may be metal ions, boron, chlorine, metal oxides, metal salts, and combinations thereof.

The metals that make up the metal oxides or metal salts may be iron, zinc, calcium, magnesium, copper, manganese, potassium, or molybdenum.

The metal ions may be iron ions, zinc ions, calcium ions, magnesium ions, copper ions, manganese ions, potassium ions, molybdenum ions, or combinations thereof.

The metal ions may be $Fe^{2+}$, $Fe^{3+}$, $Zn^{2+}$, $Ca^{2+}$, $Mg^{2+}$, $Cu^{2+}$, $Mn^{2+}$, $K^{+}$, $Mo^{2+}$, and combinations thereof.

The carbon dots may be doped with one metal, or may be co-doped with two or more metals. The carbon dots may be doped with iron, zinc, calcium, magnesium, copper, manganese, potassium, or molybdenum. The carbon dots may be co-doped with two or more of iron, zinc, calcium, magnesium, copper, manganese, potassium, or molybdenum. The carbon dots may be co-doped with iron and copper, or zinc and copper.

When the carbon dots are doped with iron, the amount of iron content in the carbon dots of the present invention may be advantageously lower than the iron content required to achieve comparable plant growth when compared to conventional Fe(II) or Fe(III) fertilizers.

The iron-doped carbon dots may contain about 20 wt % to about 60 wt %, about 25 wt % to about 60 wt %, about 30 wt % to about 60 wt %, about 35 wt % to about 60 wt %, about 40 wt % to about 60 wt %, about 45 wt % to about 60 wt %, about 50 wt % to about 60 wt %, about 55 wt % to about 60 wt %, about 25 wt % to about 55 wt %, about 30 wt % to about 55 wt %, about 35 wt % to about 55 wt %, about 40 wt % to about 55 wt %, about 45 wt % to about 55 wt %, about 50 wt % to about 55 wt %, about 20 wt % to about 50 wt %, about 25 wt % to about 50 wt %, about 30 wt % to about 50 wt %, about 35 wt % to about 50 wt %, about 40 wt % to about 50 wt %, about 45 wt % to about 50 wt %, about 20 wt % to about 45 wt %, about 25 wt % to about 45 wt %, about 30 wt % to about 45 wt %, about 35 wt % to about 45 wt %, about 40 wt % to about 45 wt %, about 20 wt % to about 40 wt %, about 25 wt % to about 40 wt %, about 30 wt % to about 40 wt %, about 35 wt % to about 40 wt %, about 20 wt % to about 35 wt %, about 25 wt % to about 35 wt %, about 30 wt % to about 35 wt %, about 20 wt % to about 30 wt %, about 25 wt % to about 30 wt %, about 20 wt % to about 25 wt %, about 20 wt %, about 25 wt %, about 30 wt %, about 35 wt %, about 40 wt %, about 45 wt %, about 50 wt %, about 55 wt %, about 60 wt %, or any value or range therebetween, of iron.

When doped with iron, although the carbon dots may be Fe(III) loaded, they are advantageously not susceptible to formation of insoluble ferric oxide. Thus, the invention is able to avoid the usage of highly oxidizable Fe(II). This advantageously lowers the economic costs of the doped carbon dots of the present invention, which may advantageously be useful as iron-fortifying fertilizers.

Drug molecules may comprise pesticides, bioactives or a combination thereof.

Pesticides may be any substance that can control pests. Such pesticides may be selected from the group consisting of herbicides, insecticides, ematicides, molluscicides, piscicides, avicides, rodenticides, bactericides, insect repellants, animal repellents, antimicrobials, fungicides, aligicides, algaecides, miticides, acaricides, nematicides, slimicides, larvicides, virucides or a combination thereof. Pesticides may also be selected from the group consisting of organochlorines, organophosphates, carbamates, pyrethroids, sulfonylurea herbicides, biopesticides or a combination thereof. Pesticides may also be selected from a group consisting of glyphosate, bocalid, acephate, DEET, propoxur, metaldehyde, boric acid, diazinon, dursban, DDT, malathion or a combination thereof. The pesticide may be a bactericide or fungicide.

Bioactives may be selected from the group consisting of biomolecules, anti-microbial agents, omega 3, folic acid, boron, calcium or a combination thereof.

The doping material may be incorporated within or on the surface of the carbon dots by various mechanisms such as chelation, adsorption, complexation, hydrogen bonding, ionic bonding, conjugate bonding, chemisorption, or a combination of mechanisms as listed out.

The doping material may be incorporated within and on the surface of the carbon dots by various mechanisms such as chelation, adsorption, complexation, hydrogen bonding, ionic bonding, conjugate bonding, chemisorption, or a combination of mechanisms as listed out.

The doping material may correspondingly be found within, on the surface, or substantially within the carbon dots. In an embodiment where the doping material is incorporated both with and on the surface of the carbon dots, the doping material may be adsorbed on the surface of the carbon dot, and also be conjugated to the carbon dot on the inside of the carbon dot. Advantageously, this results in a high loading capacity of the carbon dots. The doping material may not simply be adsorbed on the surface of the carbon dots. Instead, the doping material may also be incorporated within the carbon dot itself. Hence, the carbon dot of the present invention may contain doping material that is both adsorbed/conjugated to the surface of the carbon dot, and also incorporated within the carbon dot itself. The doping material that is incorporated within the carbon dot may be conjugated within the carbon dot via covalent bonding, hydrophobic bonding, ionic bonding, hydrogen bonding, Van der Waals forces, electrostatic interactions, and the like. The doping material that is incorporated within the carbon dot may be conjugated within the carbon dot via ionic and/or covalent bonding.

The carbon dots may contain about 0.1 mmol/g to about 40 mmol/g, about 1 mmol/g to about 40 mmol/g, about 5 mmol/g to about 40 mmol/g, about 10 mmol/g to about 40 mmol/g, about 15 mmol/g to about 40 mmol/g, about 20 mmol/g to about 40 mmol/g, about 25 mmol/g to about 40 mmol/g, about 30 mmol/g to about 40 mmol/g, about 35 mmol/g to about 40 mmol/g, about 0.1 mmol/g to about 35 mmol/g, about 1 mmol/g to about 35 mmol/g, about 5 mmol/g to about 35 mmol/g, about 10 mmol/g to about 35 mmol/g, about 15 mmol/g to about 35 mmol/g, about 20 mmol/g to about 35 mmol/g, about 25 mmol/g to about 35 mmol/g, about 30 mmol/g to about 35 mmol/g, about 0.1 mmol/g to about 30 mmol/g, about 1 mmol/g to about 30 mmol/g, about 5 mmol/g to about 30 mmol/g, about 10 mmol/g to about 30 mmol/g, about 15 mmol/g to about 30 mmol/g, about 20 mmol/g to about 30 mmol/g, about 25 mmol/g to about 30 mmol/g, about 0.1 mmol/g to about 25 mmol/g, about 1 mmol/g to about 25 mmol/g, about 5 mmol/g to about 25 mmol/g, about 10 mmol/g to about 25 mmol/g, about 15 mmol/g to about 25 mmol/g, about 20 mmol/g to about 25 mmol/g, about 0.1 mmol/g to about 20 mmol/g, about 1 mmol/g to about 20 mmol/g, about 5 mmol/g to about 20 mmol/g, about 10 mmol/g to about 20 mmol/g, about 15 mmol/g to about 20 mmol/g, about 0.1 mmol/g to about 15 mmol/g, about 1 mmol/g to about 15 mmol/g, about 5 mmol/g to about 15 mmol/g, about 10 mmol/g to about 15 mmol/g, about 0.1 mmol/g to about 10 mmol/g, about 1 mmol/g to about 10 mmol/g, about 5 mmol/g to about 10 mmol/g, about 0.1 mmol/g to about 5 mmol/g, about 1 mmol/g to about 5 mmol/g, about 0.1 mmol/g to about 1 mmol/g, about 0.1 mmol/g, about 0.5 mmol/g, about 1 mmol/g, about 2 mmol/g, about 3 mmol/g, about 4 mmol/g, about 5 mmol/g, about 10 mmol/g, about 15 mmol/g, about 20 mmol/g, about 25 mmol/g, about 30 mmol/g, about 35 mmol/g, about mmol/g or any value or range therebetween, of doping material. The carbon dot may contain about 0.2 mmol/g to about 30 mmol/g of doping material.

The doping material in the carbon dots of this invention may be incorporated both within and on the surface of the carbon dots. The doping material may be introduced to the carbon source prior to or during the formation of the carbon dots. Advantageously this allows for the carbon dots to be incorporated within and on the surface of the carbon dots.

Because the carbon material may be incorporated both within and on the surface of the carbon dots, the carbon dots of the present invention may advantageously have slower dopant release profiles. This advantage can translate into smaller amounts of carbon dots needed to maintain a suitable concentration of doping material to the plant, or less run-off from leaching if unabsorbed doping material.

The carbon dots may release doping material at a rate of about 1% to about 4% per hour, or about 1.5% to about 4% per hour, about 2% to about 4% per hour, about 2.5% to about 4% per hour, about 3% to about 4% per hour, about 3.5% to about 4% per hour, about 1% to about 3.5% per hour, about 1% to about 3% per hour, about 1% to about 2.5% per hour, about 1% to about 2% per hour, about 1% to about 1.5% per hour, or about 1%/hour, about 1.5%/hour, about 2%/hour, about 2.5%/hour, about 3%/hour, about 3.5%/hour, about 4%/hour, or any value or range therebetween. The carbon dots may release about 15% doping material over a 6 hour period.

The carbon dot may be formed by an in situ process such as a hydrothermal and assisted hydrothermal or thermal method of carbonization of a carbon source in the presence of a doping material or materials, wherein during the process, the carbon source and the doping material form carbon dots that contain doping material conjugated within and on the surface of the carbon dots.

The carbon dots may be formed by various processes like physical mixing, microwave, electrochemical oxidation, plasma treatment, arc discharge, thermal decomposition, laser ablation, ultrasonic treatment, templated routes, chemical reduction, hydrothermal, solvothermal, or photo-reduction methods.

The carbon dots may be formed by a hydrothermal process. This advantageously allows the doping material to be mixed with the carbon source prior to or during the formation of the carbon dots, thus incorporating the doping material both within and on the surface of the carbon dots.

In an embodiment, the carbon dot is only doped with doping material during the process of forming the carbon dot. In other words, the carbon dot is not doped with doping material after the formation of the carbon dot.

The hydrothermal process may be performed at about 100° C. to about 360° C., about 120° C. to about 360° C., about 140° C. to about 360° C., about 160° C. to about 360° C., about 180° C. to about 360° C., about 200° C. to about 360° C., about 220° C. to about 360° C., about 240° C. to about 360° C., about 260° C. to about 360° C., about 280° C. to about 360° C., about 300° C. to about 360° C., about 320° C. to about 360° C., about 340° C. to about 360° C., about 100° C. to about 340° C., about 120° C. to about 340° C., about 140° C. to about 340° C., about 160° C. to about 340° C., about 180° C. to about 340° C., about 200° C. to about 340° C., about 220° C. to about 340° C., about 240° C. to about 340° C., about 260° C. to about 340° C., about 280° C. to about 340° C., about 300° C. to about 340° C., about 320° C. to about 340° C., about 100° C. to about 320° C., about 120° C. to about 320° C., about 140° C. to about 320° C., about 160° C. to about 320° C., about 180° C. to about 320° C., about 200° C. to about 320° C., about 220° C. to about 320° C., about 240° C. to about 320° C., about 260° C. to about 320° C., about 280° C. to about 320° C., about 300° C. to about 320° C., about 100° C. to about 300° C., about 120° C. to about 300° C., about 140° C. to about 300° C., about 160° C. to about 300° C., about 180° C. to about 300° C., about 200° C. to about 300° C., about 220° C. to about 300° C., about 240° C. to about 300° C., about 260° C. to about 300° C., about 280° C. to about 300° C., about 100° C. to about 280° C., about 120° C. to about 280° C., about 140° C. to about 280° C., about 160° C. to about 280° C., about 180° C. to about 280° C., about 200° C. to about 280° C., about 220° C. to about 280° C., about 240° C. to about 280° C., about 260° C. to about 280° C., about 100° C. to about 260° C., about 120° C. to about 260° C., about 140° C. to about 260° C., about 160° C. to about 260° C., about 180° C. to about 260° C., about 200° C. to about 260° C., about 220° C. to about 260° C., about 240° C. to about 260° C., about 260° C. to about 260° C., about 100° C. to about 240° C., about 120° C. to about 240° C., about 140° C. to about 240° C., about 160° C. to about 240° C., about 180° C. to about 240° C., about 200° C. to about 240° C., about 220° C. to about 240° C., about 100° C. to about 220° C., about 120° C. to about 220° C., about 140° C. to about 220° C., about 160° C. to about 220° C., about 180° C. to about 220° C., about 200° C. to about 220° C., about 100° C. to about 200° C., about 120° C. to about 200° C., about 140° C. to about 200° C., about 160° C. to about 200° C., about 180° C. to about 200° C., about 100° C. to about 180° C., about 120° C. to about 180° C., about 140° C. to about 180° C., about 160° C. to about 180° C., about 100° C. to about 160° C., about 120° C. to about 160° C., about 140° C. to about 160° C., about 100° C. to about 140° C., about 120° C. to about 140° C., about 100° C. to about 120° C., about 100° C., about 120° C., about 140° C., about 160° C., about 180° C., about 200° C., about 220° C., about 240° C., about 260° C., about 280° C., about 300° C., about 320° C., about 340° C., about 360° C., or any value or range therebetween. The hydrothermal process may be performed at about 150° C. to about 300° C.

The hydrothermal process may be performed for at least about 1 h, for example about 1 h to 30 h, about 2 h to 30 h, about 4 h to 30 h, about 6 h to 30 h, about 8 h to 30 h, about 10 h to 30 h, about 12 h to 30 h, about 14 h to 30 h, about 16 h to 30 h, about 18 h to 30 h, about 20 h to 30 h, about 22 h to 30 h, about 24 h to 30 h, about 26 h to 30 h, about 28 h to 30 h, about 1 h to 28 h, about 2 h to 28 h, about 4 h to 28 h, about 6 h to 28 h, about 8 h to 28 h, about 10 h to 28 h, about 12 h to 28 h, about 14 h to 28 h, about 16 h to 28 h, about 18 h to 28 h, about 20 h to 28 h, about 22 h to 28 h, about 24 h to 28 h, about 26 h to 28 h, about 1 h to 26 h, about 2 h to 26 h, about 4 h to 26 h, about 6 h to 26 h, about 8 h to 26 h, about 10 h to 26 h, about 12 h to 26 h, about 14 h to 26 h, about 16 h to 26 h, about 18 h to 26 h, about 20 h to 26 h, about 22 h to 26 h, about 24 h to 26 h, about 1 h to 24 h, about 2 h to 24 h, about 4 h to 24 h, about 6 h to 24 h, about 8 h to 24 h, about 10 h to 24 h, about 12 h to 24 h, about 14 h to 24 h, about 16 h to 24 h, about 18 h to 24 h, about 20 h to 24 h, about 22 h to 24 h, about 1 h to 22 h, about 2 h to 22 h, about 4 h to 22 h, about 6 h to 22 h, about 8 h to 22 h, about 10 h to 22 h, about 12 h to 22 h, about 14 h to 22 h, about 16 h to 22 h, about 18 h to 22 h, about 20 h to 22 h, about 1 h to 20 h, about 2 h to 20 h, about 4 h to 20 h, about 6 h to 20 h, about 8 h to 20 h, about 10 h to 20 h, about 12 h to 20 h, about 14 h to 20 h, about 16 h to 20 h, about 18 h to 20 h, about 1 h to 18 h, about 2 h to 18 h, about 4 h to 18 h, about 6 h to 18 h, about 8 h to 18 h, about 10 h to 18 h, about 12 h to 18 h, about 14 h to 18 h, about 16 h to 18 h, about 1 h to 16 h, about 2 h to 16 h, about 4 h to 16 h, about 6 h to 16 h, about 8 h to 16 h, about 10 h to 16 h, about 12 h to 16 h, about 14 h to 16 h, about 1 h to 14 h, about 2 h to 14 h, about 4 h to 14 h, about 6 h to 14 h, about 8 h to 14 h, about 10 h to 14 h, about 12 h to 14 h, about 1 h to 12 h, about 2 h to 12 h, about 4 h to 12 h, about 6 h to 12 h, about 8 h to 12 h, about 10 h to 12 h, about 1 h to 10 h, about 2 h to 10 h, about 4 h to 10 h, about 6 h to 10 h, about 8 h to 10 h, about 1 h to 8 h, about 2 h to 8 h, about 4 h to 8 h, about 6 h to 8 h, about 1 h to 6 h, about 2 h to 6 h, about 4 h to 6 h, about 1 h to 4 h, about 2 h to 4 h, about 1 h to 2 h, about 1 h, about 2 h, about 4 h, about 6 h, about 8 h, about 10 h, about 12 h, about 14 h, about 16 h, about 18 h, about 20 h, about 22 h, about 24 h, about 26 h, about 28 h, about 30 h, or any value or range therebetween.

The carbon dots may be subsequently centrifuged to select a particular size range of carbon dots. To that end, the centrifugation may be performed at about 1000 rpm to about 15000 rpm, about 3000 rpm to about 15000 rpm, about 5000 rpm to about 15000 rpm, about 7000 rpm to about 15000 rpm, about 9000 rpm to about 15000 rpm, about 10000 rpm to about 15000 rpm, about 11000 rpm to about 15000 rpm, about 13000 rpm to about 15000 rpm, about 1000 rpm to about 13000 rpm, about 3000 rpm to about 13000 rpm, about 5000 rpm to about 13000 rpm, about 7000 rpm to about 13000 rpm, about 9000 rpm to about 13000 rpm, about 10000 rpm to about 13000 rpm, about 11000 rpm to about 13000 rpm, about 1000 rpm to about 11000 rpm, about 3000 rpm to about 11000 rpm, about 5000 rpm to about 11000 rpm, about 7000 rpm to about 11000 rpm, about 9000 rpm to about 11000 rpm, about 10000 rpm to about 11000 rpm, about 1000 rpm to about 10000 rpm, about 3000 rpm to about 10000 rpm, about 5000 rpm to about 10000 rpm, about 7000 rpm to about 10000 rpm, about 9000 rpm to about 10000 rpm, about 1000 rpm to about 9000 rpm, about 3000 rpm to about 9000 rpm, about 5000 rpm to about 9000 rpm, about 7000 rpm to about 9000 rpm, about 1000 rpm to about 9000 rpm, about 3000 rpm to about 9000 rpm, about 5000 rpm to about 9000 rpm, about 7000 rpm to about 9000 rpm, about 1000 rpm to about 7000 rpm, about 3000 rpm to about 7000 rpm, about 5000 rpm to about 7000 rpm, about 1000 rpm to about 5000 rpm, about 3000 rpm to about 5000 rpm, about 1000 rpm to about 3000 rpm, about 1000 rpm, about 3000 rpm, about 5000 rpm, about 7000 rpm, about 9000 rpm, about 10000 rpm, about 11000 rpm, about 13000 rpm, about 15000 rpm, or any value or range therebetween.

The centrifugation may be performed for about 1 minute to about 20 minutes, about 2 minutes to about 20 minutes, about 3 minutes to about 20 minutes, about 4 minutes to about 20 minutes, about 5 minutes to about 20 minutes, about 6 minutes to about 20 minutes, about 7 minutes to about 20 minutes, about 8 minutes to about 20 minutes, about 9 minutes to about 20 minutes, about 10 minutes to about 20 minutes, about 11 minutes to about 20 minutes, about 12 minutes to about 20 minutes, about 13 minutes to about 20 minutes, about 14 minutes to about 20 minutes, about 15 minutes to about 20 minutes, about 16 minutes to about 20 minutes, about 17 minutes to about 20 minutes, about 18 minutes to about 20 minutes, about 19 minutes to about 20 minutes, about 1 minute to about 19 minutes, about 1 minute to about 18 minutes, about 1 minute to about 17 minutes, about 1 minute to about 16 minutes, about 1 minute to about 15 minutes, about 1 minute to about 14 minutes, about 1 minute to about 13 minutes, about 1 minute to about 12 minutes, about 1 minute to about 11 minutes, about 1 minute to about 10 minutes, about 1 minute to about 9 minutes, about 1 minute to about 8 minutes, about 1 minute to about 7 minutes, about 1 minute to about 6 minutes, about 1 minute to about 5 minutes, about 1 minute to about 4 minutes, about 1 minute to about 3 minutes, about 1 minute to about 2 minutes, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, or any value or range therebetween.

The carbon dots may be obtained by filtering the crude mixture. The filtration may be performed by micro-filtration or macro-filtration.

The carbon dots may have an average diameter of about 1 nm to about 250 nm, about 2 nm to about 250 nm, about 3 nm to about 250 nm, about 4 nm to about 250 nm, about 5 nm to about 250 nm, about 10 nm to about 250 nm, about 20 nm to about 250 nm, about 40 nm to about 250 nm, about 60 nm to about 250 nm, about 80 nm to about 250 nm, about 100 nm to about 250 nm, about 120 nm to about 250 nm, about 140 nm to about 250 nm, about 160 nm to about 250 nm, about 180 nm to about 250 nm, about 200 nm to about 250 nm, about 220 nm to about 250 nm, about 240 nm to about 240 nm, about 1 nm to about 240 nm, about 2 nm to about 240 nm, about 3 nm to about 240 nm, about 4 nm to about 240 nm, about 5 nm to about 240 nm, about 10 nm to about 240 nm, about 20 nm to about 240 nm, about 40 nm to about 240 nm, about 60 nm to about 240 nm, about 80 nm to about 240 nm, about 100 nm to about 240 nm, about 120 nm to about 240 nm, about 140 nm to about 240 nm, about 160 nm to about 240 nm, about 180 nm to about 240 nm, about 200 nm to about 240 nm, about 220 nm to about 240 nm, about 1 nm to about 220 nm, about 2 nm to about 220 nm, about 3 nm to about 220 nm, about 4 nm to about 220 nm, about 5 nm to about 220 nm, about 10 nm to about 220 nm, about 20 nm to about 220 nm, about 40 nm to about 220 nm, about 60 nm to about 220 nm, about 80 nm to about 220 nm, about 100 nm to about 220 nm, about 120 nm to about 220 nm, about 140 nm to about 220 nm, about 160 nm to about 220 nm, about 180 nm to about 220 nm, about 200 nm to about 220 nm, about 1 nm to about 200 nm, about 2 nm to about 200 nm, about 3 nm to about 200 nm, about 4 nm to about 200 nm, about 5 nm to about 200 nm, about 10 nm to about 200 nm, about 20 nm to about 200 nm, about 40 nm to about 200 nm, about 60 nm to about 200 nm, about 80 nm to about 200 nm, about 100 nm to about 200 nm, about 120 nm to about 200 nm, about 140 nm to about 200 nm, about 160 nm to about 200 nm, about 180 nm to about 200 nm, about 1 nm to about 180 nm, about 2 nm to about 180 nm, about 3 nm to about 180 nm, about 4 nm to about 180 nm, about 5 nm to about 180 nm, about 10 nm to about 180 nm, about 20 nm to about 180 nm, about 40 nm to about 180 nm, about 60 nm to about 180 nm, about 80 nm to about 180 nm, about 100 nm to about 180 nm, about 120 nm to about 180 nm, about 140 nm to about 180 nm, about 160 nm to about 180 nm, about 1 nm to about 160 nm, about 2 nm to about 160 nm, about 3 nm to about 160 nm, about 4 nm to about 160 nm, about 5 nm to about 160 nm, about 10 nm to about 160 nm, about 20 nm to about 160 nm, about 40 nm to about 160 nm, about 60 nm to about 160 nm, about 80 nm to about 160 nm, about 100 nm to about 160 nm, about 120 nm to about 160 nm, about 140 nm to about 160 nm, about 1 nm to about 140 nm, about 2 nm to about 140 nm, about 3 nm to about 140 nm, about 4 nm to about 140 nm, about 5 nm to about 140 nm, about 10 nm to about 140 nm, about 20 nm to about 140 nm, about 40 nm to about 140 nm, about 60 nm to about 140 nm, about 80 nm to about 140 nm, about 100 nm to about 140 nm, about 120 nm to about 140 nm, about 1 nm to about 120 nm, about 2 nm to about 120 nm, about 3 nm to about 120 nm, about 4 nm to about 120 nm, about 5 nm to about 120 nm, about 10 nm to about 120 nm, about 20 nm to about 120 nm, about 40 nm to about 120 nm, about 60 nm to about 120 nm, about 80 nm to about 120 nm, about 100 nm to about 120 nm, about 1 nm to about 100 nm, about 2 nm to about 100 nm, about 3 nm to about 100 nm, about 4 nm to about 100 nm, about 5 nm to about 100 nm, about 10 nm to about 100 nm, about 20 nm to about 100 nm, about 40 nm to about 100 nm, about 60 nm to about 100 nm, about 80 nm to about 100 nm, about 1 nm to about 80 nm, about 2 nm to about 80 nm, about 3 nm to about 80 nm, about 4 nm to about 80 nm, about 5 nm to about 80 nm, about 10 nm to about 80 nm, about 20 nm to about 80 nm, about 40 nm to about 80 nm, about 60 nm to about 80 nm, about 1 nm to about 60 nm, about 2 nm to about 60 nm, about 3 nm to about 60 nm, about 4 nm to about 60 nm, about 5 nm to about 60 nm, about 10 nm to about 60 nm, about 20 nm to about 60 nm, about 40 nm to about 60 nm, about 1 nm to about 40 nm, about 2 nm to about 40 nm, about 3 nm to about 40 nm, about 4 nm to about 40 nm, about 5 nm to about 40 nm, about 10 nm to about 40 nm, about 20 nm to about 40 nm, about 1 nm to about 20 nm, about 2 nm to about 20 nm, about 3 nm to about 20 nm, about 4 nm to about 20 nm, about 5 nm to about 20 nm, about 10 nm to about 20 nm, about 1 nm to about 10 nm, about 2 nm to about 10 nm, about 3 nm to about 10 nm, about 4 nm to about 10 nm, about 5 nm to about 10 nm, about 1 nm to about 5 nm, about 2 nm to about 5 nm, about 3 nm to about 5 nm, about 4 nm to about 5 nm, about 1 nm to about 4 nm, about 2 nm to about 4 nm, about 3 nm to about 4 nm, about 1 nm to about 3 nm, about 2 nm to about 3 nm, about 1 nm to about 2 nm, about 1 nm, about 2 nm, about 3 nm, about 4 nm, about 5 nm, about 10 nm, about 20 nm, about 40 nm, about 60 nm, about 80 nm, about 100 nm, about 120 nm, about 140 nm, about 160 nm, about 180 nm, about 200 nm, about 220 nm, about 240 nm, about 250 nm, or any range or value therebetween. The carbon dots may have an average diameter of about 3 nm to about 200 nm.

The carbon dots of the present invention may be easily purified in high yield, of about 60% to 100%, about 65% to 100%, about 66% to 100%, about 70% to 100%, about 75% to 100%, about 80% to 100%, about 85% to 100%, about 90% to 100%, about 94% to 100%, about 95% to 100%, about 60% to 95%, about 65% to 95%, about 66% to 95%, about 70% to 95%, about 75% to 95%, about 80% to 95%, about 85% to 95%, about 90% to 95%, about 94% to 95%, about 60% to 94%, about 65% to 94%, about 66% to 94%, about 70% to 94%, about 75% to 94%, about 80% to 94%, about 85% to 94%, about 90% to 94%, about 60% to 90%, about 65% to 90%, about 66% to 90%, about 70% to 90%, about 75% to 90%, about 80% to 90%, about 85% to 90%, about 60% to 85%, about 65% to 85%, about 66% to 85%, about 70% to 85%, about 75% to 85%, about 80% to 85%, about 60% to 80%, about 65% to 80%, about 66% to 80%, about 70% to 80%, about 75% to 80%, about 60% to 75%, about 65% to 75%, about 66% to 75%, about 70% to 75%, about 60% to 70%, about 65% to 70%, about 66% to 70%, about 60% to 66%, about 65% to 66%, about 60%, about 65%, about 66%, about 70%, about 75%, about 80%, about 85%, about 90%, about 94%, about 95%, about 96%, about 97%, about 98%, about 99%, about 100%, about 60% to 96%, about 65% to 96%, about 66% to 96%, about 70% to 96%, about 75% to 96%, about 80% to 96%, about 85% to 96%, about 90% to 96%, about 95% to 96%, about 60% to 97%, about 65% to 97%, about 66% to 97%, about 70% to 97%, about 75% to 97%, about 80% to 97%, about 85% to 97%, about 90% to 97%, about 94% to 97%, about 95% to 97%, about 96% to 97%, about 60% to 98%, about 65% to 98%, about 66% to 98%, about 70% to 98%, about 75% to 98%, about 80% to 98%, about 85% to 98%, about 90% to 98%, about 94% to 98%, about 95% to 98%, about 96% to 98%, about 97% to 98%, about 60% to 99%, about 65% to 99%, about 66% to 99%, about 70% to 99%, about 75% to 99%, about 80% to 99%, about 85% to 99%, about 90% to 99%, about 94% to 99%, about 95% to 99%, about 96% to 99%, about 97% to 99%, about 98% to 99%, or any value or range therebetween.

The carbon dot may be an iron-doped carbon dot, copper-doped carbon dot, or a zinc-iron co-doped carbon dot.

The carbon dots may be effective at inhibiting the growth of bacteria. Such bacteria may be harmful to plants. By being effective at inhibiting the growth of such bacteria, the carbon dots of the present invention advantageously promote plant growth.

Bacteria that are harmful to plants may be from the genus *Xanthomonas, Pseudomonas*, or *Ralstonia*. For example, *Xanthomonas campestris* pv. *campestris* 8004 causes necrotic lesions and black rot symptoms among different species of crucifers. *Pseudomonas syringae* pv. tomato DC3000 is a species that commonly infects tomato but also is also a natural pathogen of *Arabidopsis* commonly used to investigate molecular mechanisms underlying plant-pathogen interactions. *Ralstonia solanacearum* GMI1000 is a soilborne pathogen that causes bacterial wilt of tomato and also pathogenic on the model plant *Arabidopsis*.

Hence, the present disclosure relates to carbon dots which are effective in killing bacteria from the genus *Xanthomonas, Pseudomonas*, or *Ralstonia*. The present disclosure relates to carbon dots which are effective in killing *Xanthomonas campestris* pv. *campestris* 8004, *Pseudomonas syringae* pv. tomato DC3000, or *Ralstonia solanacearum* GMI1000.

The present disclosure also relates to a method for promoting plant growth, comprising subjecting at least one part of a plant to a carbon dot, wherein the carbon dot is doped with one or more doping material selected from the group consisting of plant macronutrients, plant micronutrients, and drug molecules; and wherein the doping material is conjugated within and on the surface of the carbon dot, wherein the carbon dot is a carbon dot doped with iron, copper and/or zinc; and the carbon dot is formed by an in situ hydrothermal process of carbonization of a carbon source in the presence of metal ions selected from the group consisting of iron, copper and zinc ions, wherein during the process, the carbon source and metal ions form carbon dots that contain iron, copper and/or zinc ions conjugated within and on the surface of the carbon dots.

The carbon dots may be iron-doped, copper-doped or zinc-iron co-doped carbon dots.

EXAMPLES

Non-limiting examples of the invention and comparative examples will be further described in greater detail by reference to specific examples, which should not be construed as in any way limiting the scope of the invention.

Materials and Characterization Methods

All the chemical reagents, ethylenediaminetetraacetic acid (EDTA), ethylenediaminetetraacetic acid ferric sodium salt, $FeSO_4$, $FeCl_2$ and $FeCl_3$ (also referred to as Fe(II) and Fe(III) fertilizer below) were purchased from Sigma-Aldrich and were used without further purification. Spectra/Por 6 Standard Regenerated Cellulose (RC) Dialysis Tubing with cutoff molecular weight of 2 KD was purchased from VWR International GmbH and was used in the iron release study. The UV-visible spectrums were measured with a Perkin Elmer Lambda 750 UV-vis spectrophotometer, while the Fourier-Transform infrared (FTIR) spectrums were obtained with a Varian Spectrum GX spectrometer. The photoluminescence (PL) was determined with a Horiba Jobin Yvon (FluoroMax 4) Luminescence Spectrometer. X-ray Photoelectron Spectroscopy (XPS) spectrums were measured by KRATOS Axis ultra-DLD X-ray photoelectron spectrometer using Mg Kα X-ray (hv=1283.3 eV). The particle size and zeta potential of carbon dot nanoparticles were characterized by a ZEN3690 zetasizer (Malvern, U.K.). Transmission electron microscopy (TEM) and high-resolution transmission electron microscopy (HRTEM) images were collected using a TEM Jeol 2010 UHR (200 kV). The iron content in dried plant tissue was quantified using Inductively Coupled Plasma-Optical Emission Spectrometry (ICP-OES).

Example 1. Synthesis of Carbon Dots (CD), Iron-Doped Carbon Dots (FeCD), Fe/Zn—Co-Doped Carbon Dots (FeZnCD) and Copper-Doped Carbon Dots (CuCD)

The carbon dots of the present invention may be prepared using different carbon sources. In principle, any material containing carbon such as conventional chemicals, biomass (jellyfish, human hair/digested hair, plastic waste), food waste, etc. are suitable as carbon sources. Similarly, any methods that are routinely applied in the generation of carbon dots such as microwave, hydrothermal, electrochemical oxidation, plasma treatment, arc discharge, thermal decomposition, chemical oxidation, laser ablation, ultrasonic treatment, templated routes etc. may also be used in carbon dot synthesis. Any nutrients required by plants such as Fe, Zn, Mg, Ca, Cu, Mn, B, Si, etc. or any combination of those listed can be used in the doping of the carbon dots. The carbon source and nutrients may coexist in the same starting material, or they may also be different starting materials.

FeCDs, ZnCDs, FeZnCDs and CuCDs were prepared by a one-step hydrothermal method. The product is easily purified and isolated in high yield which makes the preparation scalable.

Methods of forming the carbon dots of the present invention are outlined below.

To form the undoped CDs, 0.6 g of ethylenediaminetetraacetic acid (EDTA) was dispersed in 50 ml of deionised water. The solution was then transferred to a 100 ml Teflon-lined stainless steel autoclave. After heating at 200° C. for 10 hours, the solution was cooled to room temperature naturally, and subsequently centrifuged at 10000 rpm for 10 minutes. The precipitate was discarded and the pH value of the supernatant was adjusted to 6.5-7.0. The final solution (yield=94%) was then kept for further characterisation and testing.

To form the FeCDs, 0.6 g of ethylenediaminetetraacetic acid ferric sodium salt was dispersed in 50 mL of deionized water. The dispersion was transferred into a 100 mL Teflon-lined stainless steel autoclave. After heating at 200° C. for 10 hours, the FeCD solution was allowed to cool down to room temperature naturally and the solution was subsequently centrifuged at 10,000 rpm for 10 minutes. The precipitate was discarded, and the pH value of the supernatant solution was measured and adjusted to 6.5-7.0. The overall yield of FeCD is 91%.

To form the ZnCDs, 0.6 g of ethylenediaminetetraacetic acid (EDTA) and 0.2 g of $ZnCl_2$ were dissolved in 50 mL of deionized water. The solution was transferred into a 100 mL Teflon-lined stainless steel autoclave. After heating at 200° C. for 10 hours, the ZnCD solution allowed to cool down to room temperature naturally and the solution was subsequently centrifuged at 10000 rpm for 10 minutes. The precipitate was discarded, and the pH value of the supernatant solution was measured and adjusted to 6.5-7.0. The pH-adjusted solution was kept for further characterization. (yield: 89%).

To form the CuCDs, 0.6 g of ethylenediaminetetraacetic acid copper sodium salt was dissolved in 50 mL of deionized water. The solution was transferred into a 100 mL Teflon-lined stainless steel autoclave. After heating at 200° C. for 10 hours, the CuCD solution allowed to cool down to room temperature naturally and the solution was subsequently centrifuged at 10000 rpm for 10 minutes. The precipitate was discarded, and the pH value of the supernatant solution was measured and adjusted to 6.5-7.0. The pH-adjusted solution was kept for further characterization. (yield: 86%). To form the FeZnCDs, 0.7 g of ethylenediaminetetraacetic acid (EDTA) was dispersed in 50 ml of dionised water, after which 0.55 g of FeCl3·6H2O and 0.09 g ZnCl2 were introduced. The solution was then transferred to a 100 l Teflon-lined stainless steel autoclave. After heating at 200° C. for 10 h, the FeZnCD solution was cooled to room temperature and subsequently centrifuged at 10000 rpm for 10 mins. The precipitate was discarded, and the pH of the supernatant adjusted to ~6.0. The final solution (yield=66%) was kept for further characterisation and testing.

Example 2. Characterisation of Synthesised Undoped/Doped Carbon Dots

The structures of produced CDs, FeCDs, FeZnCDs, and CuCDs were verified by Transmission Electron Microscopy (TEM), Fourier-Transform Infrared Spectroscopy (FT-IR), UV-Vis and photoluminescence spectroscopy.

Figure 9A:
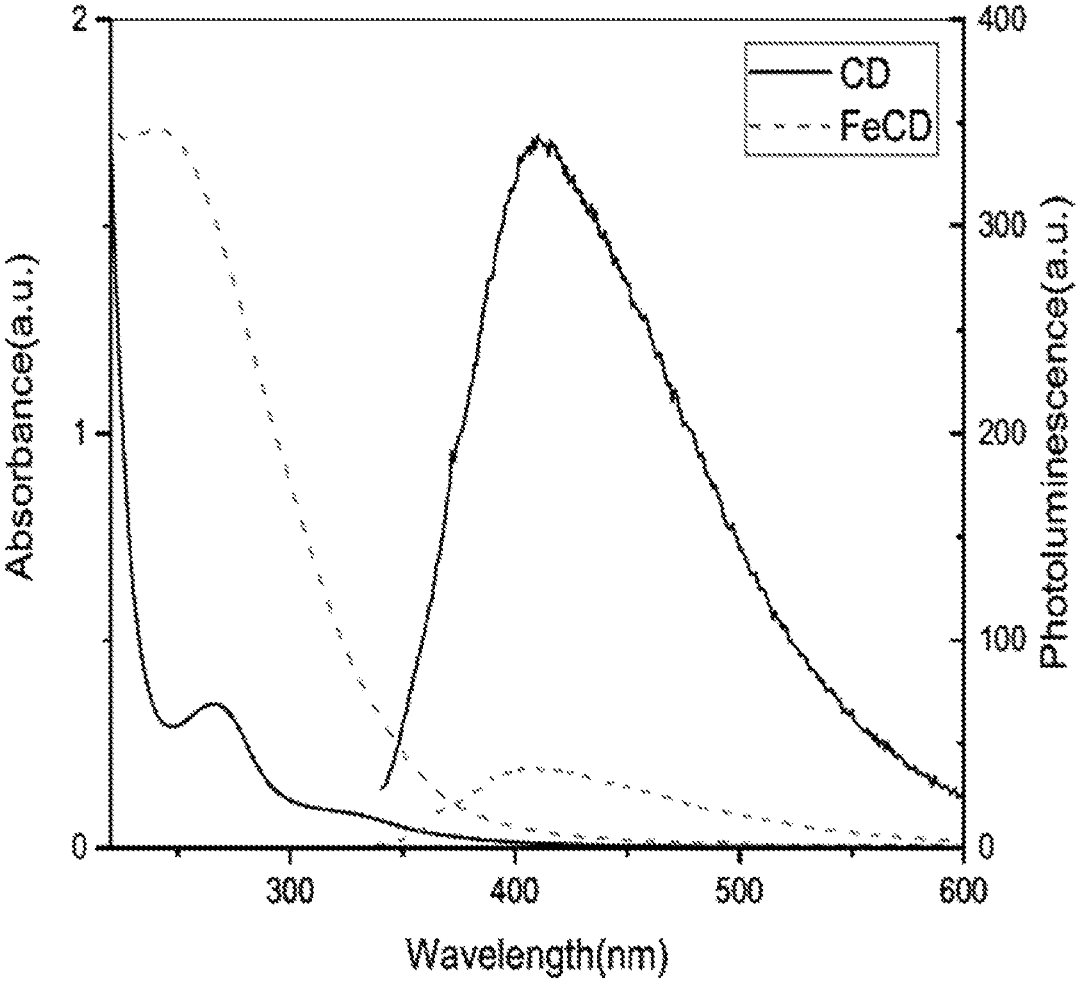
FIG. 9*a* shows the UV-Vis and photoluminescence (excitation 330 nm) spectra of CD and FeCD solutions (0.5 mg/ml).

Carbon dots are emissive by nature, thus generation of CD (in bold lines) and FeCD (in dashed lines) were confirmed by UV-Vis absorption spectra as well as photoluminescence spectra of CD and FeCD at excitation wavelength of 330 nm as shown in FIG. 9*a*. Similarly generated carbon dots can exhibit photoluminescence because of the generation of somewhat aromatic structures. It can be observed that the metal ions present in the FeCDs quench the photoluminescence from the reduced intensity relative to the normal CDs.

Figure 10A:
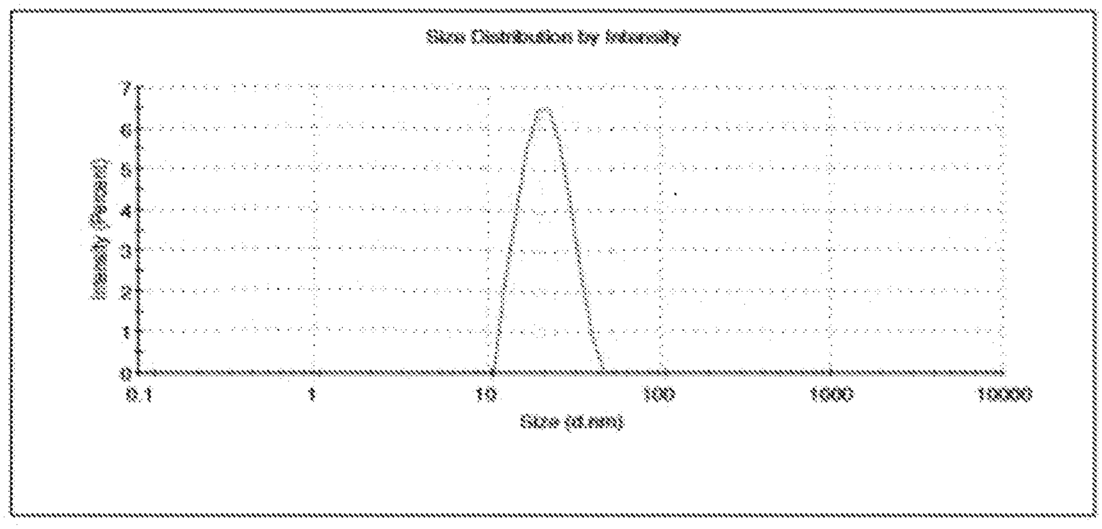
FIG. 10*a* shows the Dynamic Light Scattering (DLS) spectrum of synthesised CD.
Figure 10B:
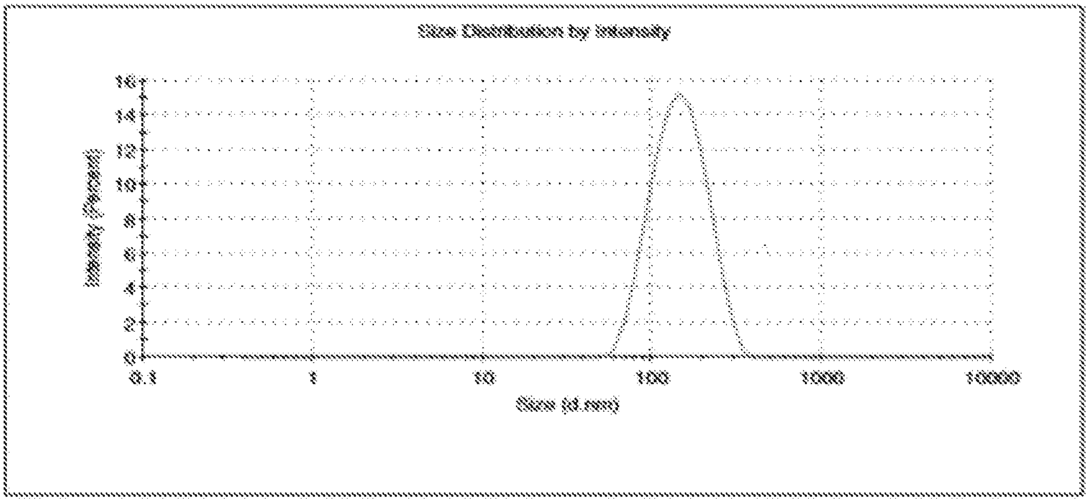
FIG. 10*b* shows the DLS spectrum of synthesised FeCD.
Figure 13A:
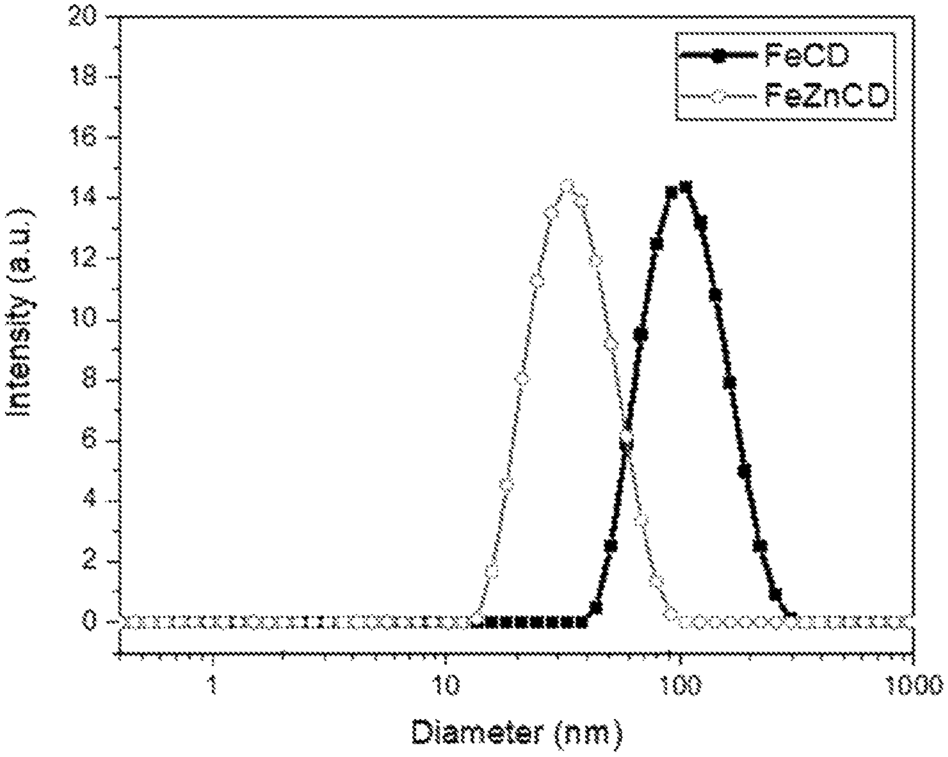
FIG. 13*a* shows the superimposed DLS spectra of FeZnCD and FeCD.

The generation of CDs, FeCDs, CuCDs, and FeZnCD were further confirmed by TEM images, as shown in FIGS. 1*a* to 1*d*. The TEM images suggest that the size of the produced un-doped CDs to be about 2 to 20 nm, FeCDs to be around 10 nm, and FeZnCD to about 5 to about 40 nm, with slight aggregation due to relative low surface charge density. The size of CDs and cluster formation of FeCD were verified by Dynamic light scattering (DLS) with the tested diameters of ~21 nm and ~127 nm respectively (FIGS. 10*a* and 10*b*). The size of the synthesised FeZnCDs was also verified by DLS spectrums as shown in FIG. 13*a*. The results of FIGS. 10*a* and 10*b* are shown in Tables 1a and 1b, respectively.

TABLE 1a

| | | | Size (d.nm) | % Intensity | St Dev (d.nm) |
|---|---|---|---|---|---|
| Z-Average (d.nm): | 21.19 | Peak 1: | 195.5 | 62.2 | 109.4 |
| PdI: | 0.482 | Peak 2: | 1.110 | 37.8 | 0.3370 |
| Intercept: | 0.147 | Peak 3: | 0.000 | 0.0 | 0.000 |

TABLE 1b

| | | | Size (d.nm) | % Intensity | St Dev (d.nm) |
|---|---|---|---|---|---|
| Z-Average (d.nm): | 127.3 | Peak 1: | 151.3 | 100.00 | 53.43 |
| PdI: | 0.141 | Peak 2: | 0.000 | 0.0 | 0.000 |
| Intercept: | 0.975 | Peak 3: | 0.000 | 0.0 | 0.000 |

Figure 9B:
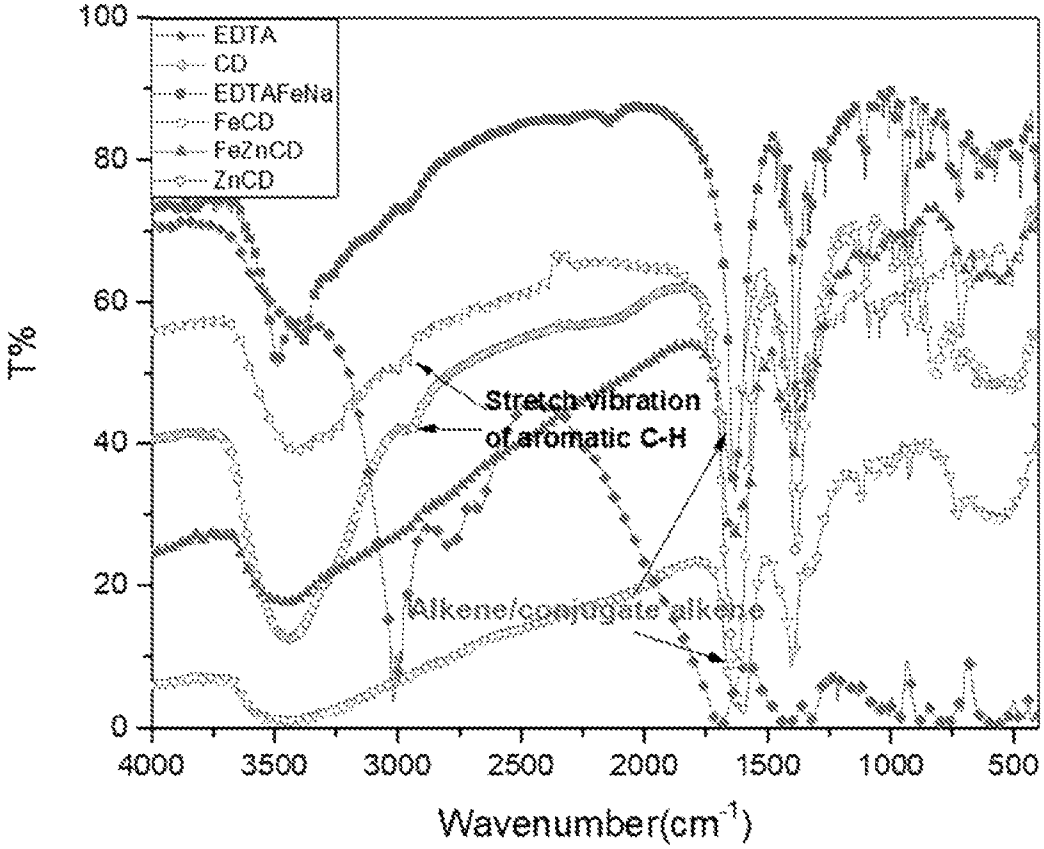
FIG. 9*b* shows the Fourier-Transform Infrared Spectroscopy (FT-IR) spectra of CD, FeCD, FeZnCD, ZnCD, and starting materials ethylenediaminetetraacetic acid (EDTA) and ethylenediaminetetraacetic acid ferric sodium salt (EDTAFeNa).
Figure 13B:
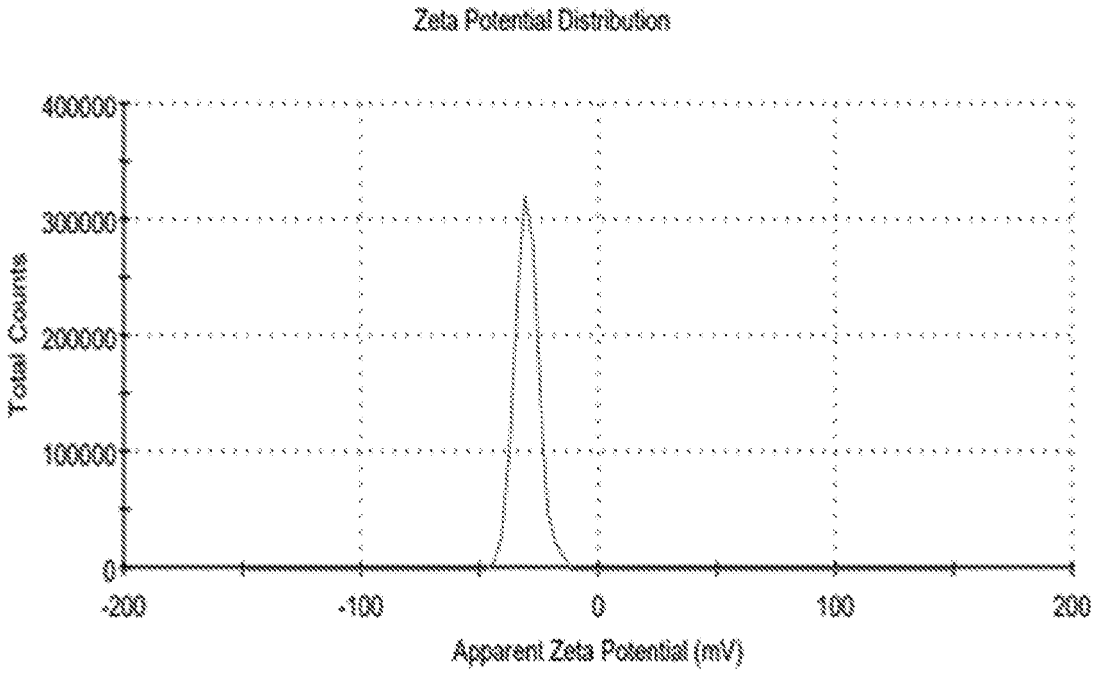
FIG. 13*b* shows the Zeta potential of FeCD.

The generation of CDs and FeCDs were additionally confirmed from the presence of stretching peaks of C═C around 1700 $cm^{-1}$ and aromatic stretch peaks of C—H around 3000 $cm^{-1}$ in their FT-TR spectrums (FIG. 9*b*). The results of FIG. 13*b* are shown in Table 2.

TABLE 2

| | Zeta Potential (mV) |
|---|---|
| Undoped carbon dots | −45.9 |
| Fe-doped carbon dots | −34.2 |
| Fe-Zn-co-doped carbon dots | +14.2 |
| Cu-doped carbon dots | −45.9 |

Figure 11A:
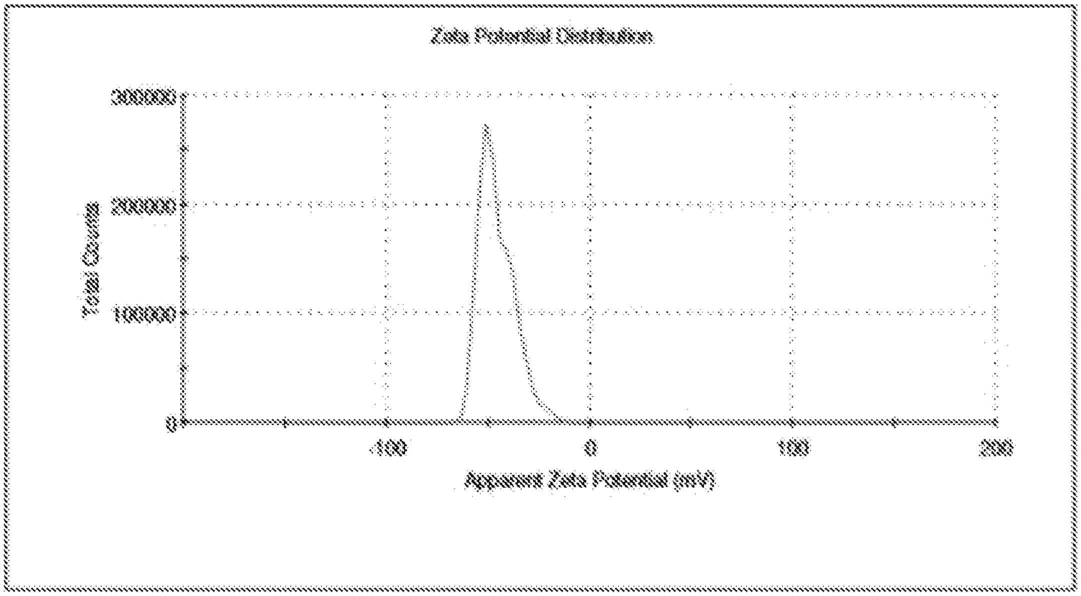
FIG. 11*a* shows the Zeta potential spectrum of synthesised CD.
Figure 11B:
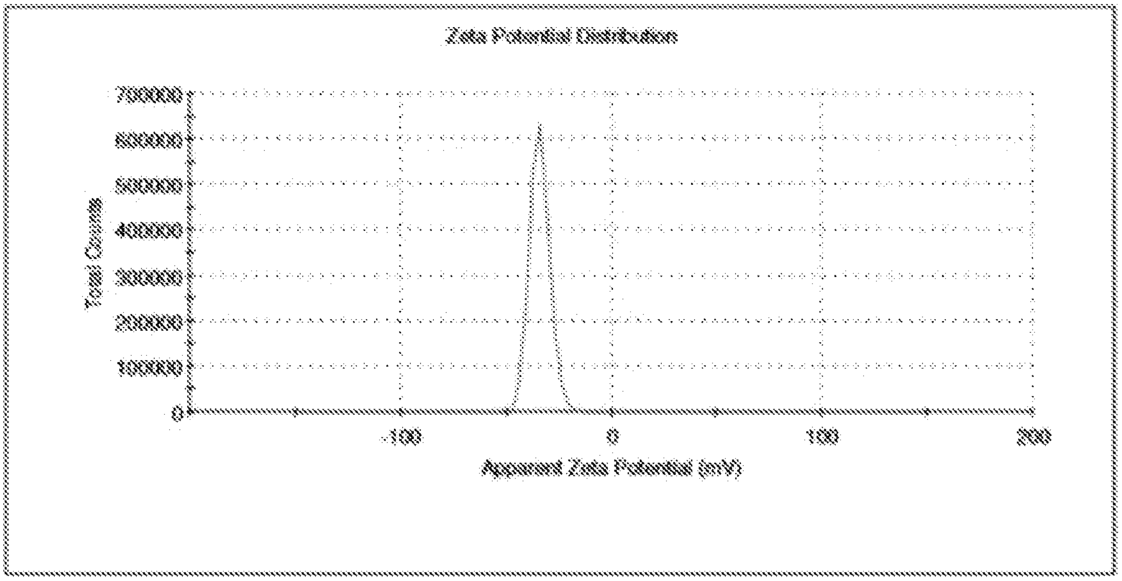
FIG. 11*b* shows the Zeta potential spectrum of synthesised FeCD.
Figure 13C:
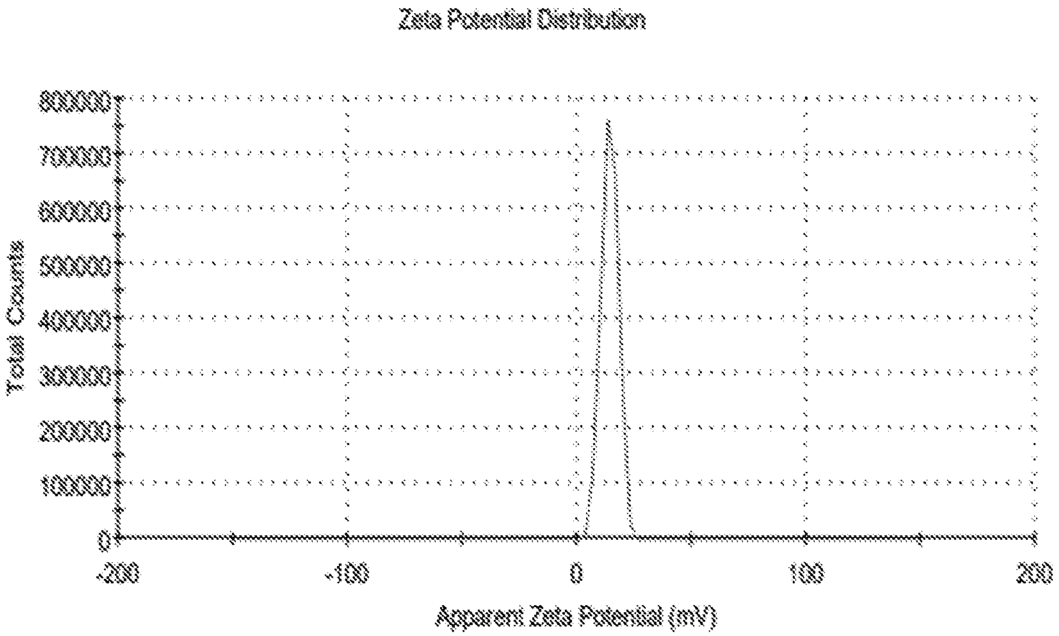
FIG. 13*c* shows the Zeta potential of FeZnCD.

Zeta potentials were similarly measured for CDs and FeCDs (FIGS. 11*a* and 11*b*). Zeta potentials were similarly measured for FeZnCDs as shown in FIG. 13*c*. The results of FIGS. 11*a* and 11*b* are shown in Tables 3a and 3b, respectively. The iron/zinc/copper content of FeCD, FeZnCD and CuCD is shown in Table 4.

TABLE 3a

| | | | Mean (mV) | Area (%) | St Dev (mV) |
|---|---|---|---|---|---|
| Zeta Potential (mV): | −45.9 | Peak 1: | −45.9 | 100.00 | 8.75 |
| Zeta Deviation (mV) | 8.75 | Peak 2: | 0.000 | 0.0 | 0.000 |
| Conductivity (mS/cm) | 0.0242 | Peak 3: | 0.000 | 0.0 | 0.000 |

TABLE 3b

| | | | Mean (mV) | Area (%) | St Dev (mV) |
|---|---|---|---|---|---|
| Zeta Potential (mV): | −34.2 | Peak 1: | −34.2 | 100.00 | 4.74 |
| Zeta Deviation (mV) | 4.74 | Peak 2: | 0.000 | 0.0 | 0.000 |
| Conductivity (mS/cm) | 2.32 | Peak 3: | 0.000 | 0.0 | 0.000 |

TABLE 4

Iron/zinc/copper content of FeCD. FeZnCD and CuCD

| | Iron Content (wt %) | Zinc Content (wt %) | Copper Content (wt %) |
|---|---|---|---|
| Iron-doped carbon dots (FeCDs) | 13.5 | — | — |
| Iron-Zinc-co-doped carbon dots (FeZnCDs) | 9.82 | 7.2 | — |
| Copper-doped carbon dots (CuCD) | — | — | 21.3 |

Figure 2A:
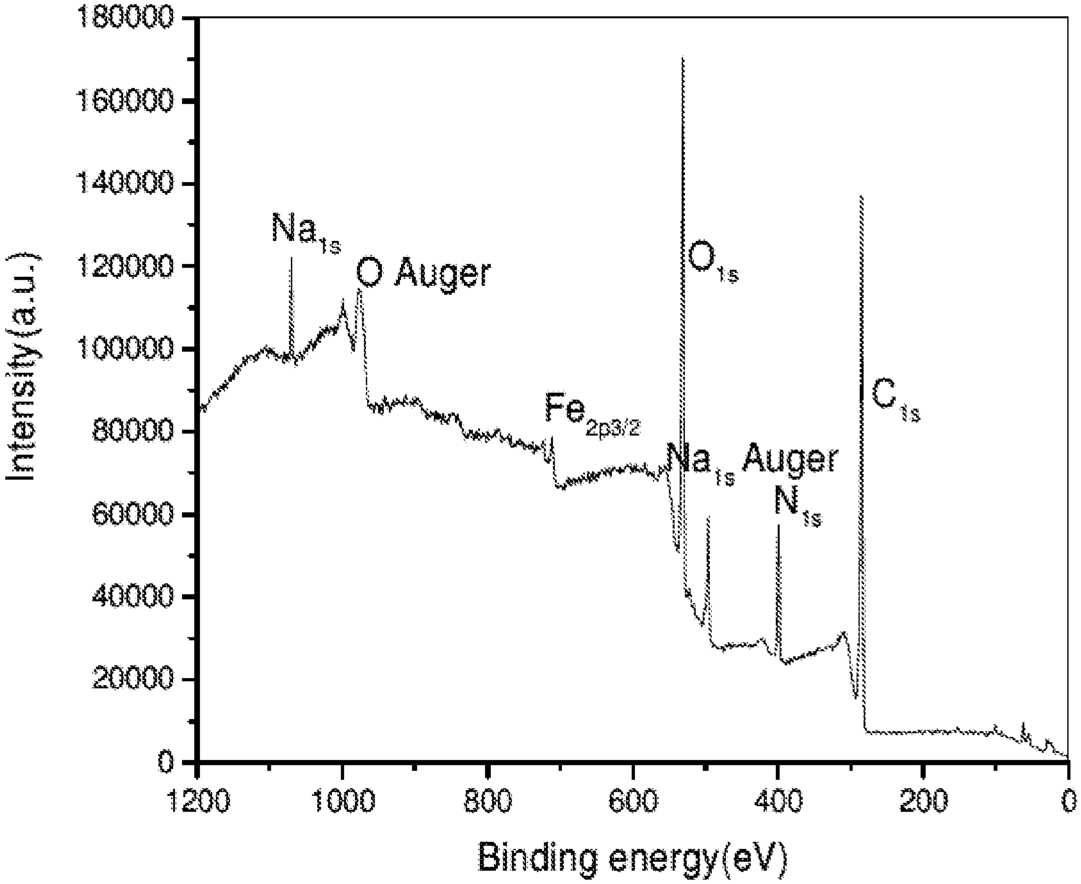
FIG. 2*a* shows the X-ray photoelectron Spectroscopy (XPS) spectrum of synthesised iron-doped carbon dots (FeCD).
Figure 2B:
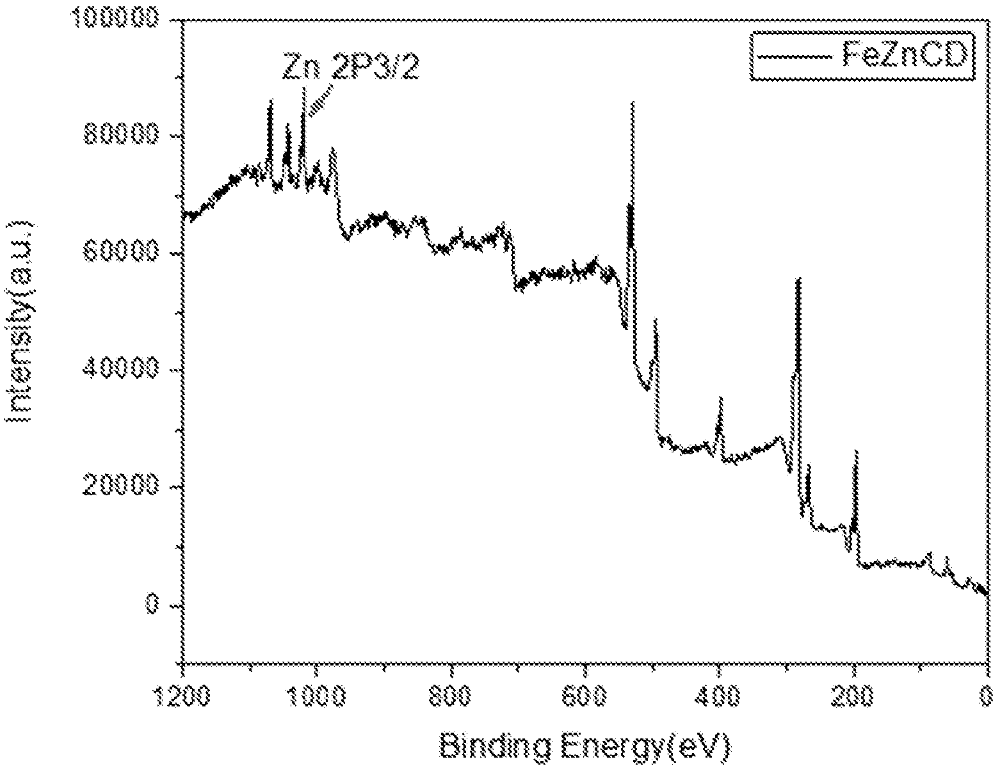
FIG. 2*b* shows the XPS spectrum of synthesised iron-zinc-doped carbon dots (FeZnCD).

Iron incorporation was verified by XPS spectroscopy as shown in FIGS. 2*a* and 2*b* and the iron content in the product was quantified by ICP-OES.

Example 3. In Vitro Iron Release Study

The in vitro release profile of $Fe^{3+}$ from FeCDs was investigated with inductively coupled plasma optical emission spectrometry (ICP-OES; ICAP6300, Thermo Scientific, Waltham, MA, USA). To do so, 8 mg of FeCD solution (pH 6.2) was placed in a dialysis tubing with a cutoff molecular weight of 2 kD. The dialysis tubing with FeCD solution inside was placed in a beaker filled with 200 mL of DI water (pH 5.8) with constant stirring. After designated time (30 mins, 60 mins, 120 mins, 240 mins, 480 mins and 1440 mins), 5 mL of the outside solution was taken for iron quantification by ICP-OES.

TABLE 5

| Duration (min) | Percentage of total iron content released (%) (FeCD) |
|---|---|
| 30 | 1.66 |
| 60 | 3.11 |
| 120 | 6.48 |
| 240 | 9.74 |
| 480 | 14.46 |
| 1440 | 21.73 |

Figure 2C:
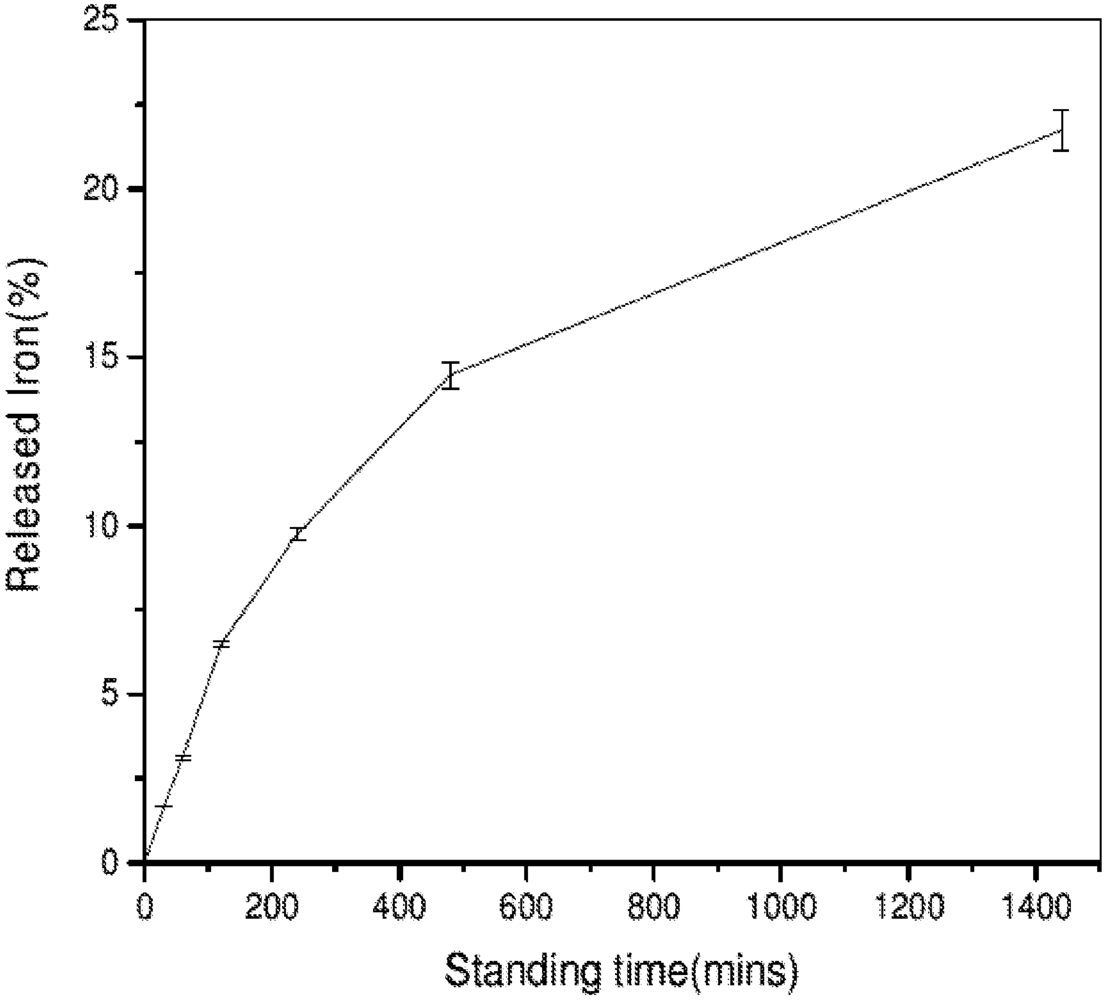
FIG. 2*c* is a graph showing an in vitro release profile of iron of the iron-doped carbon dots (FeCD).

The results from the time-dependent experiments are shown in FIG. 2*c* and Table 5. The iron content in the starting materials was calculated from its molecular formula ($C_{10}H_{12}N_2NaFeO_8$) and the iron content in the produced FeCD was determined (by ICP-OES) to be ~13.5 wt % as contrast to ~15.2 wt % (by calculation) in its starting materials. The release profile shown in FIG. 2*b* suggests that most of the iron release happens in the first 6 hours with about 15% of the total iron content released.

Example 4. Plant Study

The effect of FeCD on plant growth was investigated with *Arabidopsis*/alfalfa/Lettuce as plant models with the growth media as agar/hydroponic/soil respectively.

Seeds of *Arabidopsis* (*Arabidopsis thaliana*) ecotype Columbia-0 (Col-0) were surface sterilized with 20% (v/v) bleach and 0.02% (v/v) Triton X-100. Seeds were germinated on modified $\%_2$ strength Murashige-Skoog agar medium containing 1% (w/v) sucrose and 0.8% (w/v) agar (Sigma-Aldrich A1296). Various levels of iron deficiency conditions were simulated by either removing or incorporating less amount of the nutrients. In addition, carbon dots (CDs) and FeCD were added into the agar medium either as supplement or as replacement of related nutrients. To analyze the root growth, seeds were sown on ½ MS agar plates and grown vertically under long-day conditions with 16-h light/8-h dark photoperiods at 22° C. Plant growth was evaluated by root lengths and fresh weight. Digital images of plates were scanned with Epson Perfection V600 Photo Scanner. Standard deviations were shown as error bars for data sets. Experimental data were calculated by Analysis OF Variance (ANOVA) to investigate the statistical difference. Photos of the *Arabidopsis* seedlings after 10 days of treatment may be found in FIG. 3*a*.

Alfalfa seeds with nearly equal sizes were soaked in DI water overnight. The soaked seeds were washed three times with DI water and drained before treatment. For each treatment, 30 seeds were put in a 10 mL glass sample vial and 0.2 mL of fertilizer solution was introduced in the sample vial (with alfalfa seeds). Fertilizers employed in this study included different concentrations of FeCD solution (2, 1, 0.5, 0.25, 0.125, and 0.0625 mg/mL), CD solution (1.73, 0.865, 0.43, 0.22, 0.11, 0.055 mg/mL), $FeCl_2$ solution (0.96, 0.48, 0.24, 0.12, 0.06 and 0.03 mg/mL in the form of $FeCl_2 \cdot 2H_2O$) and $FeCl_3$ solution (0.78, 0.39, 0.195, 0.098, 0.049 and 0.025 mg/mL) (Table 6). Iron content in different solutions were kept the same for all iron fertilizers. In a control experiment, alfalfa seedlings were cultivated using DI water. 0.1 mL of DI water was added to each treatment every day before harvest. The sample vials were put on the laboratory bench at about 25° C. The alfalfa sprouts were harvested after a week of treatment. Photos of the alfalfa seedlings after 1 week of treatment may be found in FIG. 3*c*.

TABLE 6

| No. | FeCD (mg/mL) | CD (mg/mL) | $FeCl_2$ (mg/mL in the form of $FeCl_2 \cdot 2H_2O$) | $FeCl_3$ (mg/mL) |
|---|---|---|---|---|
| I | 2 | 1.73 | 0.96 | 0.78 |
| II | 1 | 0.865 | 0.48 | 0.39 |
| III | 0.5 | 0.43 | 0.24 | 0.195 |
| IV | 0.25 | 0.22 | 0.12 | 0.098 |
| V | 0.125 | 0.11 | 0.06 | 0.049 |
| VI | 0.0625 | 0.055 | 0.03 | 0.025 |

Lettuce seeds were germinated in ½ MS agar plate and grown for about a week. The seedlings were separated into two groups and transferred to soils for another five weeks' growth. Different iron fertilizers ($FeSO_4$ and FeCD) with same iron dosage (200 μL solution of 2.7 μg/mL iron ingredient) was applied to each lettuce seedlings of the two groups every three days until harvest.

Seeds of *Arabidopsis thaliana* (Thale cress) ecotype Columbia-0 (Col-0) were surface sterilized with 20% (v/v) bleach and 0.02% (v/v) Triton X-100. The seeds were germinated on modified ½ strength iron-free Murashige-Skoog agar containing 1% (w/v) sucrose, MS Vitamin (Sigma-Aldrich M5524), 0.8% (w/v) agar (Sigma-Aldrich A1296). Various levels of iron deficiency conditions were simulated by either removing or incorporating less amount of the nutrients. In addition, CD or FeCD were added into the media either as supplement or as replacement of related nutrients. To analyze the root growth, seeds were sown on ½ MS agar plates and grown vertically at 22° C. under long-day conditions (16-h light/8-h dark photoperiod). Plant growth was evaluated by root lengths and fresh weight. Digital images of plates were recorded with Epson Perfection V600 Photo Scanner and root length was measured by Fiji software. Standard deviations were shown as error bars for data sets. Statistical differences between treatments were analyzed by one-way ANOVA using GraphPad Prism 7.0.

Fe control without any iron content in the culture media was included as reference. CD was also included as a control in order to eliminate its effects on *Arabidopsis* growth. In order to identify the optimum iron concentrations for *Arabidopsis* growth, four different concentrations of all three iron sources were screened. For each corresponding concentration, the contents of iron in all three iron sources were kept the same for the purpose of comparison. The concentration of FeCD was expressed as total FeCD (wt) % while for Fe(II) and Fe(III), the concentrations was expressed in Fe (wt) %.

TABLE 7

| | Germination rate of alfalfa seedlings (%) | | | |
|---|---|---|---|---|
| Samples | Fe(II) | Fe(III) | CD | FeCD |
| Control | 86.67 | 86.67 | 86.67 | 86.67 |
| I | 73.33 | 76.67 | 86.67 | 80 |
| II | 76.67 | 83.33 | 83.33 | 80 |
| III | 80 | 86.67 | 80 | 83.33 |
| IV | 80 | 76.67 | 83.33 | 80 |
| V | 80 | 80 | 86.67 | 80 |
| VI | 86.67 | 80 | 83.33 | 86.67 |

Figure 6:
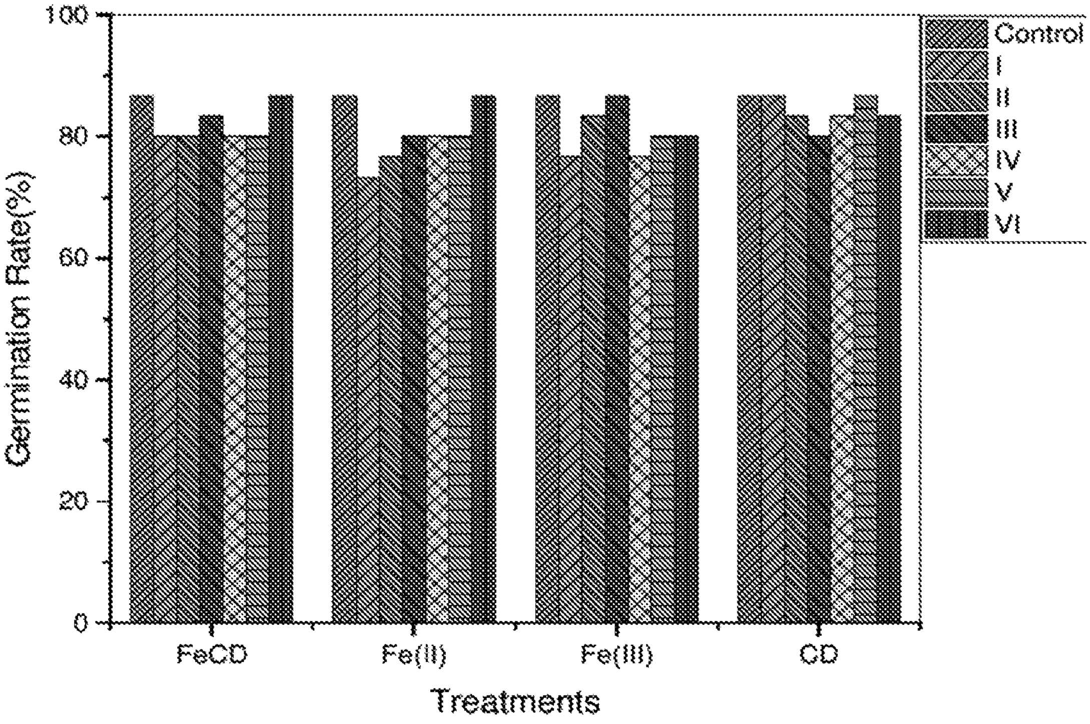
FIG. 6 is a graph showing the germination rate of alfalfa seedlings after 1 week of growth using the treatments in Table 6.

The germination rate of alfalfa seedlings under different treatments were studied, with results being shown in FIG. 6 and Table 7. There was a slight decrease in germination rate when the alfalfa seedlings were subjected to all four of the treatments. However, ANOVA analysis indicate that the difference is not significant.

Example 5. Plant Height of *Arabidopsis* Seedlings

TABLE 8

| | Root Length (mm) | | | | |
|---|---|---|---|---|---|
| | Control | 1.35 μg/mL | 2.7 μg/mL | 6.75 μg/mL | 13.5 μg/mL |
| Fe(II) | 10.87571 | 40.69692 | 46.45992 | 77.75114 | 76.61925 |
| Fe(III) | 10.87571 | 48.54953 | 57.0264 | 65.24171 | 72.22539 |
| CD | 10.87571 | 11.76288 | 16.0022 | 24.13696 | 21.83012 |
| FeCD | 10.87571 | 79.01924 | 83.72308 | 70.21395 | 54.46006 |

Figure 3A:
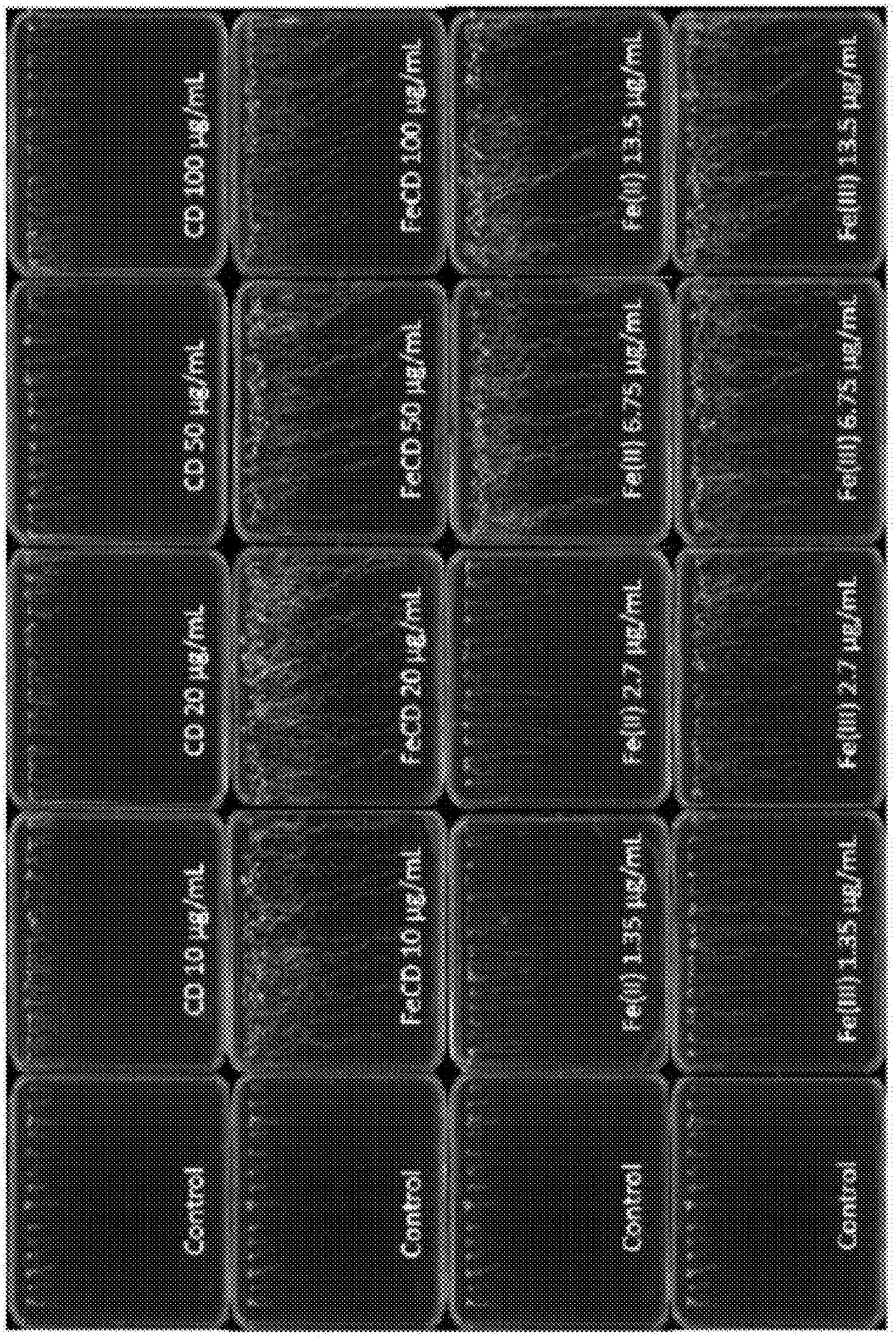
FIG. 3*a* is a series of photos showing *Arabidopsis* seedlings after 10 days of growth with different treatments of Control, CD (10, 20, 50, 100 μg/mL), FeCD (10, 20, 50, 100 μg/mL), Fe(II) (1.35, 2.7, 6.75, 13.5 μg/mL) and Fe(III) (1.35, 2.7, 6.75, 13.5 μg/mL).

The After 10 days/1 week treatment for the *Arabidopsis*/alfalfa seedlings respectively, the plant height of the *Arabidopsis* seedlings were measured (FIG. 3*a*). Results are shown in Table 8 and FIG. 3*b*.

Figure 3B:
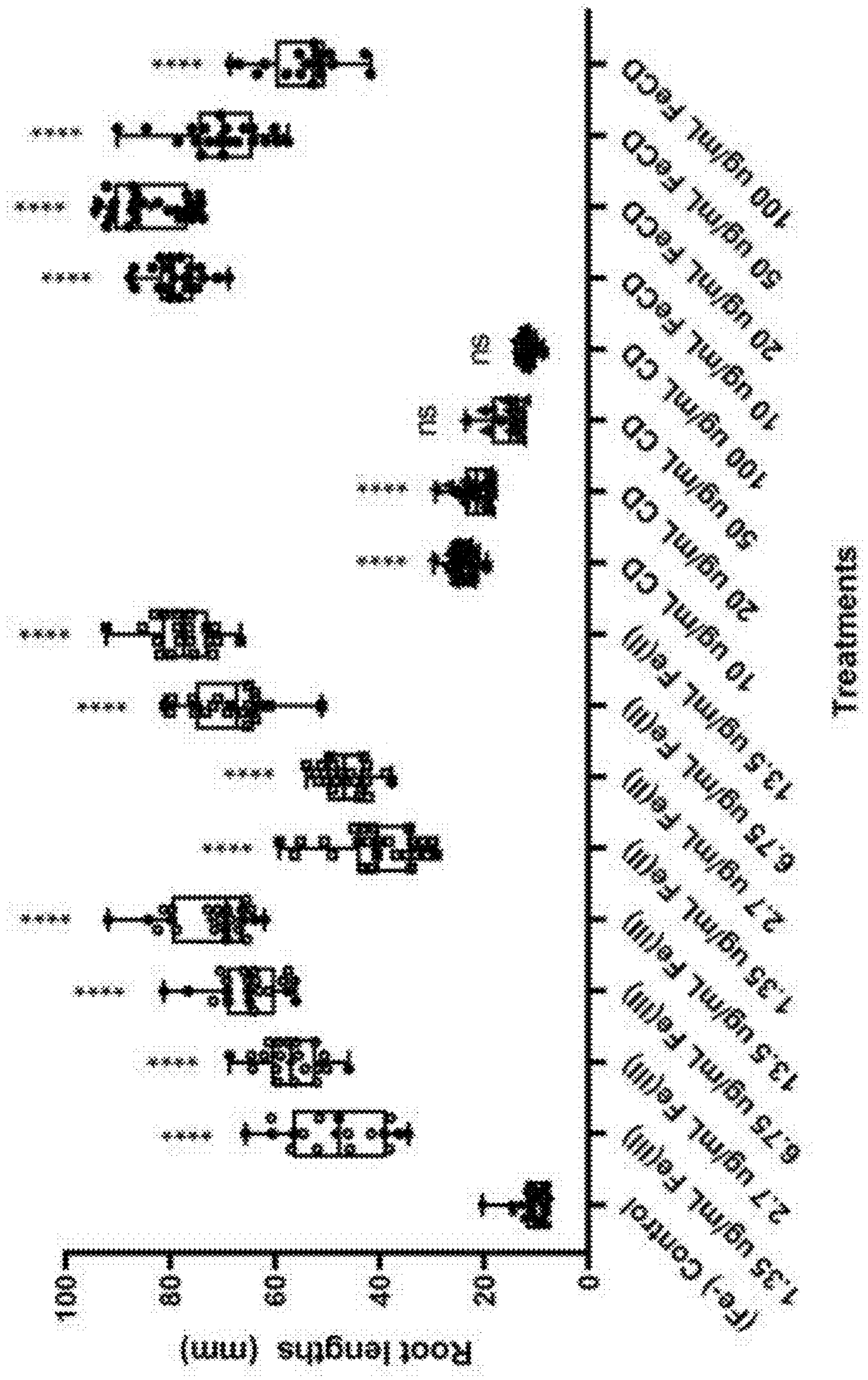
FIG. 3*b* is a graph showing the root length of *Arabidopsis* seedlings after 10 days of growth with different treatments of Control, Fe(III) via $FeCl_3$ (1.35, 2.7, 6.75, 13.5 μg/mL), Fe(II) via $FeSO_4$ (1.35, 2.7, 6.75, 13.5 μg/mL), CD (10, 20, 50, 100 μg/mL), and FeCD (10, 20, 50, 100 μg/mL).

As indicated in FIG. 3*b*, CDs exhibited a positive effect on *Arabidopsis* growth in contrast to the control. However, compared to iron supplementation, the effect of CDs on the root length is marginal (with highest increase of about 30%). Additionally, the root length of the seedlings increased by about 150% to about 250% for all three iron sources i.e. Fe(II), Fe(III) and FeCD, compared to normal CDs, at all tested concentrations. The remarkable increase of *Arabidopsis* root length verified the critical role of iron in *Arabidopsis* growth.

Additionally, FeCD exhibits the best effect on *Arabidopsis* growth at 20 μg/mL (corresponding to 2.7 μg/mL of iron) while for both Fe(II) and Fe(III), the best effect were observed at concentrations of 6.75 μg/mL of iron. This indicated that the FeCDs of the present invention are much more efficient at iron delivery or aiding absorption/usage of iron by the plant as compared to Fe(II) and Fe(III).

Figure 3C:
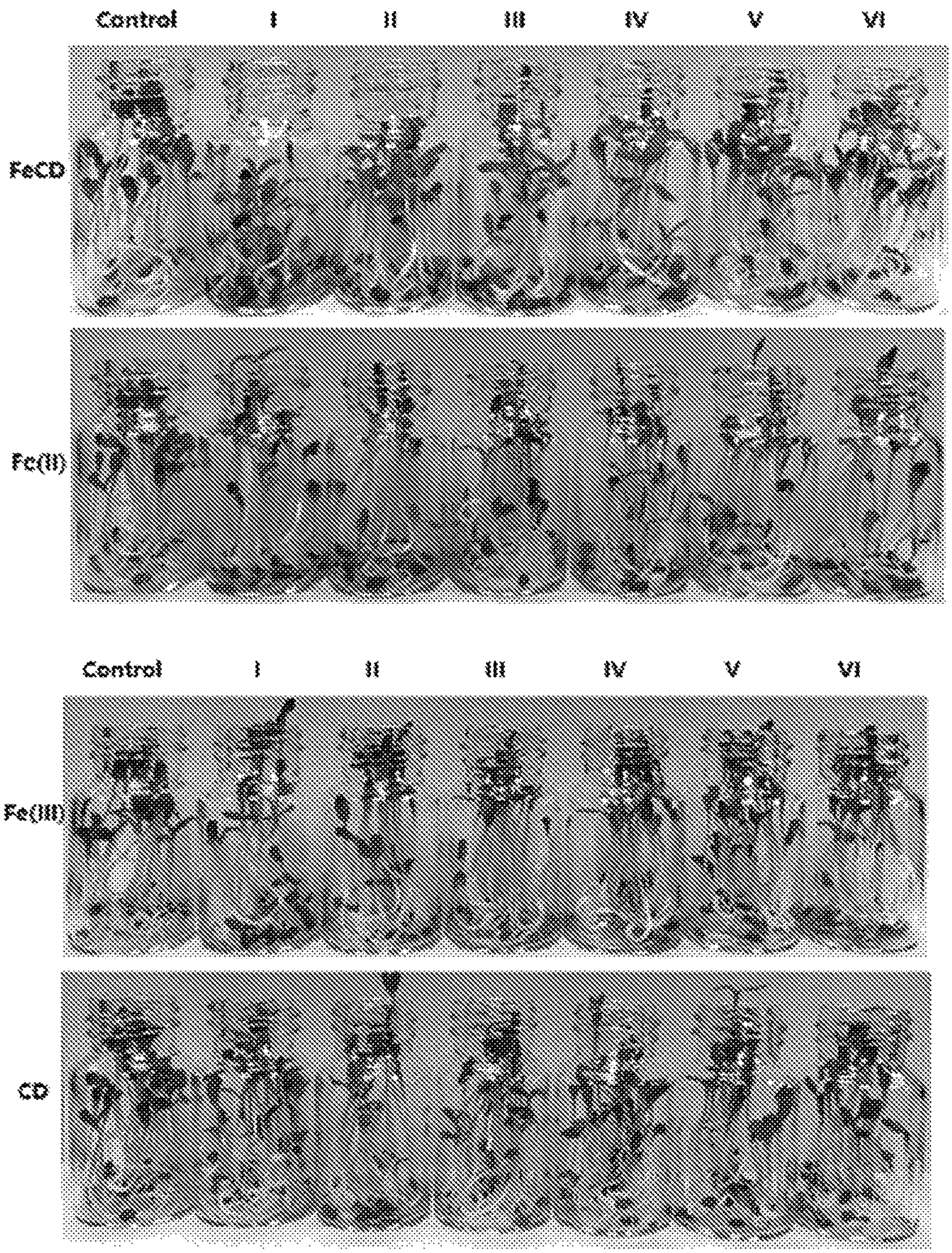
FIG. 3*c* is a series of photos showing alfalfa seedlings after 1 week of growth using the treatments in Table 6.
Figure 3D:
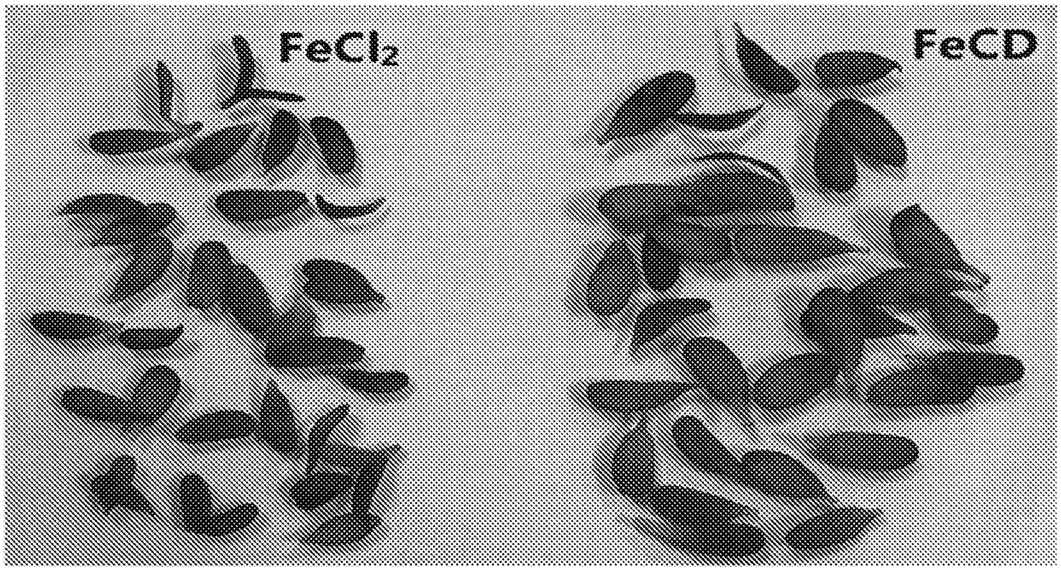
FIG. 3*d* is a photograph showing the effect of Fe(II) ($FeCl_2$ source) and FeCD at 2.7 μg/mL of iron on alfalfa leaves.

The growth promotion effect of FeCDs was also verified by alfalfa seedling, as shown in FIG. 3*c*. Even though the growth of the root of alfalfa sprouts was suppressed at high concentrations of FeCDs, the root length of alfalfa sprouts at lower concentration of FeCD was similar to that of the control. Moreover, the leaf area was dramatically increased upon FeCD treatment at all tested concentrations (FIG. 3*d*). The same effect was not observed in the other fertilizers tested.

Example 6. Biomass Growth of *Arabidopsis*/Alfalfa Seedlings, Lettuce

For each treatment, 50 to 80 *Arabidopsis* seedlings were harvested and included in the study. To determine the change in biomass after treatment, the leaves and roots of both *Arabidopsis* and alfalfa seedlings were separated after harvest and their wet weight measured. The leaves and roots were afterwards subjected to heat treatment at 80° C. until they reached a constant weight, and their weights averaged to determine the final dry weight. Results are shown in Tables 9a to 9f and FIGS. 4*a* to 4*l*.

TABLE 9a

| | Arabidopsis wet biomass of leaves (mg) | | | | | Arabidopsis dry biomass of leaves (mg) | | | | |
|---|---|---|---|---|---|---|---|---|---|---|
| | Control | 1.35 µg/mL | 2.7 µg/mL | −6.75 µg/mL | 13.5 µg/mL | Control | 1.35 µg/mL | 2.7 µg/mL | −6.75 µg/mL | 13.5 |
| Fe(II) | 1.13 | 3.53 | 7.22 | 12.44 | 12.2 | 0.1054 | 0.24375 | 0.5298 | 0.8545 | 0.8744 |
| Fe(III) | 1.13 | 7.38 | 12.06 | 11.19 | 10.56 | 0.1054 | 0.5542 | 0.9083 | 0.875 | 0.8114 |
| CDs | 1.13 | 1.29 | 1.33 | 4.06 | 3.6 | 0.1054 | 0.1333 | 0.1132 | 0.286 | 0.251 |
| FeCDs | 1.13 | 11.1 | 13.7 | 9.7 | 5.77 | 0.1054 | 0.8869 | 1.01 | 0.9899 | 0.5328 |

TABLE 9b

| | Arabidopsis wet biomass of roots (mg) | | | | | Arabidopsis dry biomass of roots (mg) | | | | |
|---|---|---|---|---|---|---|---|---|---|---|
| | Control | 1.35 µg/mL | 2.7 µg/mL | 6.75 µg/mL | 13.5 µg/mL | Control | 1.35 µg/mL | 2.7 µg/mL | 6.75 µg/mL | 13.5 µg/mL |
| Fe(II) | 0.17 | 1.18 | 2.92 | 6.78 | 6.19 | 0.0227 | 0.0909 | 0.20476 | 0.4125 | 0.3857 |
| Fe(III) | 0.17 | 2.79 | 4.75 | 6.84 | 5.18 | 0.0227 | 0.2033 | 0.3412 | 0.45 | 0.342 |
| CDs | 0.17 | 0.42 | 0.43 | 1.35 | 1.05 | 0.0227 | 0.01667 | 0.03026 | 0.115 | 0.1 |
| FeCDs | 0.17 | 6.06 | 6.91 | 4.79 | 2.29 | 0.0227 | 0.4 | 0.4283 | 0.1831 | 0.1701 |

TABLE 9c

| | Arabidopsis total wet biomass (mg) | | | | | Arabidopsis total dry biomass (mg) | | | | |
|---|---|---|---|---|---|---|---|---|---|---|
| | Control | 1.35 µg/mL | 2.7 µg/mL | 6.75 µg/mL | 13.5 µg/mL | Control | 1.35 µg/mL | 2.7 µg/mL | 6.75 µg/mL | 13.5 µg/mL |
| Fe(II) | 1.3 | 4.71 | 10.14 | 19.22 | 18.39 | 0.1281 | 0.33465 | 0.73456 | 1.267 | 1.2601 |
| Fe(III) | 1.3 | 10.17 | 16.81 | 18.03 | 15.74 | 0.1281 | 0.7575 | 1.2495 | 1.325 | 1.1534 |
| CDs | 1.3 | 1.71 | 1.76 | 5.41 | 4.65 | 0.1281 | 0.14997 | 0.14346 | 0.401 | 0.351 |
| FeCDs | 1.3 | 17.16 | 20.635 | 14.49 | 8.06 | 0.1281 | 1.2869 | 1.4323 | 1.173 | 0.7029 |

The results indicate that FeCDs best promote the growth of the leaves, roots and total wet biomass of the *Arabidopsis* seedlings most markedly at 20 µg/mL. At optimum FeCD concentration, the increase is up to 12 times, 42 times and 16 times for leaves, roots and overall wet biomass respectively. In comparison, the highest increase is up to 10 times, 19 times and 11 times respectively for leaves, roots and overall dry biomass of the *Arabidopsis* seedlings. In contrast, the best concentration of CDs of 50 µg/mL for promoting the growth of *Arabidopsis* seedlings only increased the wet biomass of leaves roots and complete plant by 3.5 times, 7 times, 4 times respectively. In terms of dry biomass, the highest increase corresponds to 2.8 times, 5 times and 3 times for leave, roots and total biomass with the same treatment. The smaller amount of FeCDs required compared to CDs, and the higher effect on *Arabidopsis* seedlings' growth confirms the advantageous ability of the FeCDs of the present invention in plant growth.

TABLE 9d

| | Alfalfa wet biomass of leaves (mg) | | | | | | | Alfalfa dry biomass of leaves (mg) | | | | | | |
|---|---|---|---|---|---|---|---|---|---|---|---|---|---|---|
| | Control | I | II | III | IV | V | VI | Control | I | II | III | IV | V | VI |
| Fe(II) | 5.51 | 6.29 | 6.71 | 5.38 | 6.19 | 5.75 | 5.3 | 0.746 | 0.852 | 0.823 | 0.87 | 0.691 | 0.674 | 0.692 |
| Fe(III) | 5.51 | 5.44 | 6.38 | 6.31 | 7.53 | 6.65 | 6.49 | 0.746 | 0.745 | 0.754 | 0.788 | 0.7 | 0.7 | 0.63 |
| CDs | 5.51 | 6.12 | 6.9 | 5.88 | 6.1 | 6.26 | 6.34 | 0.746 | 0.728 | 0.704 | 0.665 | 0.8 | 0.68 | 0.805 |
| FeCDs | 5.51 | 8.7 | 9.2 | 9.19 | 8.61 | 8.47 | 6.69 | 0.746 | 0.917 | 0.843 | 0.783 | 0.935 | 1.083 | 0.84 |

TABLE 9e

| | Alfalfa wet biomass of roots (mg) | | | | | | | Alfalfa dry biomass of roots (mg) | | | | | | |
|---|---|---|---|---|---|---|---|---|---|---|---|---|---|---|
| | Control | I | II | III | IV | V | VI | Control | I | II | III | IV | V | VI |
| Fe(II) | 14.11 | 14.85 | 13.66 | 14.22 | 14.34 | 11.95 | 10.98 | 0.732 | 0.741 | 0.726 | 0.829 | 0.725 | 0.683 | 0.685 |
| Fe(III) | 14.11 | 11.55 | 12.67 | 11.75 | 13.65 | 13.62 | 13.96 | 0.732 | 0.748 | 0.812 | 0.662 | 0.748 | 0.767 | 0.725 |
| CDs | 14.11 | 11.66 | 14.1 | 14.13 | 12.01 | 12.03 | 12.55 | 0.732 | 0.754 | 0.684 | 0.796 | 0.868 | 0.723 | 0.744 |
| FeCDs | 14.11 | 9.83 | 12.17 | 13.6 | 14 | 15.39 | 14.66 | 0.732 | 0.508 | 0.613 | 0.64 | 0.729 | 0.846 | 0.869 |

TABLE 9f

| | Alfalfa total wet biomass (mg) | | | | | | | Alfalfa total dry biomass (mg) | | | | | | |
|---|---|---|---|---|---|---|---|---|---|---|---|---|---|---|
| | Control | I | II | III | IV | V | VI | Control | I | II | III | IV | V | VI |
| Fe(II) | 19.62 | 21.14 | 20.37 | 19.6 | 20.53 | 17.7 | 16.28 | 1.458 | 1.593 | 1.549 | 1.699 | 1.416 | 1.357 | 1.377 |
| Fe(III) | 19.62 | 16.99 | 19.05 | 18.06 | 21.18 | 20.27 | 20.45 | 1.458 | 1.493 | 1.566 | 1.45 | 1.448 | 1.467 | 1.368 |
| CDs | 19.62 | 17.78 | 21 | 20.01 | 18.11 | 18.29 | 18.89 | 1.458 | 1.482 | 1.388 | 1.461 | 1.668 | 1.403 | 1.549 |
| FeCDs | 19.62 | 18.53 | 21.37 | 22.79 | 22.61 | 23.86 | 21.35 | 1.458 | 1.425 | 1.456 | 1.421 | 1.66 | 1.929 | 1.709 |

Figure 5:
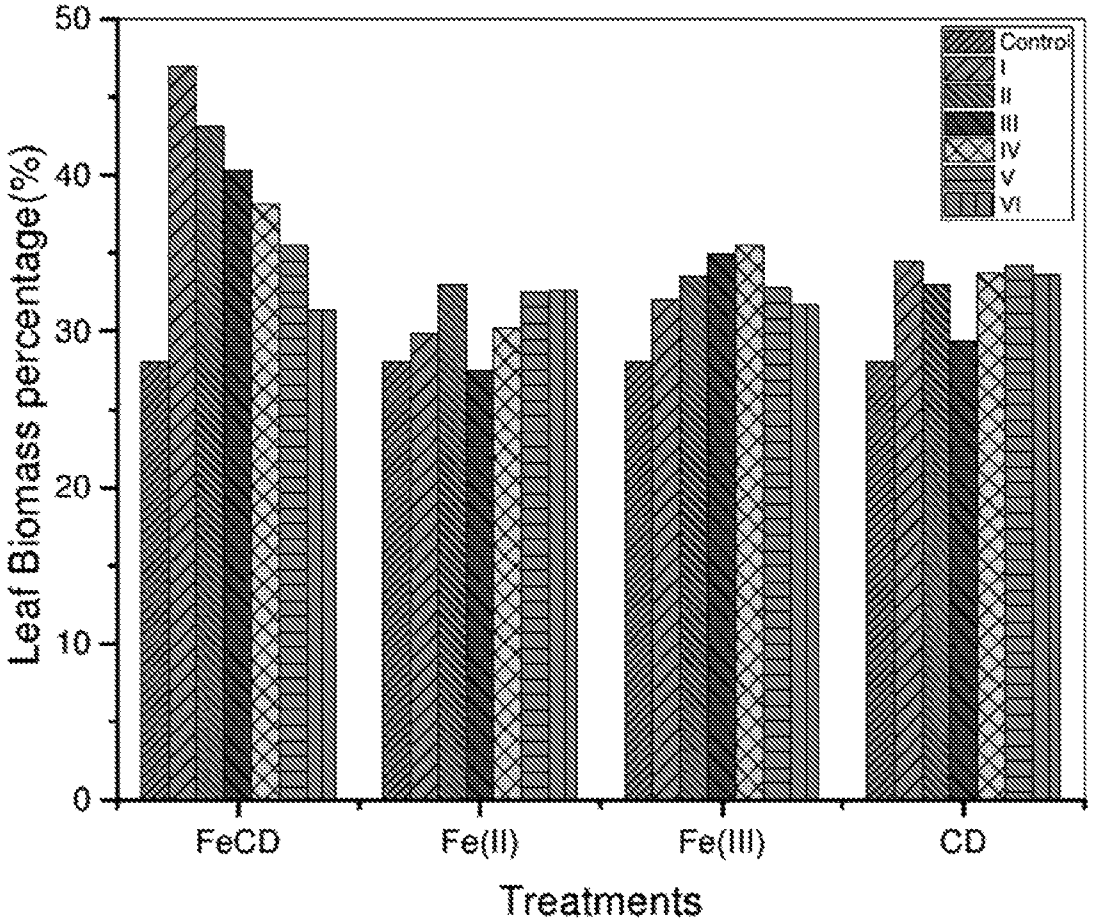
FIG. 5 is a graph showing the percentage of leaf to total biomass of alfalfa seedlings after 1 week of growth w using the treatments in Table 6.

The advantageous effect of the FeCDs were also tested on alfalfa seedlings, as shown in FIG. 3*c*. With the alfalfa as a plant model, we noticed the application of FeCDs resulted in larger leaves of the alfalfa seedlings. Further comparison of the leaf biomass to the total biomass is shown in FIG. 5. The results indicate that the FeCDs resulted in the highest increase in percentage of the leaf biomass to the total biomass, and that the increase was correspondingly dose dependent. In contrast, no other fertilizers tested resulted in the same observation.

The effect of FeCDs on plant growth were further measured (dry/wet leaves, roots and total biomass) and are laid out in Tables 9c to 9f and FIGS. 4*f* to 4*l*. At the optimal concentration of 0.125 mg/ml, the wet and dry total biomass of the alfalfa seedlings increased by 21.6% and 32.3% respectively as compared to DI water as control. In comparison, the effect on biomass is less noticeable with the other fertilizers (Fe(II), Fe(III), and CDs). Overall results thus indicate that FeCDs can substantially increase the adsorption and usage of iron by plants. The above study also shows that FeCDs can be advantageously applied to various plants, and other agricultural crops. Furthermore, FeCDs elicits the best effect at much lower concentrations compared to other tested fertilizers, and is further evidence of the economic and environmental costs potentially saved by the FeCDs of this present invention.

TABLE 10

| Average biomass per plant (mg) | FeCD (20 ug/ml) | Fe(II) (2.7 ug/ml) |
|---|---|---|
| Wet | 5203.175 | 4448.95 |
| Dry | 1224.983 | 1038.208 |

Figure 12A:
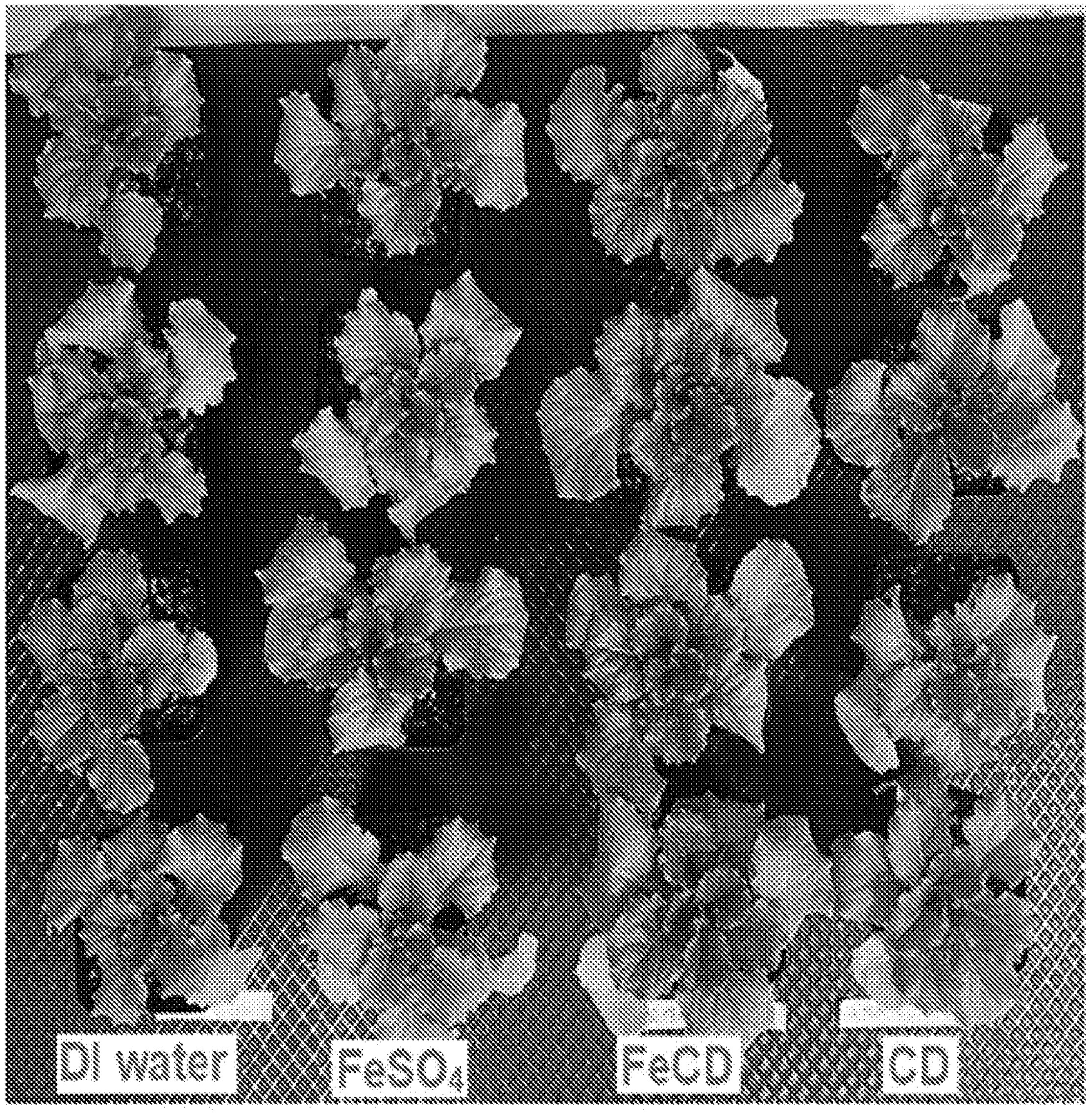
FIG. 12*a* is a photograph showing the effects of FeCD on lettuce growth in soil as compared to $FeSO_4$, CD and DI water.
Figure 12B:
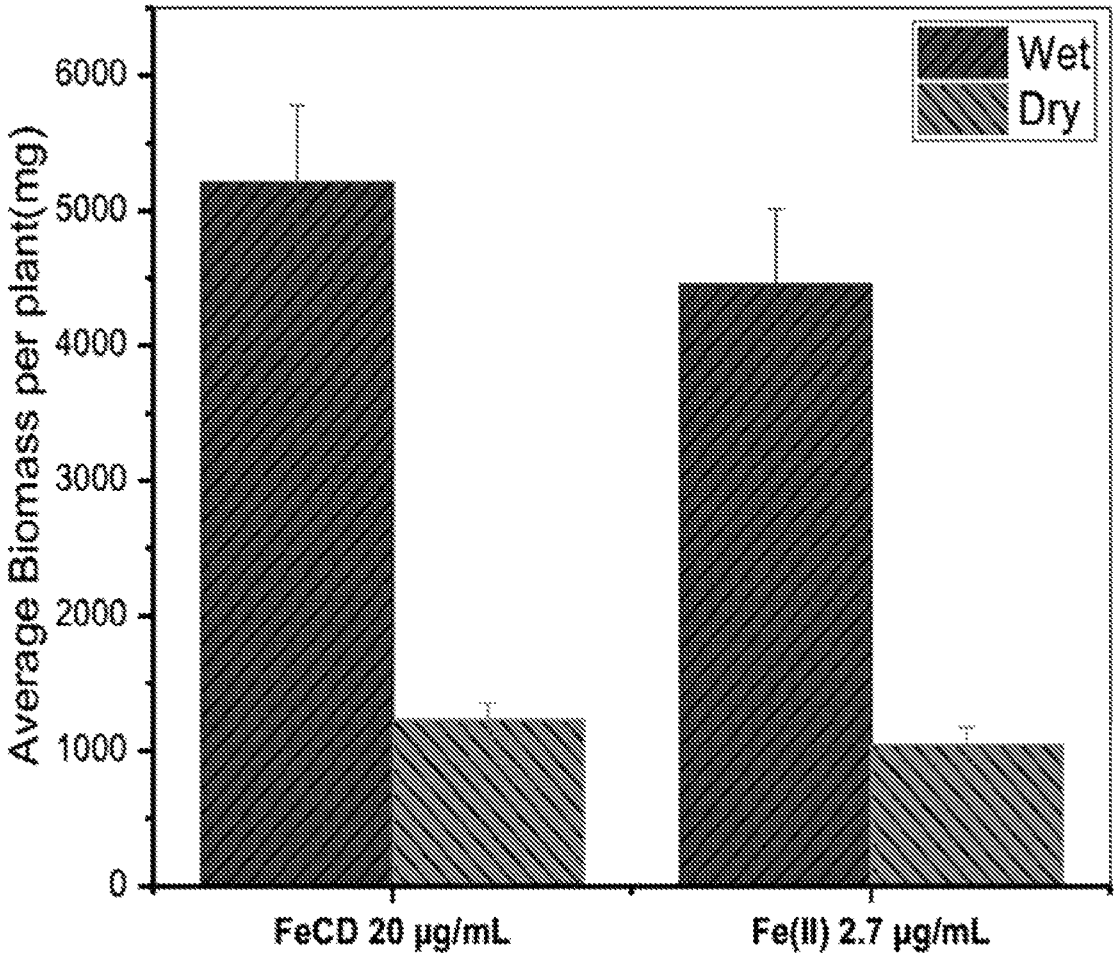
FIG. 12*b* is a graph showing the effects of FeCD (20 μg/mL) on average biomass of lettuce as compared to Fe(II) (2.7 μg/mL).

The FeCDs of the present invention were further tested in lettuce plants to show their practical applications in real life. Various lettuce plants were treated with FeCDs and Fe(II) fertilizers respectively and monitored over a duration of time. FIG. 12*a* shows the results of different samples undergoing different treatments. After a set period of time, the plants were harvested and subjected to the same characterisation in the previous two studies. Results may be found in FIG. 12*b* and Table 10.

From the results it is noteworthy that an increase of at least 15% to 20% in both wet and dry biomass can be achieved in soil using lettuce as a plant model, further showing the practical applications of the doped carbon dots of the present invention in supporting plant growth.

Example 7. Pigment Analysis

Chlorophyll content is an important index of plant growth, thus further studies were conducted to determine the effect of the FeCDs of the present invention on promoting chlorophyll production. The method used is described as below. 10 mg of fresh plant leaves were randomly selected and harvested, cut into pieces (<1 cm) and added to 15 mL centrifuge tubes filled with 10 mL of 95% ethanol. The tubes were kept in the dark for 3-5 days, and the chlorophyll content was measured by a UV-vis spectrophotometer. Concentrations of chlorophyll a (Chla), chlorophyll b (Chlb) and total chlorophyll were determined by the following equations:

$$\text{Chla}=13.36A664.2-5.19A648.6, \quad (1)$$

$$\text{Chlb}=27.43A648.6-8.12A664.2 \quad (2) \text{ and}$$

$$\text{Total chlorophyll}=\text{Chla}+\text{Chlb} \quad (3).$$

TABLE 11a

| Chlorophyll content in Arabidopsis seedlings | Concentration of FeCDs used (ug/ml) | | | | |
|---|---|---|---|---|---|
| (mg/g) | Control | 10 | 20 | 50 | 100 |
| CHLa | 0.05 | 3.56905 | 3.6491 | 4.15476 | 4.23523 |
| CHLb | 0.05 | 0.86002 | 0.88563 | 1.00013 | 0.69901 |
| Total | 0.05 | 4.42907 | 4.53473 | 5.15489 | 4.93425 |

TABLE 11b

| Chlorophyll content in Arabidopsis seedlings | Concentration of CDs used (ug/ml) | | | | |
|---|---|---|---|---|---|
| (mg/g) | Control | 10 | 20 | 50 | 100 |
| CHLa | 0.05 | 0.05 | 0.05 | 0.05 | 0.05 |
| CHLb | 0.05 | 0.05 | 0.05 | 0.05 | 0.05 |
| Total | 0.05 | 0.05 | 0.05 | 0.05 | 0.05 |

TABLE 11c

| Chlorophyll content in Arabidopsis seedlings | Concentration of Fe(II) used (ug/ml) | | | | |
|---|---|---|---|---|---|
| (mg/g) | Control | 1.35 | 2.7 | 6.75 | 13 |
| CHLa | 0.05 | 1.35026 | 2.21661 | 3.21354 | 2.96174 |
| CHLb | 0.05 | 0.3795 | 0.20947 | 0.86146 | 0.71739 |
| Total | 0.05 | 1.72975 | 2.42608 | 4.075 | 3.67914 |

TABLE 11d

| Chlorophyll content in Arabidopsis seedlings | Concentration of Fe(III) used (ug/ml) | | | | |
|---|---|---|---|---|---|
| (mg/g) | Control | 1.35 | 2.7 | 6.75 | 13.5 |
| CHLa | 0.05 | 2.18127 | 2.58002 | 3.30832 | 2.84272 |
| CHLb | 0.05 | 0.28416 | 0.29939 | 0.70975 | 0.57182 |
| Total | 0.05 | 2.46543 | 2.87941 | 4.01807 | 3.41453 |

Figure 7A:
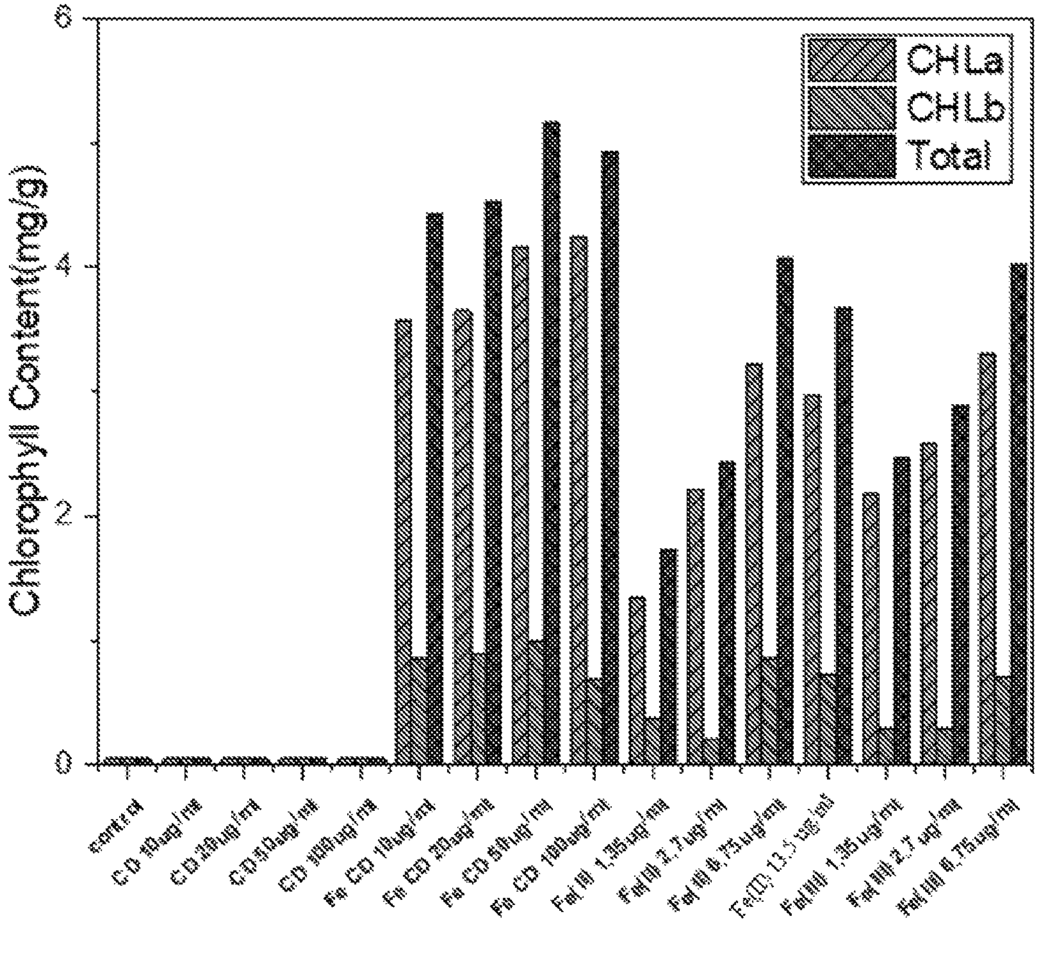
FIG. 7*a* is a graph showing the chlorophyll content in the leaves of *Arabidopsis* seedlings after 10 days of growth with different treatments of Control, CD (10, 20, 50, 100 μg/mL), FeCD (10, 20, 50, 100 μg/mL), Fe(II) (1.35, 2.7, 6.75, 13.5 μg/mL), Fe(III) (1.35, 2.7, 6.75 μg/mL).

FIG. 7*a* and Tables 11a to 11d show the effects of various fertilizers on chlorophyll content in *Arabidopsis* seedlings. The results indicated increase of chlorophyll content when Fe(II), Fe(III) and FeCD treatments were applied. In comparison, neither chlorophyll a or chlorophyll b could be detected in the seedlings undergoing control and CD treatments.

Among the three different iron sources, FeCDs appear to exhibit the highest increase of chlorophyll a and b production, especially at lower concentrations from 10 μg/mL to 50 μg/mL as compared with the optimum concentrations for Fe(II) and Fe(III). The effect of FeCDs on chlorophyll content is even more obvious than the effects of FeCDs on root length and *Arabidopsis* biomass. While the underlying mechanism is not known, it is presumed that the slow release of encapsulated iron in FeCDs is a major factor.

Taking into consideration the huge effect of FeCDs have on the production of chlorophyll and plant growth of *Arabidopsis* seedlings, it is expected that the chlorophyll production and plant growth of other plants tested will be even bigger over a longer period of time, since the increased amount of chlorophyll in the plants treated will correspondingly lead to a bigger effect in plant growth.

TABLE 12a

| Chlorophyll content in alfalfa | Concentration of FeCDs used (ug/ml) | | | | | | |
|---|---|---|---|---|---|---|---|
| seedlings (mg/g) | Control | I | II | III | IV | V | VI |
| CHLa | 0.50084 | 0.28659 | 0.29687 | 0.41554 | 0.63239 | 0.54629 | 0.59914 |
| CHLb | 0.15994 | 0.12482 | 0.10298 | 0.12245 | 0.19965 | 0.24444 | 0.19712 |
| Total | 0.66078 | 0.41141 | 0.39985 | 0.53799 | 0.83204 | 0.79073 | 0.79626 |

Tabel 12b

| Chlorophyll content in alfalfa | Concentration of Fe(II) used (ug/ml) | | | | | | |
|---|---|---|---|---|---|---|---|
| seedlings (mg/g) | Control | I | II | III | IV | V | VI |
| CHLa | 0.50084 | 0.65526 | 0.54168 | 0.60963 | 0.43449 | 0.5279 | 0.49132 |
| CHLb | 0.15994 | 0.18103 | 0.17382 | 0.16895 | 0.15108 | 0.16152 | 0.13601 |
| Total | 0.66078 | 0.83629 | 0.7155 | 0.77858 | 0.58557 | 0.68942 | 0.62733 |

TABLE 12c

| Chlorophyll content in alfalfa | Concentration of Fe(III) used (ug/ml) | | | | | | |
|---|---|---|---|---|---|---|---|
| seedlings (mg/g) | Control | I | II | III | IV | V | VI |
| CHLa | 0.50084 | 0.52948 | 0.39177 | 0.40461 | 0.5154 | 0.45584 | 0.51603 |
| CHLb | 0.15994 | 0.17823 | 0.12743 | 0.14128 | 0.17302 | 0.14567 | 0.18382 |
| Total | 0.66078 | 0.70771 | 0.5192 | 0.54589 | 0.68842 | 0.60151 | 0.69986 |

TABLE 12d

| Chlorophyll content in alfalfa seedlings (mg/g) | Concentration of CDs used (ug/ml) | | | | | | |
|---|---|---|---|---|---|---|---|
| | Control | I | II | III | IV | V | VI |
| CHLa | 0.50084 | 0.39765 | 0.47076 | 0.38768 | 0.24082 | 0.52604 | 0.46481 |
| CHLb | 0.15994 | 0.13083 | 0.1442 | 0.10113 | 0.06352 | 0.1634 | 0.14642 |
| Total | 0.66078 | 0.52848 | 0.61496 | 0.48881 | 0.30435 | 0.68944 | 0.61123 |

Figure 7B:
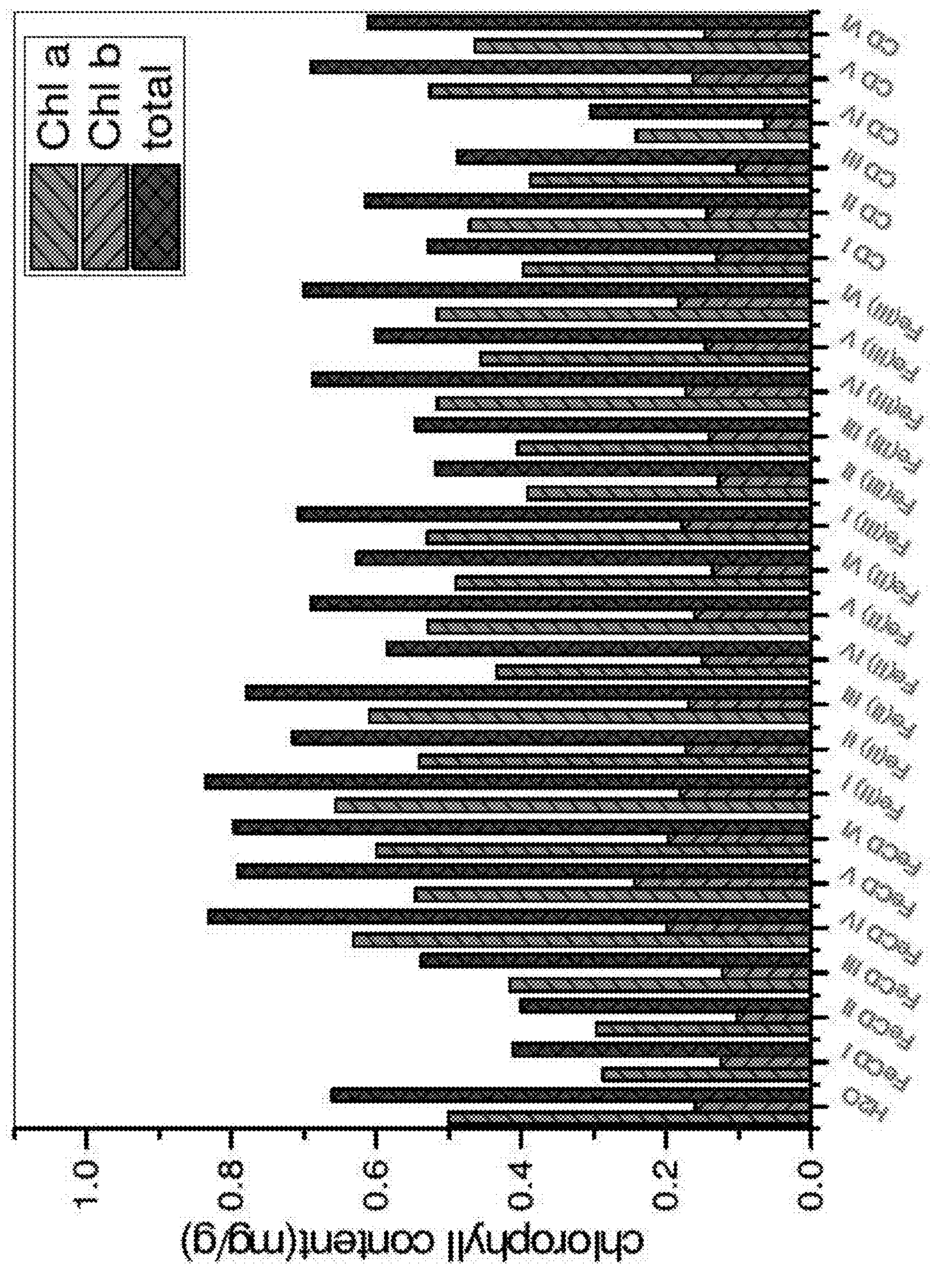
FIG. 7*b* is a graph showing the chlorophyll content in the leaves of alfalfa seedlings after 10 days of growth using the treatments in Table 6.

The same study was also applied to alfalfa seedlings. While the effects of FeCDs on chlorophyll production in alfalfa seedlings were not as obvious as that for *Arabidopsis* seedlings, the results in FIG. 7*b* and Tables 12a to 12d still show that FeCDs are superior compared to the other Fe fertilizers in increasing chlorophyll production and content. The increase in chlorophyll content of alfalfa seedlings under Fe(II) treatment can also likely be attributed to higher iron content used in the treatment.

Figure 7C:
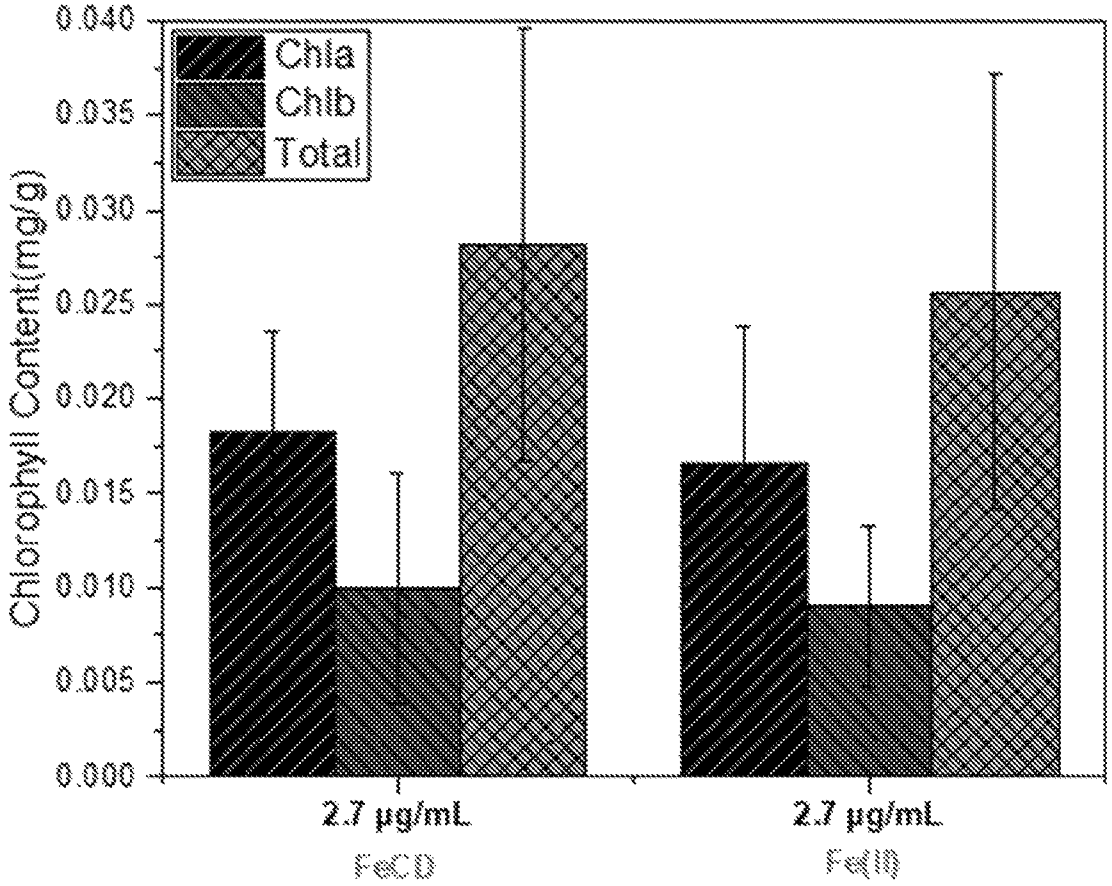
FIG. 7*c* is a graph showing the chlorophyll content in lettuce leaves at 2.7 μg/mL of iron ingredient in FeCD and Fe(II).

The same study was also applied to lettuce seedlings. The results in FIG. 7*c* and Table 13 show that FeCDs are superior compared to the other Fe fertilizers in increasing chlorophyll production and content. The increase in chlorophyll content of alfalfa seedlings under Fe(II) treatment can also likely be attributed to higher iron content used in the treatment.

TABLE 13

| Chlorophyll content in lettuce (mg/g) | Concentration of fertilized used (ug/ml) | |
|---|---|---|
| | FeCD(20 μg/mL) | Fe(II) (2.7 μg/mL) |
| CHLa | 0.01821 | 0.0166 |
| CHLb | 0.00999 | 0.00903 |
| Total | 0.0282 | 0.02563 |

Example 8. Tissue Elemental Analysis (Fe)

To measure the total content of iron taken up by the plants, the dry tissues of the leaves and roots were first weighed and ground into powder, and their dry weights taken. The ground samples (10 mg) was loaded into 20 mL glass digestion tubes with a mixture of 1 mL of concentrated nitric acid and 1 mL of 36% Hydrogen Peroxide then added. The digestion was then performed at 105° C. for 2 hours using a hot block (DigiPREP System; SCP Science, Champlain, NY). The total Fe content in plant tissue was quantified by ICP-OES; the elemental content of Fe is expressed as mg/g (dry weight) of plant tissue.

TABLE 14a

| Iron content in Arabidopsis seedlings (wt %) | Concentration of FeCDs used (ug/ml) | | | | |
|---|---|---|---|---|---|
| | Control | 10 | 20 | 50 | 100 |
| Roots | 0.007 | 0.118 | 0.214 | 0.286 | 0.248 |
| leaves | 0.009 | 0.024 | 0.026 | 0.024 | 0.045 |

TABLE 14b

| Iron content in Arabidopsis seedlings (wt %) | Concentration of Fe(II) used (ug/ml) | | | | |
|---|---|---|---|---|---|
| | Control | 1.35 | 2.7 | 6.75 | 13 |
| Roots | 0.007 | 0.033 | 0.053 | 0.187 | 0.306 |
| leaves | 0.009 | 0.012 | 0.015 | 0.015 | 0.022 |

TABLE 14c

| Iron content in Arabidopsis seedlings (wt %) | Concentration of Fe(III) used (ug/ml) | | | | |
|---|---|---|---|---|---|
| | Control | 1.35 | 2.7 | 6.75 | 13 |
| Roots | 0.007 | 0.03 | 0.078 | 0.183 | 0.334 |
| leaves | 0.009 | 0.016 | 0.023 | 0.021 | 0.03 |

TABLE 14d

| Iron content in Arabidopsis seedlings (wt %) | Concentration of CDs used (ug/ml) | | | | |
|---|---|---|---|---|---|
| | Control | 10 | 20 | 50 | 100 |
| Roots | 0.007 | 0.006 | 0.005 | 0.007 | 0.005 |
| leaves | 0.009 | 0.007 | 0.009 | 0.008 | 0.007 |

Figure 8A:
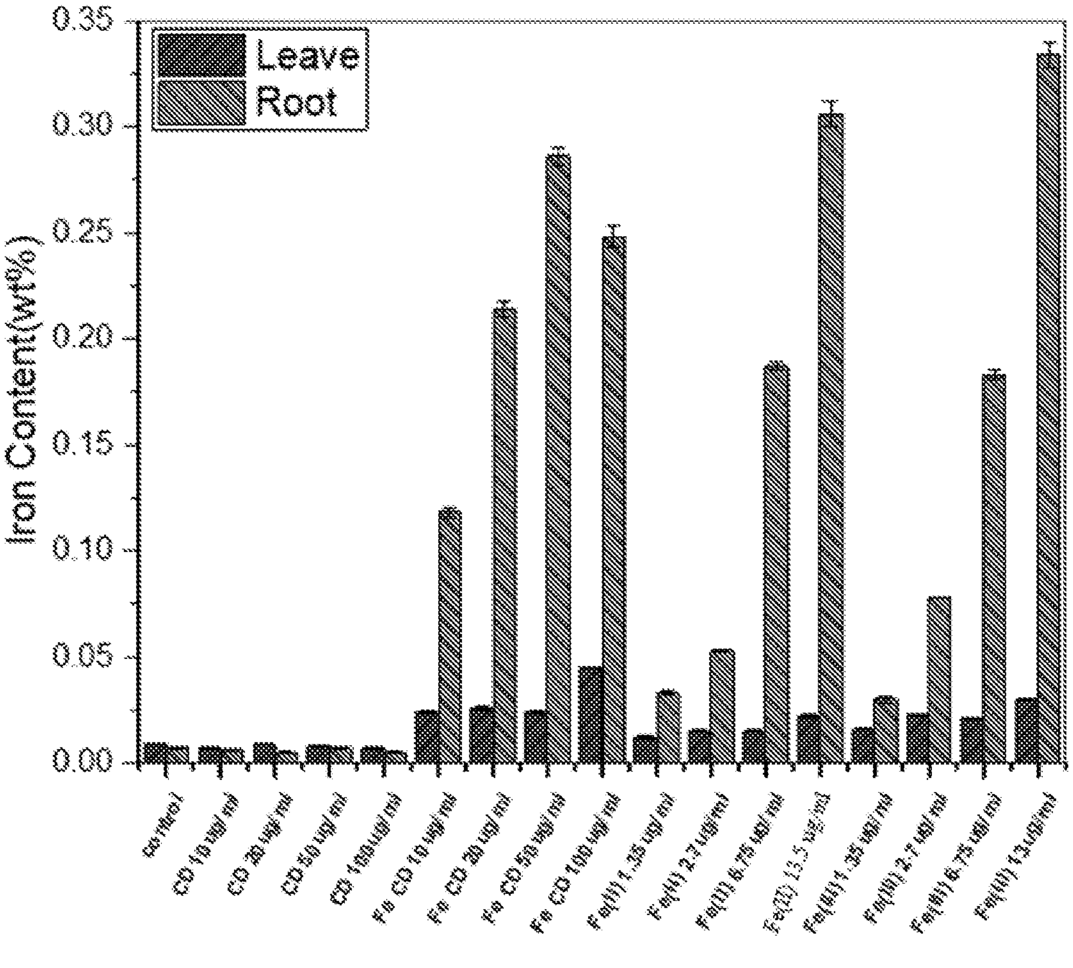
FIG. 8*a* is a graph showing the iron content in the leaf and root tissue of *Arabidopsis* seedlings after 10 days of growth with different treatments of Control, CD (10, 20, 50, 100 μg/mL), FeCD (10, 20, 50, 100 μg/mL), Fe(II) (1.35, 2.7, 6.75, 13.5 μg/mL), Fe(III) (1.35, 2.7, 6.75, 13 μg/mL).

FIG. 8*a* and Tables 14a to 14d show the total Fe content in the leaves and roots of *Arabidopsis* seedlings. The overall results indicate that iron uptake is increased in the presence of all 3 iron fertilizers. At lower concentrations, there is a significantly higher presence of iron in both roots and leaves in the presence of the FeCD fertilizer, as compared to the other 2 Fe fertilizers, indicating that FeCDs are more efficient in facilitating the iron uptake of the seedlings. This further proves that FeCD is a more advantageously efficient carrier for iron delivery.

On the other hand, at the highest tested concentration of 100 μg/ml FeCD, the root intake of iron was observed to be less than those treated with Fe(II) and Fe(III) at same Fe dosage. However, iron intake at this concentration by the leaves is much higher than those treated with Fe(II) and Fe(III). This lower root intake and higher leave intake suggests fast translocation of iron inside *Arabidopsis* tissue. Traditionally there are two kinds of iron fertilizers, Fe(II) and Fe(III). Fe(II) fertilizers generally are more expensive and prone to undesired oxidation, making them economically less useful. Fe(III) fertilizers are prone to the formation of insoluble ferric oxides, thus reducing the immobilization and available iron for adsorption by plants. *Arabidopsis* seedlings have developed two different mechanisms as a result to cope with Fe deficiencies, i.e. reduction-based strategies and chelation-based strategies, it is evident from our studies that FeCD fertilizers are still much more efficient and delivering iron to *Arabidopsis* seedlings.

It is speculated that immobilization and intake of the FeCDs by the alfalfa seedlings occurs via a different pathway in contrast to Fe(II) and Fe(III) irons, which are generally reduced, chelated and transported by different proteins. Due to the good encapsulation, CD was an effective carrier for the loaded iron. The loaded iron were able to be immobilized and adsorbed readily by the plants due to the good encapsulation of the iron in the small, hydrophilic and biocompatible carbon dots. The decomposition/digestion of CD inside plant has been demonstrated; it is thus understandable that the encapsulated iron in FeCD may be slowly released so that its positive effect on plant growth can be observed. The easy intake and fast translocation of the FeCDs inside the plants is anticipated to contribute/affect the same for plant growth. We are thus expecting iron contents increase in alfalfa leaves and roots as well.

Thus, FeCDs are superior iron fertilizers compared to the other conventional fertilizers, in terms of both economical affordability and impact on plant growth. Furthermore, the impact of FeCDs on iron uptake will be even more significant in plants or crops that do not have biological mechanisms to facilitate iron uptake.

On the other hand, while Fe(II) and Fe(III) exhibited comparable *Arabidopsis* growth promotion effects at their optimum dosage (6.75 μg/mL iron), the optimum dosages for Fe(II) and Fe(III) is 2.5 times (of iron concentration) of that of FeCD. It is evident that the optimal concentration of FeCD to elicit the most effect (10 μg/mL and 20 μg/mL) is lower compared to the optimal concentration of Fe(II) and Fe(III) to elicit the most effect (6.75 μg/mL & 13.5 μg/mL and 2.7 μg/mL & 6.75 μg/mL & 13.5 μg/mL for Fe(II) and Fe(III) respectively).

Figure 4A:
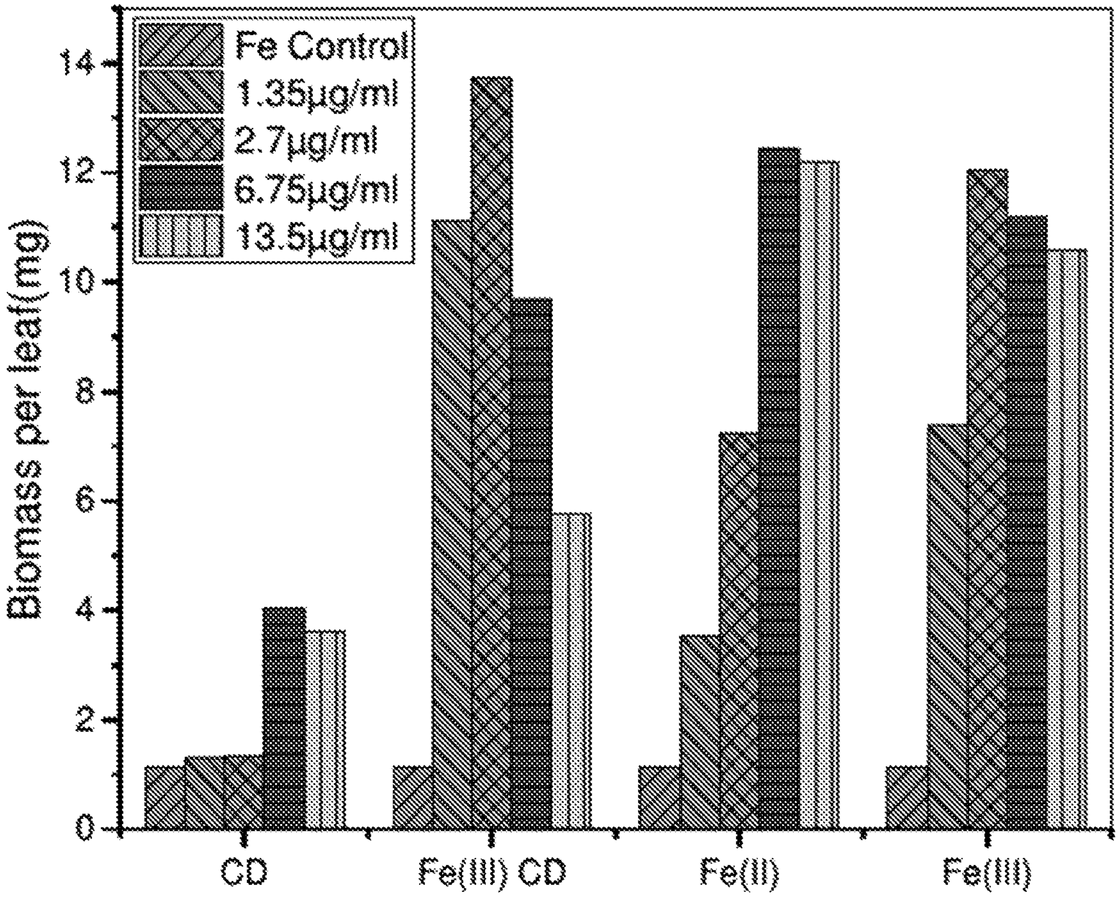
FIG. 4*a* is a graph showing the average wet biomass of the leaves of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4B:
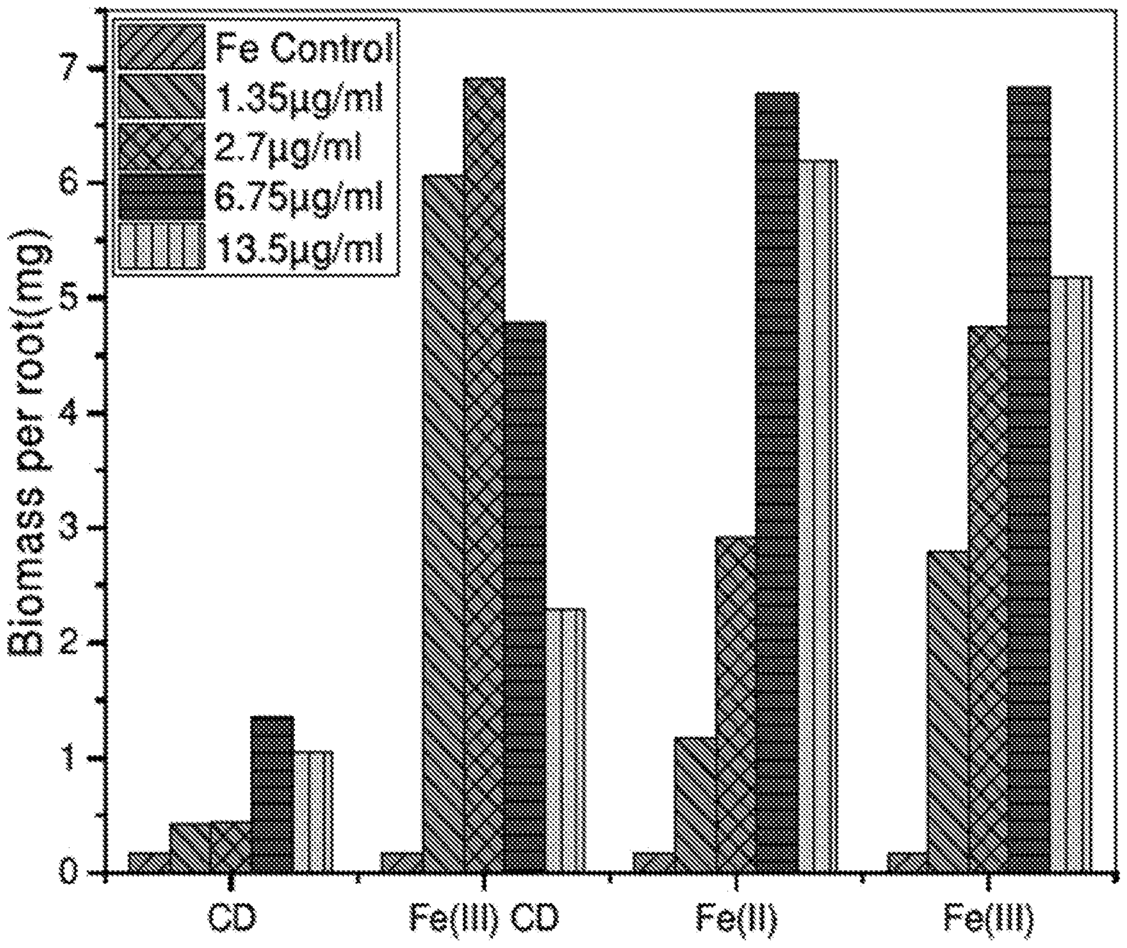
FIG. 4*b* is a graph showing the average wet biomass of the roots of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4C:
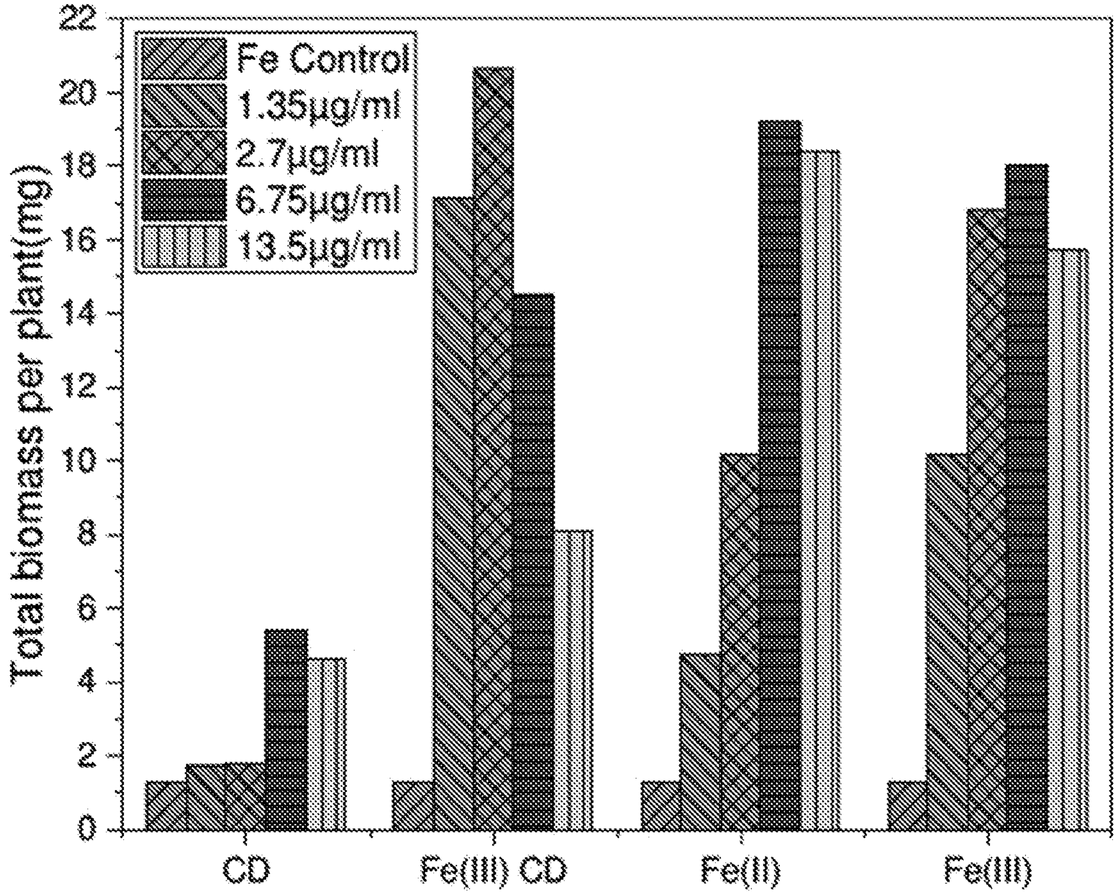
FIG. 4*c* is a graph showing the average total wet biomass of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4D:
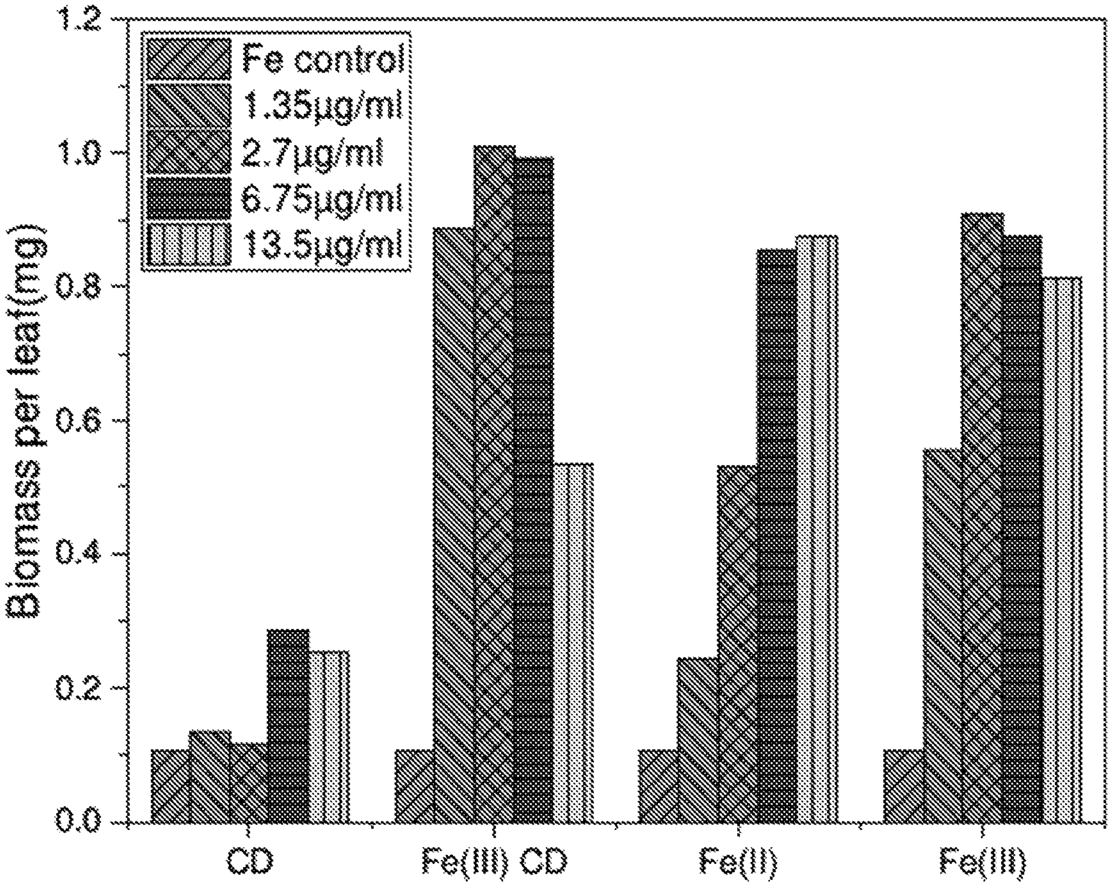
FIG. 4*d* is a graph showing the average dry biomass of the leaves of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4E:
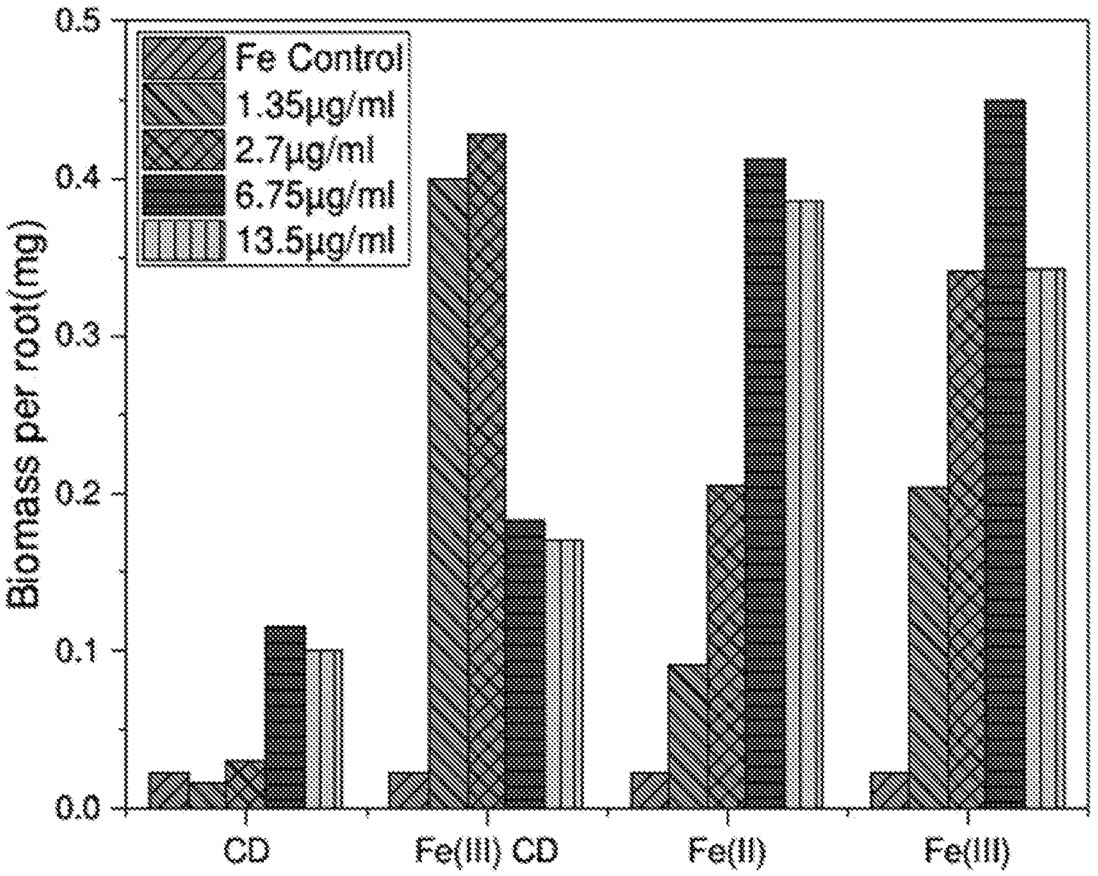
FIG. 4*e* is a graph showing the average dry biomass of the roots of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4F:
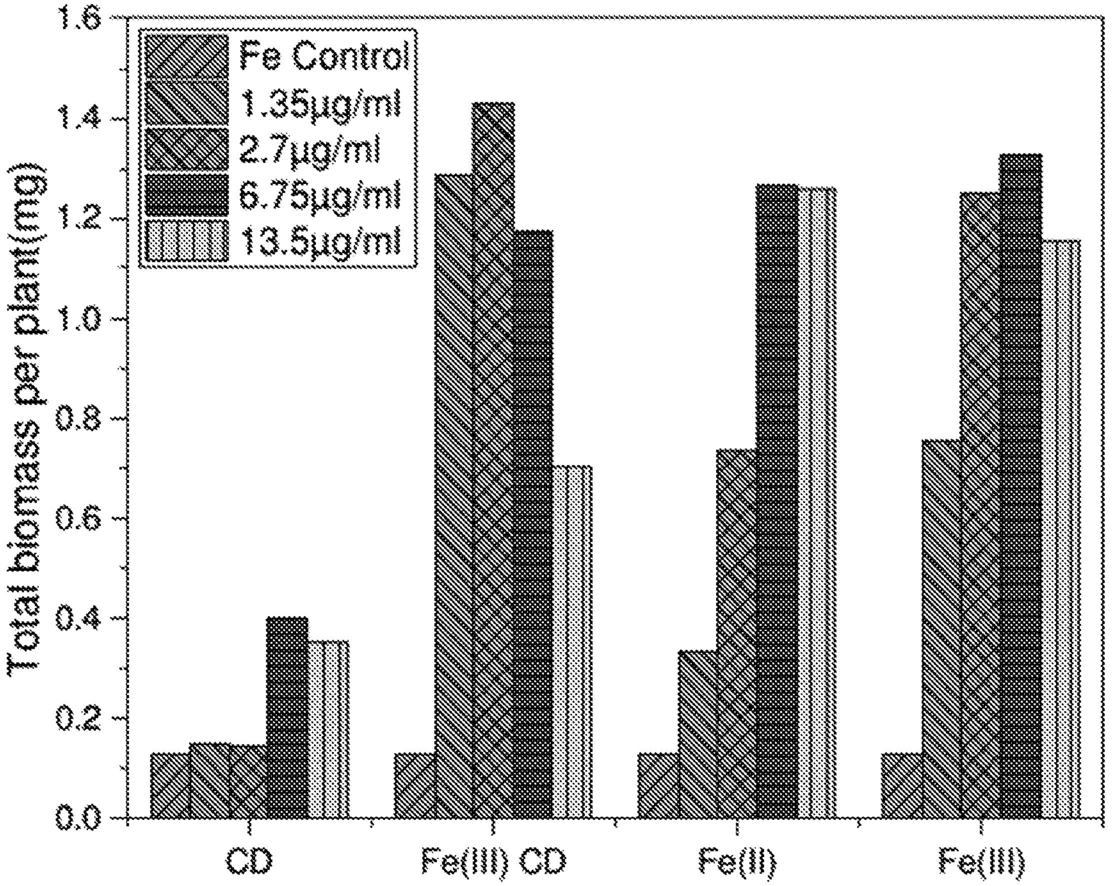
FIG. 4*f* is a graph showing the average total dry biomass of *Arabidopsis* seedlings after 10 days of growth with different treatments of Fe Control, CD (1.35, 2.7, 6.75, 13.5 μg/mL), Fe(III)CD (1.35, 2.7, 6.75, 13.5 μg/mL), Fe(II) (1.35, 2.7, 6.75, 13.5 μg/mL), and Fe(III) (1.35, 2.7, 6.75, 13.5 μg/mL).
Figure 4G:
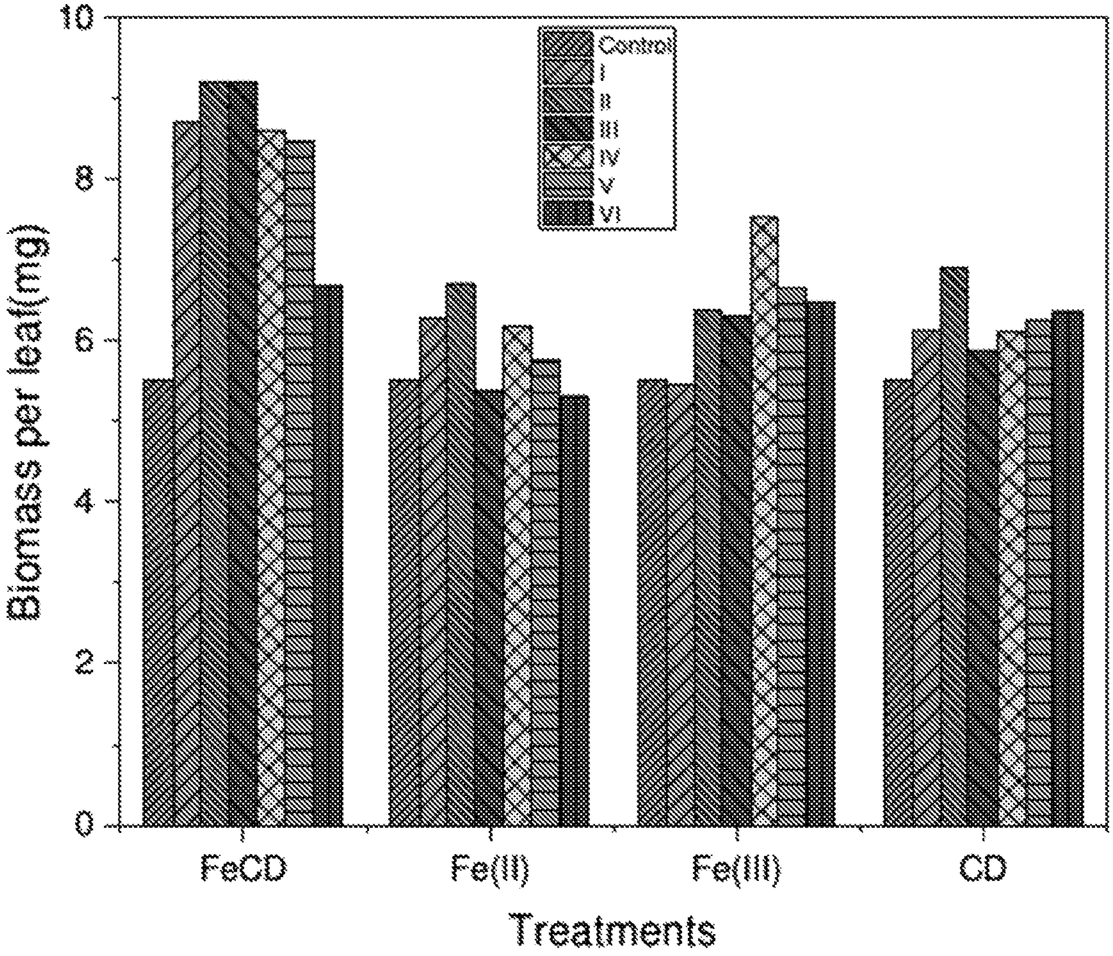
FIG. 4*g* is a graph showing the average wet biomass of the leaves of alfalfa seedlings after 1 week of growth using the treatments in Table 6.
Figure 4H:
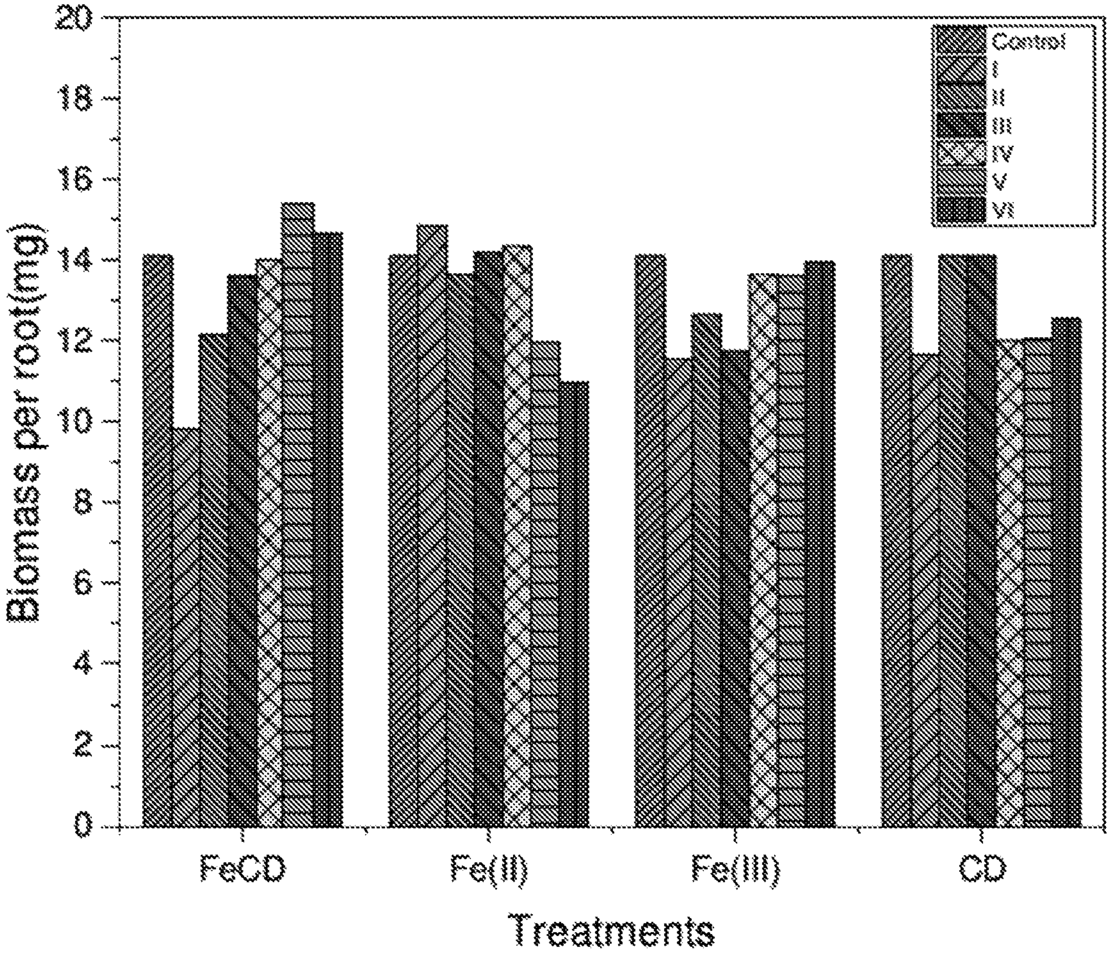
FIG. 4*h* is a graph showing the average wet biomass of the roots of alfalfa seedlings after 1 week of growth using the treatments in Table 6.
Figure 4I:
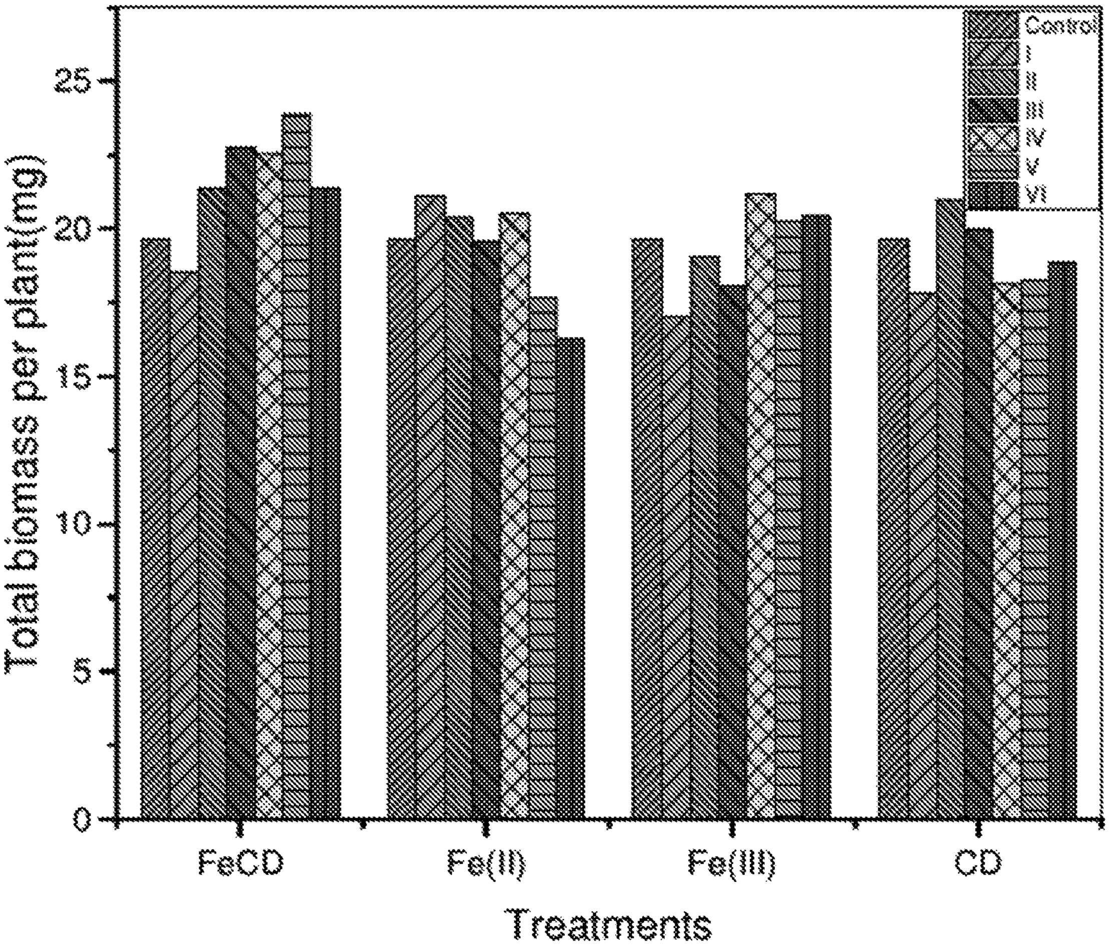
FIG. 4*i* is a graph showing the average total wet biomass of alfalfa seedlings after 1 week of growth using the treatments in Table 6.
Figure 4J:
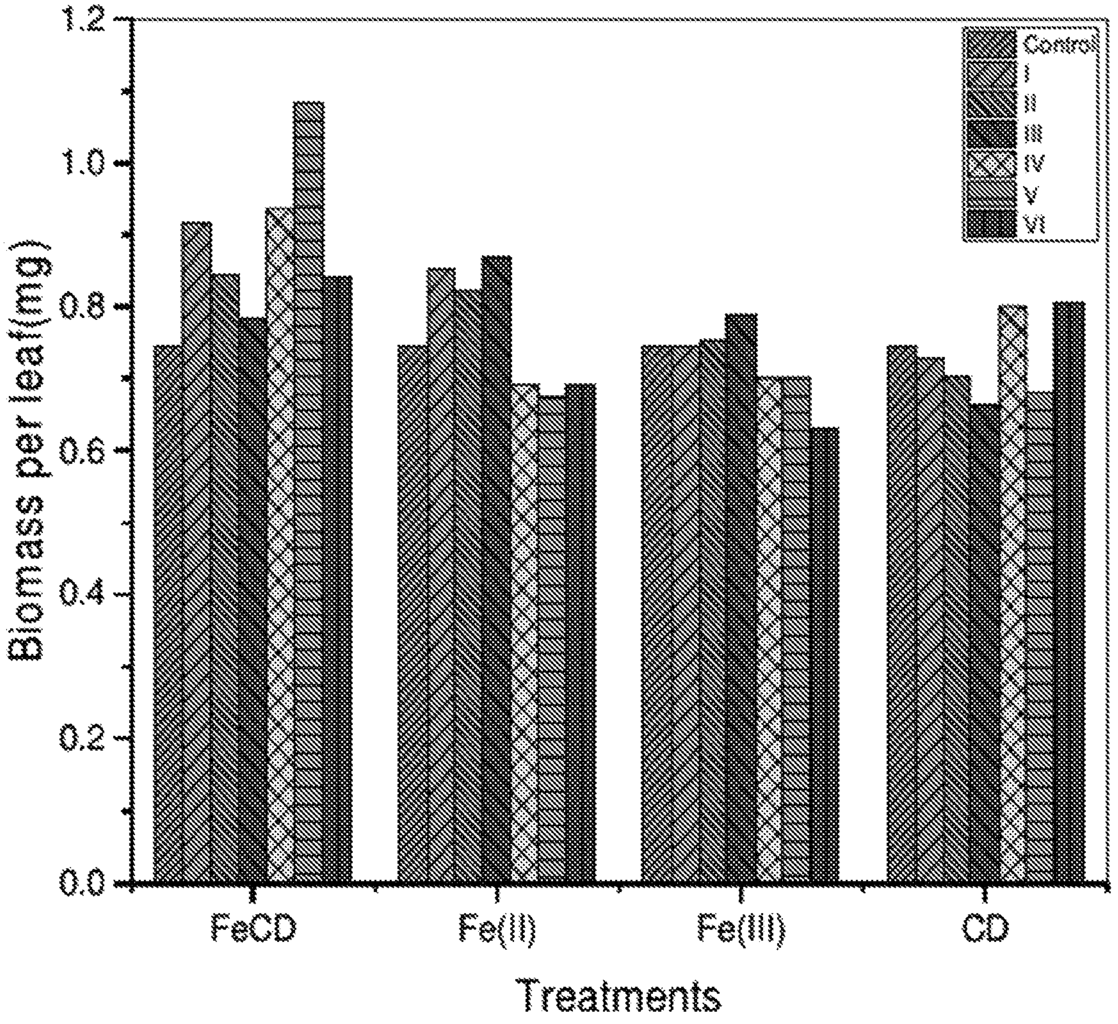
FIG. 4*j* is a graph showing the average dry biomass of the leaves of alfalfa seedlings after 1 week of growth using the treatments in Table 6.
Figure 4K:
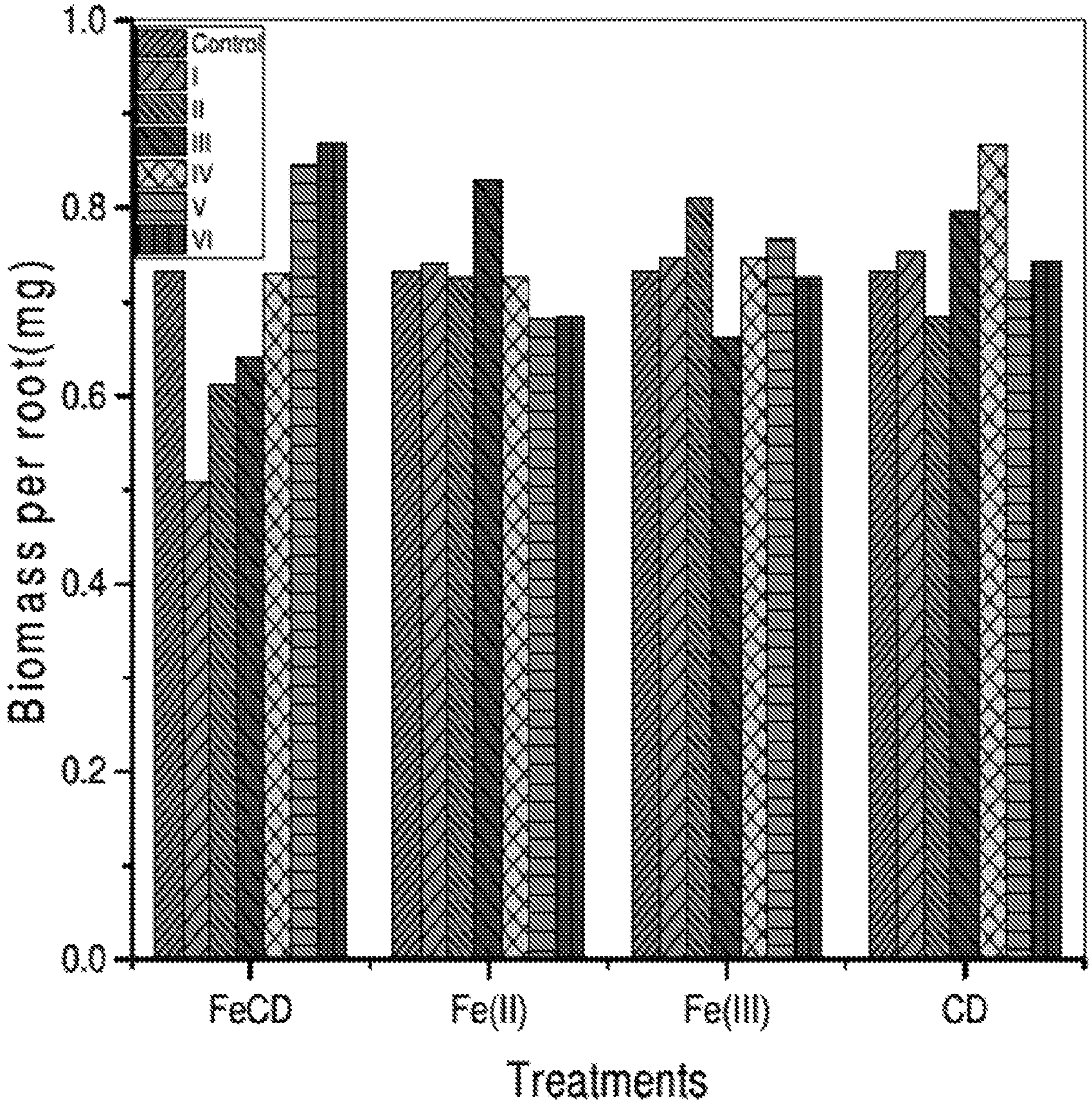
FIG. 4*k* is a graph showing the average dry biomass of the roots of alfalfa seedlings after 1 week of growth using the treatments in Table 6.
Figure 4L:
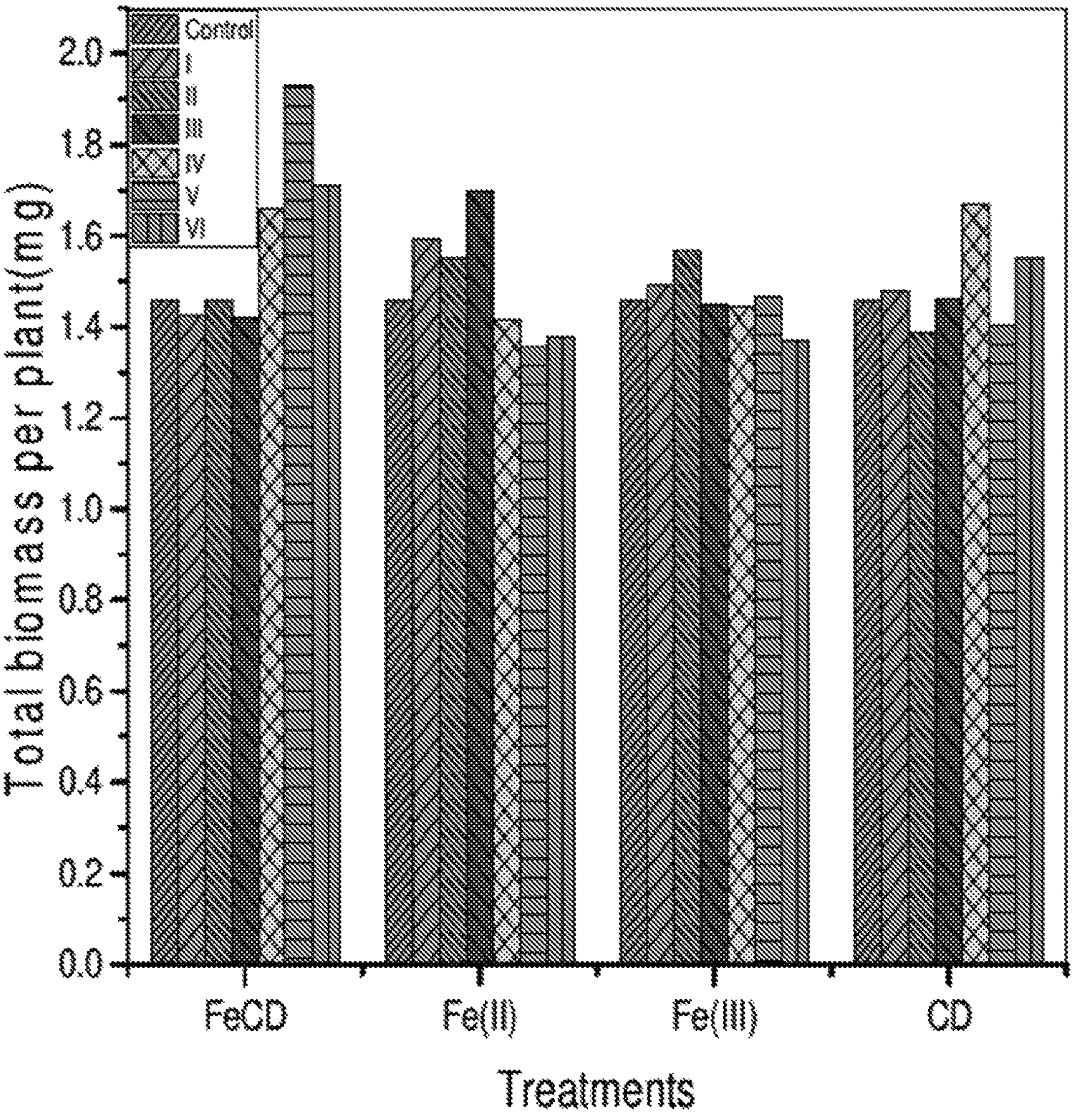
FIG. 4*l* is a graph showing the average total dry biomass of alfalfa seedlings after 1 week of growth using the treatments in Table 6.

The high ease of adsorption and usage of iron loaded in the FeCDs suggest a possibility of overdosage at higher concentrations (6.75 μg/mL & 13.5 μg/mL), which is possibly a reason why the treatment at high concentrations on alfalfa seedlings results in inferior performance than the treatment at lower concentrations on alfalfa seedlings. This possible overdosage might account for the suppression of root growth in alfalfa seedlings at higher concentrations of FeCD treatment (2 mg/mL, 1 mg/mL, 0.5 mg/mL), as shown in FIGS. 4*h* and 4*k*.

Figure 8B:
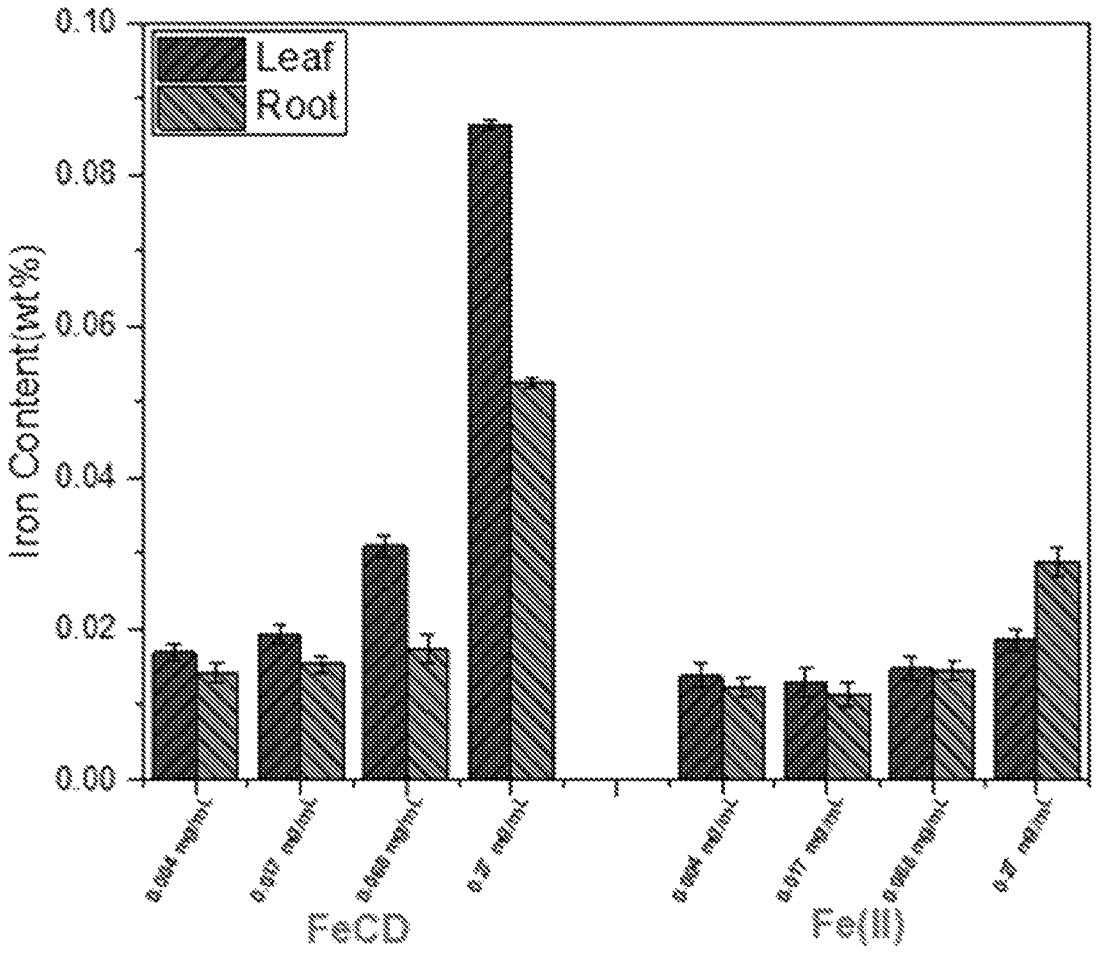
FIG. 8*b* is a graph showing the iron content in alfalfa tissue after 7 days' growth with different treatment (fertilizer concentrations were expressed in iron ingredient concentrations of 0.004 mg/mL, 0.017 mg/mL, 0.065 mg/mL, 0.27 mg/mL).

The iron content for alfalfa may be found in FIG. 8*b* and Tables 15a and 15b.

TABLE 15a

| Iron content in alfalfa seedlings | Concentration of FeCDs used (mg/ml) | | | |
|---|---|---|---|---|
| (wt %) | 0.031 | 0.125 | 0.5 | 2 |
| Roots | 0.0142 | 0.0153 | 0.0173 | 0.0526 |
| leaves | 0.01685 | 0.0192 | 0.03085 | 0.0865 |

TABLE 15b

| Iron content in alfalfa seedlings | Concentration of Fe(II) used (μg/ml) | | | |
|---|---|---|---|---|
| (wt %) | 4 | 17 | 68 | 270 |
| Roots | 0.01225 | 0.0113 | 0.01445 | 0.02875 |
| leaves | 0.01375 | 0.01283 | 0.0147 | 0.0185 |

Example 9. Tissue Elemental Analysis (Zn)

All plant growth was conducted in media with various plant nutrients. In order to understand the effect of certain nutrients, such as Fe and/or Zn, Fe and/or Zn was intentionally removed from the media out the carbon dots doped with Fe and/or Zn of the present invention was added. This was done to compare the effect of Fe/or Zn in original media and Fe and/or Zn in the doped carbon dots of the present invention.

Figure 13D:
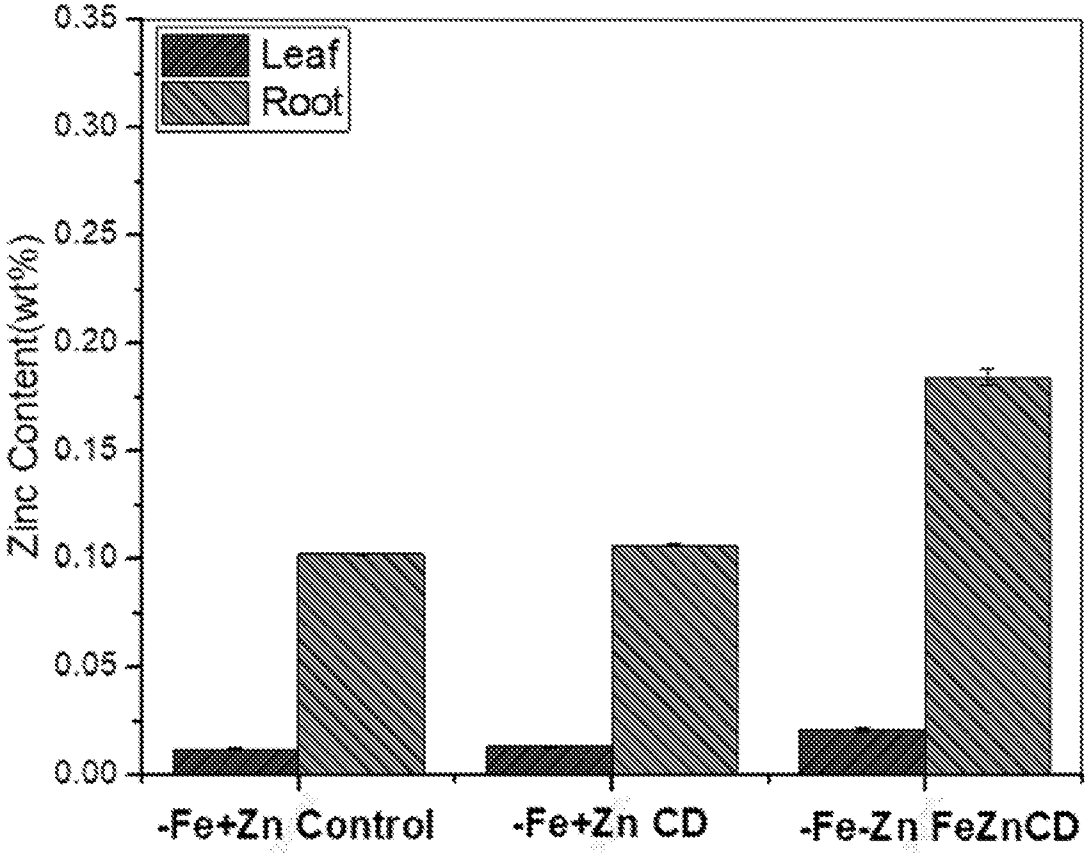
FIG. 13*d* shows the Zn content of leaves and roots in *Arabidopsis* seedlings after 10 days of treatment.
Figure 14A:
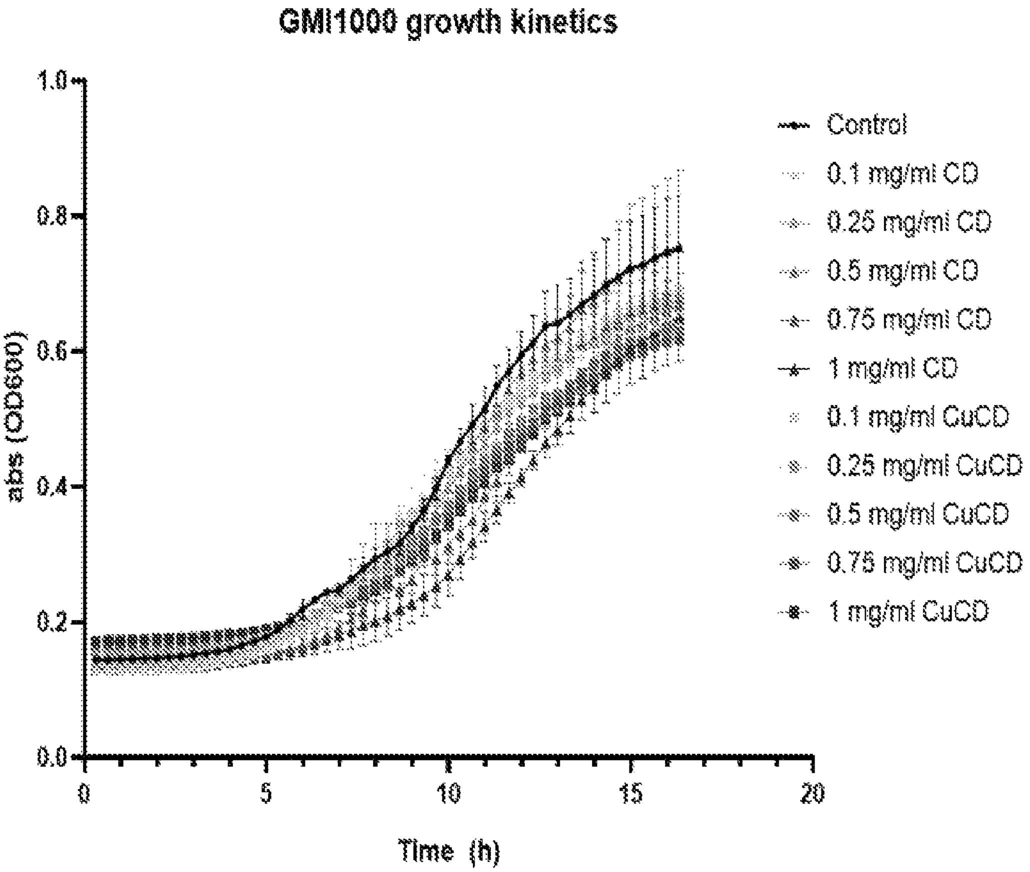
FIGS. 14*a* and 14*b* are a series of graphs showing the growth kinetics of *Xanthomonas campestris* pv. *campestris* 8004 upon addition of CD and copper-doped carbon dots (CuCD) at different concentrations (0.1, 0.25, 0.5, 0.75, 1 mg/mL).
Figure 14B:
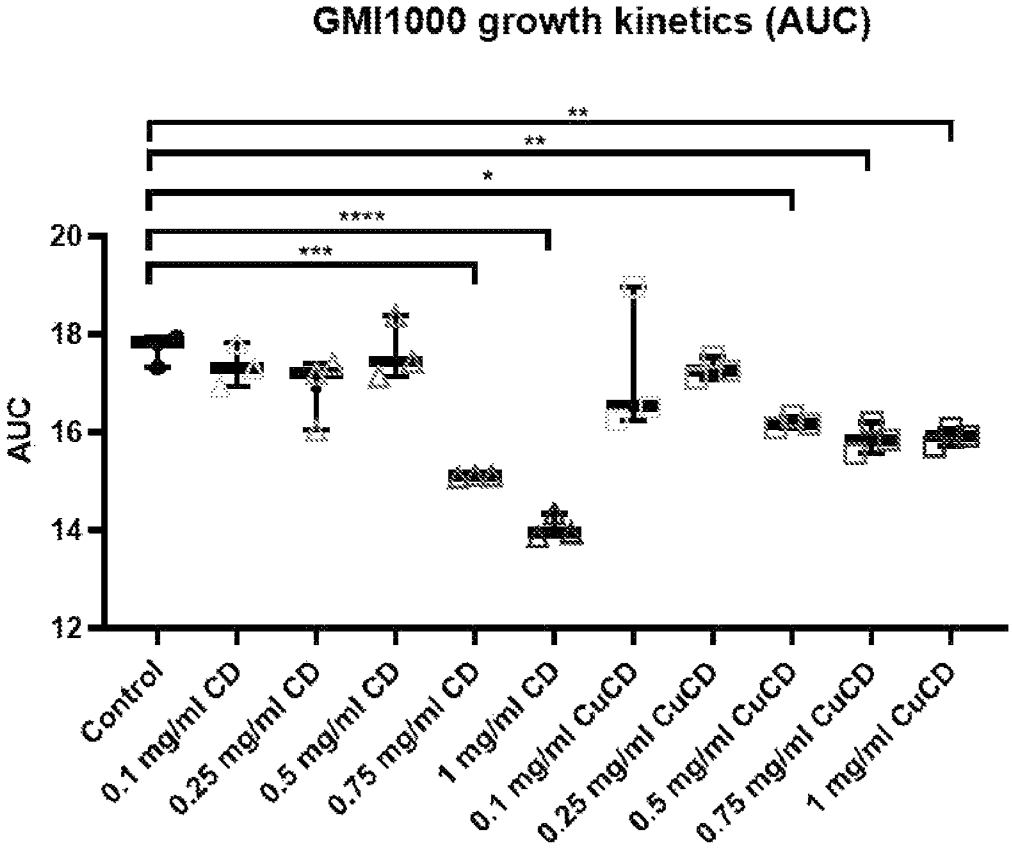
Figure 14C:
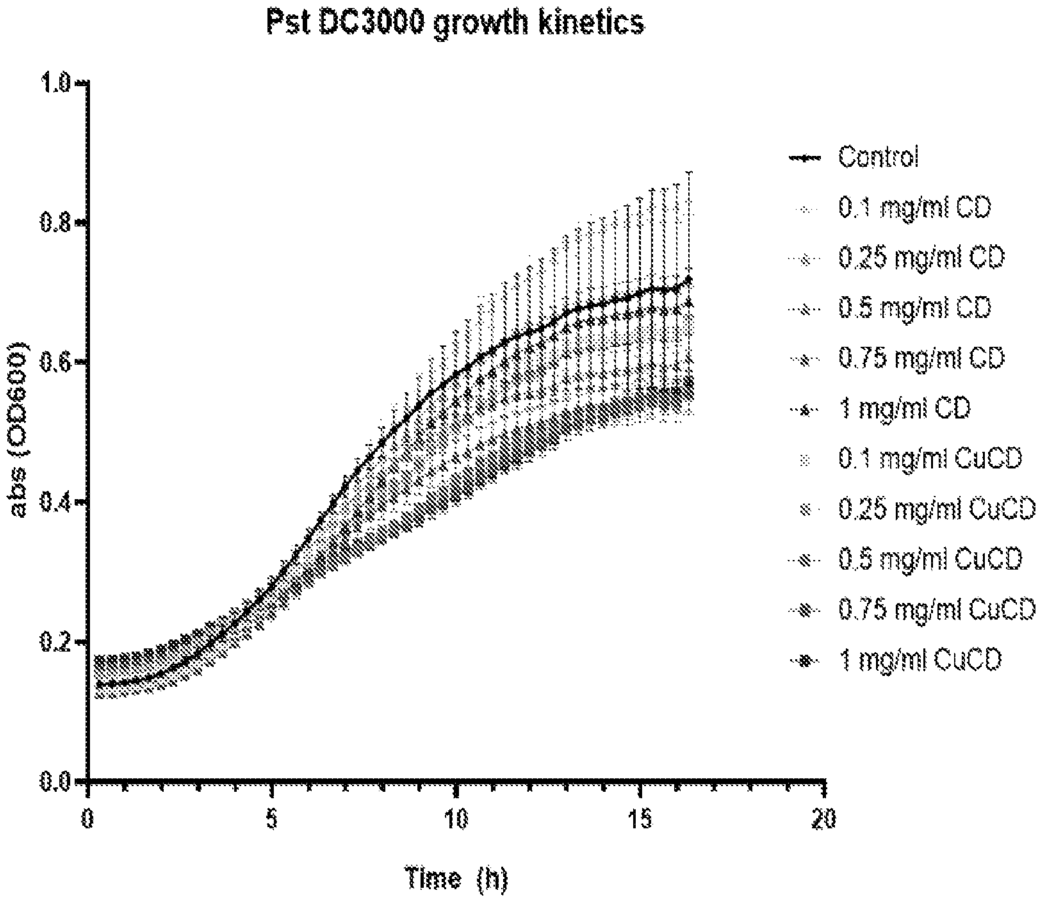
FIGS. 14*c* and 14*d* are a series of graphs showing the growth kinetics of *Pseudomonas syringae* pv. tomato DC3000 upon addition of CD and copper-doped carbon dots (CuCD) at different concentrations (0.1, 0.25, 0.5, 0.75, 1 mg/mL).
Figure 14D:
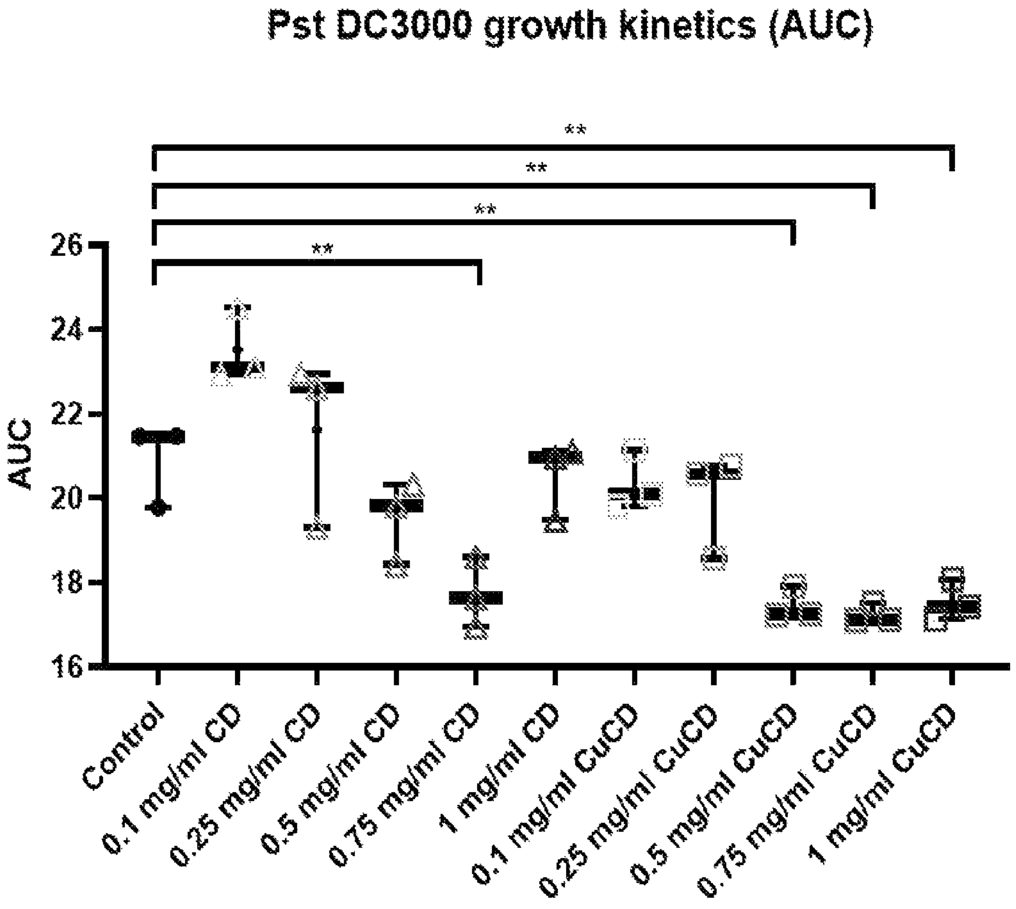
Figure 14E:
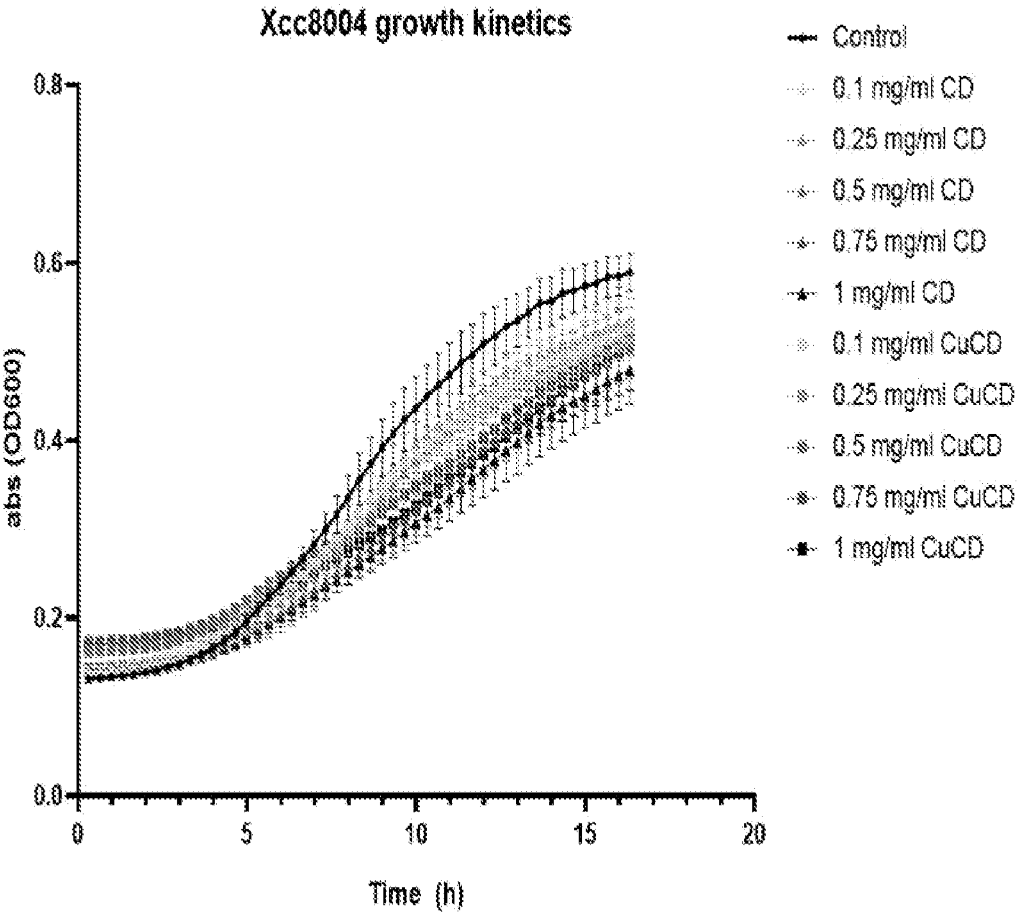
FIGS. 14*e* and 14*f* are a series of graphs showing the growth kinetics of *Ralstonia solanacearum* GMI1000 upon addition of CD and copper-doped carbon dots (CuCD) at different concentrations (0.1, 0.25, 0.5, 0.75, 1 mg/mL).
Figure 14F:
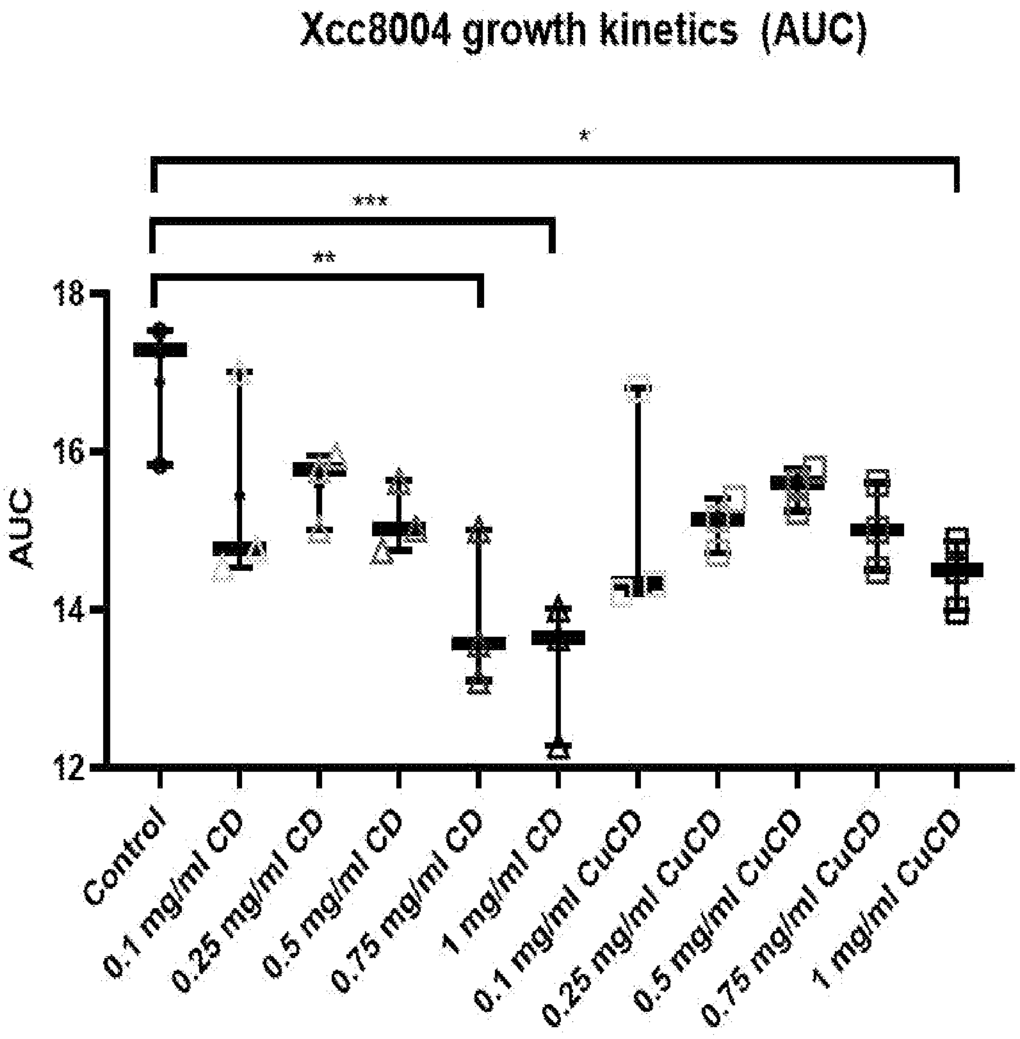

With reference to FIG. 13*d*, —Fe+Zn Control indicates removal of Fe from the original media while Zn was kept in the original media. —Fe+Zn CD indicates Fe was removed from the original media while Zn was kept in the original media, and 20 μg/mL CD was introduced. —Fe−Zn indicates Fe and Zn were removed from the original media and 20 μg/mL FeZnCD was introduced.

As shown in FIG. 13*d*, *Arabidopsis thaliana* (Thale cress) was not sensitive to Zn (—Fe+Zn Control). However, additional the use of FeZnCD was effective in Zn delivery as Zn content in both the leaf and root increased when FeZnCD was added when compared with the control and CD.

Example 10. Effects of Carbon Dots on the Growth Kinetics of Three Bacterial Strains

*X. campestris* pv. *Campestris* (Xcc 8004) is the cause of necrotic lesions and black rot symptoms among different species of crucifers. *P. syringae* pv. Tomato (Pst DC300) is a species that commonly infects tomato but also is also a natural pathogen of *Arabidopsis* commonly used to investigate molecular mechanisms underlying plant-pathogen interactions. *R. solanacearum* (GMI1000), on the other hand, is a soilborne pathogen that causes of bacterial wilt of tomato and also pathogenic on the model plant *Arabidopsis*.

*Xanthomonas campestris* pv. *campestris* 8004, *Pseudomonas syringae* pv. tomato DC3000, *Ralstonia solanacearum* GMI1000 were monitored by optical density measurements. Five different concentrations (0.1, 0.25, 0.5, 0.75, 1 mg/mL) were prepared for each of the four treatments.

CD contains no copper, CuCD contains copper-doped CD.

Bacterial growth assay was performed in NYG medium using 96-well plates. 200 μL of overnight culture ($10^7$ CFU/mL) was inoculated into each well, and the control group did not contain nanoparticles. All untreated and treated sample plates were incubated for 16 h at 30° C. A600 nm was recorded at intervals of 20 minutes, under continuous double orbital shake using a microplate reader. The average of three replicates was taken to represent the growth curve of each culture at each concentration of nanoparticles.

As shown in FIGS. 14*a* to 14*f*, carbon dots and copper-doped carbon dots were incorporated in the bacteria growth media to monitor the effects of both nanoparticles on bacteria growth. Shown below are (left) growth kinetics curves of each bacteria species upon addition of the nanoparticles, alongside with the (right) quantification of the growth curve. The AUC (i.e., area under curve) is a form of quantification of the growth curve. Lower AUC value signifies lower bacteria growth, which is equivalent to higher inhibition effect.

Although the degree of inhibition differs across bacteria species, due to species-to-species response variability, generally the bacterial growth was suppressed with the addition of CD and CuCD of concentration between 0.5 and 1 mg/mL.

There was quite a broad variability of carbon dots to the inhibition of growth amongst the three bacteria species. Therefore, a direct comparison of carbon dots effects amongst the three species is not appropriate. Certain bacteria species (Pst DC3000) is more susceptible to the addition of CuCD than CD. While other species show less difference between their CD and CuCD susceptibility.

Generally, across species tested, it has been shown that there is inhibition effect.

INDUSTRIAL APPLICABILITY

The carbon dots of the present disclosure are useful in supporting plant growth. The uses indicated in this present disclosure are advantageous because a much lower loading capacity may be required to achieve a similar effect with conventional fertilizers. The carbon dots, when used in supporting plant growth, also do not have the same economic costs and drawbacks associated with conventional fertilizers which may be expensive, prone to oxidation and prone to forming insoluble salts that plants are incapable of absorbing.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method for promoting plant growth, comprising subjecting at least one part of a plant to a carbon dot, wherein:

the carbon dot is doped with one or more doping material selected from the group consisting of silica, plant macronutrients, plant micronutrients, and drug molecules;

the doping material is conjugated within and on the surface of the carbon dot; and the carbon dot comprises a carbonized carbon source, wherein the carbon source is selected from the group consisting of ethylenediaminetetraacetic acid (EDTA), metal-EDTA, Fe-EDTA, Fe—Na-EDTA, Zn-EDTA, Cu-EDTA, Mg-EDTA, and combinations thereof.

2. The method of claim 1, wherein the carbon dot is formed by an in situ process selected from the group consisting of hydrothermal processes, assisted hydrothermal processes, and thermal processes of carbonization of the carbon source in the presence of the doping material, wherein during the in situ process, the carbon source and the doping material form carbon dots that contain doping material conjugated within and on the surface of the carbon dots.

3. The method of claim 2, wherein the carbon dot is not doped with doping material after the formation of the carbon dot.

4. The method of claim 2, wherein the hydrothermal process is performed at a temperature of about 150° C. to about 300° C.

5. The method of claim 2, wherein the in situ process is performed for a duration of at least 1 hour.

6. The method of claim 1, wherein the plant micronutrients are selected from the group consisting of metal ions, boron, chlorine, and combinations thereof.

7. The method of claim 6, wherein the metal ions are selected from the group consisting of iron ions, zinc ions, calcium ions, magnesium ions, copper ions, manganese ions, potassium ions, molybdenum ions, and combinations thereof.

8. The method of claim 6, wherein the metal ions are selected from the group consisting of $Fe2+$, $Fe3+$, $Zn2+$, $Ca2+$, $Mg2+$, $Cu2+$, $Mn2+$, $K+$, $Mo2+$, and combinations thereof.

9. The method of claim 1, wherein the drug molecule is a pesticide or bioactive.

10. The method of claim 1, wherein the conjugation is via chelation, complexation or adsorption.

11. The method of claim 1, wherein the carbon dot contains about 0.2 mmol/g to about 30 mmol/g of plant macronutrients, plant micronutrients, and/or drug molecules.

12. The method of claim 1, wherein the average diameter of the carbon dots is about 3 nm to about 200 nm.

13. The method of claim 1, wherein the carbon dot is an iron-doped carbon dot, copper-doped carbon dot, a zinc-iron co-doped carbon dot or any other dopant combination.

14. The method of claim 1, wherein the carbon dots are effective at inhibiting the growth of bacteria.

15. The method of claim 14, wherein the bacteria are selected from the group of the genus *Xanthomonas, Pseudomonas*, and *Ralstonia*.

16. The method of claim 14, wherein the bacteria are selected from the group consisting of *Xanthomonas campestris* pv. *campestris* 8004, *Pseudomonas syringae* pv. tomato DC3000, and *Ralstonia solanacearum* GMI1000.

17. The method of claim 1, wherein:

the carbon dot is a carbon dot doped with iron, copper and/or zinc; and the carbon dot is formed by an in situ hydrothermal process of carbonization of the carbon source in the presence of metal ions selected from the group consisting of iron, copper and zinc ions, wherein during the process, the carbon source and metal ions form carbon dots that contain iron, copper and/or zinc ions conjugated within and on the surface of the carbon dots.

18. The method of claim 17, wherein the carbon dots are iron-doped, copper-doped or zinc-iron co-doped carbon dots.

* * * * *